United States Patent
Olsson et al.

(10) Patent No.: US 10,670,766 B2
(45) Date of Patent: Jun. 2, 2020

(54) UTILITY LOCATING SYSTEMS, DEVICES, AND METHODS USING RADIO BROADCAST SIGNALS

(71) Applicants: Mark S. Olsson, La Jolla, CA (US); Ray Merewether, La Jolla, CA (US); Stephanie M. Bench, Carlsbad, CA (US); Sequoyah Aldridge, San Diego, CA (US); Paul Wisecaver, San Diego, CA (US); Austin Rutledge, San Diego, CA (US)

(72) Inventors: Mark S. Olsson, La Jolla, CA (US); Ray Merewether, La Jolla, CA (US); Stephanie M. Bench, Carlsbad, CA (US); Sequoyah Aldridge, San Diego, CA (US); Paul Wisecaver, San Diego, CA (US); Austin Rutledge, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 406 days.

(21) Appl. No.: 15/360,979

(22) Filed: Nov. 23, 2016

(65) Prior Publication Data
US 2017/0160420 A1    Jun. 8, 2017

Related U.S. Application Data

(60) Provisional application No. 62/260,199, filed on Nov. 25, 2015.

(51) Int. Cl.
*G01V 3/12* (2006.01)
*G01V 3/10* (2006.01)
*G01V 3/15* (2006.01)

(52) U.S. Cl.
CPC ............... *G01V 3/12* (2013.01); *G01V 3/104* (2013.01); *G01V 3/15* (2013.01)

(58) Field of Classification Search
CPC . G01V 3/12; G01V 3/17; G01V 3/165; G01V 3/108; G01V 3/104; G01V 3/10; G01V 3/081; G01V 3/08; G01V 3/00
See application file for complete search history.

(56) References Cited

U.S. PATENT DOCUMENTS

| 4,968,978 A | 11/1990 | Stolarczyk |
| 4,994,747 A | 2/1991 | Stolarczyk |

(Continued)

FOREIGN PATENT DOCUMENTS

| EP | 0 250 986 A2 | 6/1987 |
| WO | 2012/155001 A2 | 11/2012 |

OTHER PUBLICATIONS

International Searching Authority, "Written Opinion of the International Searching Authority" for PCT Patent Application No. PCT/US16/63704, dated Jun. 1, 2017, European Patent Office, Munich.

(Continued)

*Primary Examiner* — Toan M Le
(74) *Attorney, Agent, or Firm* — Steven C. Tietsworth, Esq.

(57) ABSTRACT

Systems, devices, and methods for locating buried conductors using ambient electromagnetic signals, such as AM or other broadcast signals, are described. A buried utility locator may include a plurality of spatially separated antenna arrays, a receiver circuit coupled thereto, and a processing element programmed to process measurements of ambient electromagnetic signals and associated electromagnetic signals radiated from current induced in the buried conductor from the ambient signals to determine information about the buried conductor.

24 Claims, 41 Drawing Sheets

(56) References Cited

U.S. PATENT DOCUMENTS

| | | | |
|---|---|---|---|
| 5,066,917 | A | 11/1991 | Stolarczyk |
| 6,927,698 | B2 | 8/2005 | Stolarczyk |
| 7,336,079 | B2 | 2/2008 | Stolarczyk et al. |
| 7,548,181 | B1 | 6/2009 | Bansov |
| 7,675,289 | B1 | 3/2010 | Stolarczyk et al. |
| 8,063,814 | B1 | 11/2011 | Bansov et al. |
| 8,847,813 | B2 | 9/2014 | Bansov et al. |
| 9,024,802 | B2 | 5/2015 | Stolarczyk |
| 9,207,307 | B2 | 12/2015 | Stolarczyk et al. |
| 9,207,316 | B2 | 12/2015 | Stolarczyk et al. |
| 9,356,706 | B2 | 5/2016 | Stolarczyk et al. |
| 2006/0178849 | A1 | 8/2006 | Maier et al. |
| 2013/0127470 | A1* | 5/2013 | Olsson .................. G01V 3/104 324/326 |
| 2014/0013922 | A1 | 5/2014 | Stolarczyk et al. |
| 2014/0030683 | A1 | 10/2014 | Stolarczyk |
| 2016/0090839 | A1 | 5/2016 | Stolarczyk |

OTHER PUBLICATIONS

Stolarczyk, Gerald L., "Application of Orion EMG at Lake Maloya, Raton, New Mexico," PowerPoint Presentation, Stolar EarthTek, New Mexico, U.S.

* cited by examiner

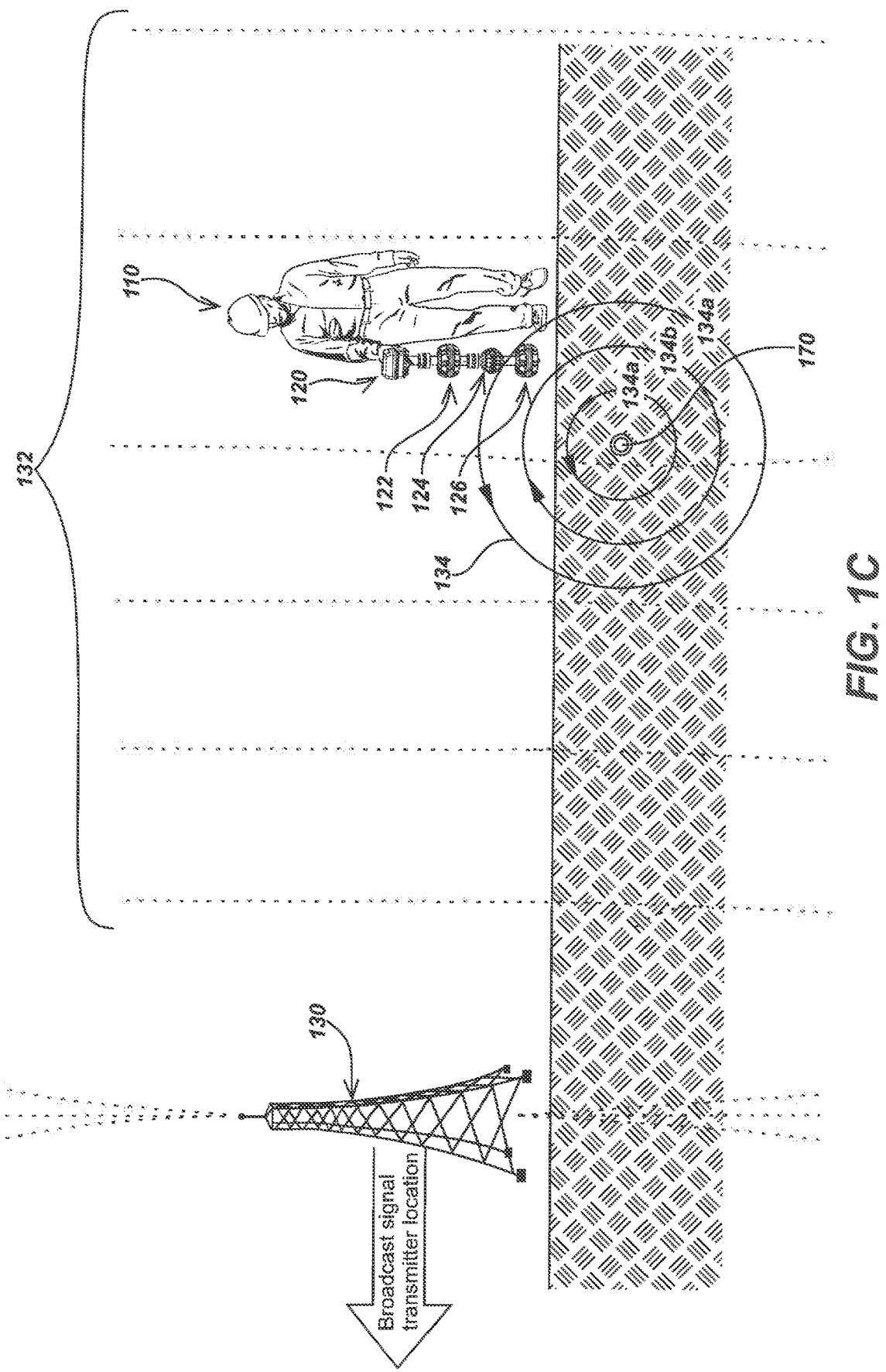

UTILITY LOCATING SYSTEMS, DEVICES, AND METHODS USING RADIO BROADCAST SIGNALS

CROSS-REFERENCE TO RELATED APPLICATIONS

This application claims priority under 35 U.S.C. § 119(e) to U.S. Provisional Patent Application Ser. No. 62/260,199, entitled UTILITY LOCATING SYSTEMS, DEVICES, AND METHODS USING RADIO BROADCAST SIGNALS, filed Nov. 25, 2015, the content of which is incorporated by reference herein in its entirety.

FIELD

This disclosure relates generally to utility locators, systems, and methods used for locating buried conductors, such as utility lines, pipes, and/or other conductors that are obscured from view. More specifically, but not exclusively, the disclosure relates to utility locators systems, devices, and methods that use ambient electromagnetic signals (e.g. radio broadcast signals) to determine the presence or absence, position, depth, and/or orientation of underground utilities or other hidden or buried conductors.

BACKGROUND

Utility locators (also denoted as "buried object locators", "utility locators", "buried utility locators", or "locators") are devices for sensing magnetic fields emitted from hidden or buried utilities (e.g., underground utilities such as pipes, conduits, or cables) or other conductors, and processing the received signals to determine information about the conductors and the associated underground environment. Traditional utility locators and associated systems used in locate operations (also denoted herein as a "locate") are tuned to receive magnetic field signals generated from the utility or other conductor through currents flowing in the utility. These currents may be coupled, either directly, inductively, or capacitively, from a signal transmitter device (also denoted herein as "transmitter") specifically designed for such tasks or may be currents intended to flow in the conductor, such as power grid currents for providing power to homes or businesses.

In some locate operations, such as with blind pipeline surveys, it may be difficult and/or impractical to position a transmitter to effectively couple signals to a conductive buried utility line using a typical transmitter. Though the use of a transmitter may, in some cases, be used to locate certain utilities, the reliance upon a transmitter in a utility locating operation may not effectively inform the user of the absence of utilities within the ground where the transmitter has failed to couple signal onto the utility. Furthermore, locator devices and systems as known in the art fail to take advantage of other signal information which may be passively available within the locate environment beyond those signals intentionally generated by a transmitter. Existing utility locators and associated systems that utilize passive signals for the purpose of locating buried utility lines are greatly limited in number and selection of tunable passive frequencies, typically only using 50 Hz or 60 Hz powerline frequencies or associated harmonics.

Accordingly, there is a need in the art to address the above-described as well as other problems.

SUMMARY

This disclosure relates generally to utility locators, systems, and methods used for locating utility lines, pipes, and/or other conductors that are obscured from view using sensing and signal processing of ambient electromagnetic signals, such as magnetic field signals associated with radio broadcasts, such as those broadcast signals used in the AM frequency band in the United States and other countries. In such systems, devices, and methods, measurements of the broadcast signals and associated re-radiated magnetic field signals from hidden or buried conductors may be used to determine locate information within a locate area and/or utility lines or other conductive objects which may be buried therein.

According to one embodiment, a buried utility locator is provided which includes a locator housing, a front end subsystem, coupled to or disposed in the locator housing, including a plurality of antenna arrays and a receiver circuit coupled thereto. The plurality of antenna arrays includes at least a first antenna array located at a first position and a second antenna array located at a second position, spatially separated from the first position. Such a front end subsystem is configured to receive, simultaneously at the first position and the second position, one or more ambient electromagnetic signals. The ambient electromagnetic signals may include, for example, a combination of a direct magnetic field signal emitted from a radio transmitting antenna, and an induced magnetic field signal emitted from the buried conductor upon electromagnetic coupling of the direct magnetic field signal to the buried conductor. Further, the buried utility locator includes a processing element, disposed in the locator housing and coupled to the front end subsystem. The processing element is programmed to process a first measurement of the ambient electromagnetic signals at the first position, and a second measurement of the ambient electromagnetic signals at the second position, and determine, based at least in part on the first measurement and the second measurement, information pertaining to the buried conductor. The determined information pertaining to the buried conductor may be stored in a non-transitory memory coupled to the processing element.

According to another embodiment, a method for determining information associated with a buried conductor using a buried utility locator is described, which includes receiving, simultaneously at a first antenna array and a second antenna array, spatially separated from the first antenna array, within a buried utility locator, one or more ambient electromagnetic signals. The method further includes processing, at a processing element within the buried utility locator, a first measurement of the ambient electromagnetic signals received at the first antenna array, and a second measurement of the ambient electromagnetic signals received at the spatially separated second antenna array, and determining, based at least in part on the first measurement and the second measurement, information pertaining to the buried conductor, which may be stored in a non-transitory memory associated with the buried utility locator.

According to yet another embodiment, a method for determining information associated with a buried conductor using a buried utility locator is described, which includes receiving, simultaneously at a plurality of spatially separated antenna arrays of a buried utility locator, one or more ambient electromagnetic signals at a first location of a buried utility locator on a ground surface above a buried conductor, and further receiving, simultaneously at the plurality of spatially separated antenna arrays, one or more ambient electromagnetic signals at a second location of the buried utility locator on the ground surface above the buried conductor, wherein the second location is different from the first location. The method further includes processing, in a processing element of the buried utility locator, a first set of measurements of the ambient electromagnetic signals received by the plurality of spatially separated antenna arrays at the first location, and a second set of measurements of the ambient electromagnetic signals received by the plurality of spatially separated antenna arrays at the second location, and determining, based in part on the first set of measurements and the second set of measurements, information associated with the buried conductor, which may be stored in a non-transitory memory coupled to the buried utility locator.

The term 'locate information' or 'information pertaining to buried utilities/conductors', as used herein, may include, but is not limited to, the presence or absence, position, depth, current flow magnitude, phase, and/or direction, and/or orientation of underground utility lines and/or other conductors. Such locate information may further include information about soil properties, other changes in properties of pipes or other conductors in time and/or space, quality metrics of measured data, and/or other aspects of the utility line and broadcast signals and/or the locate environment.

In the various embodiments herein, broadcast signals may refer to the radiation of electromagnetic energy from remote transmission sources measureable within the locate area, typically at two or more points. Typical embodiments use broadcast signals from commercial radio broadcast transmitter/systems such as the AM radio broadcast transmitter in the United States, however, other transmitted radio signals may be used in alternate embodiments. In one example, an AM broadcast radio tower used by a commercial AM radio station may transmit a radio signal from a distance that is measureable within the locate operation area. At a distance from the radio antenna, the magnetic fields from the transmit antenna may be substantially uniform (absent interfering signals). Within a locate operation where broadcast signals have such a uniform field, such as those with AM radio broadcast signals in the far field or where the field is otherwise relatively uniform, a measured change in the magnetic field signal vectors at different points within the locate area may be small (e.g., when in the absence of an interfering signal such as that caused by a reradiating signal from coupling of the broadcast signal to a conductive utility line or other conductive element relative to the distance to the signal's transmission source).

For example, distance between locator measurements may be made at sub-meter distances, whereas the distance to the AM radio antenna tower or other transmission source may be multiple kilometers. In an area having a uniform above-ground magnetic field generated by the broadcast station (also denoted as a first magnetic field or direct magnetic field), the field measurements, absent underground utilities or other conductors, may be substantially constant across a measurement area that is small relative to the distance to the radio station. Conversely, when buried utilities or other conductors are present, currents may be induced in them by coupling from the broadcast signal and consequently re-radiated (also denoted as a second magnetic field or induced magnetic field), generating a second magnetic field that, in combination with the first magnetic field (also denoted in combination as the superposition or combined field), varies across the locate area, in magnitude and/or direction (the magnetic field from the broadcast signal is assumed to be a substantially uniform vector field wherein the magnetic field from the buried utility is typically a cylindrical field about one or more conductors). By detecting and processing these field measurements at multiple points, information about the buried utility and/or other conductors, the ground environment, and other parameters associated with the characteristics of the locate environment and magnetic field signals may be determined.

In various systems, devices, and method embodiments as disclosed herein, one or more broadcast signals may be AM broadcast radio signals. In some embodiments, some or all broadcast signals may come from other signal transmitting sources besides AM radio broadcast signals, and the invention is not intended to be limited to standard AM broadcast signaling or associated AM broadcast frequencies. Other radio environments having similar above ground electromagnetic properties and electromagnetic coupling properties to utilities or other conductors may alternately advantageously use embodiments of the disclosures herein.

Within the various devices, systems, and methods herein, the location of the utility locator may be known or determined. For example, global navigation satellite systems (GNSS/GPS), and/or inertial navigation systems (INS), and/or other terrestrial position/navigation systems or other navigational systems (e.g., ground tracking systems as described in Applicant's co-assigned applications) may be included in a utility locator so that broadcast signal measurements collected by the locator may be associated or mapped to a particular geographic location and its absolute position coordinates (e.g., in latitude/longitude or other formats). Furthermore, the location and/or general direction to the broadcast signal transmission source may be known or determined relative to the location and orientation of the utility locator. For example, the utility locator may include a database containing locations of known AM radio broadcast towers and their associated operating frequencies.

The term "signals" as used herein may refer to the radiation of electromagnetic energy, and in particular to the associated magnetic field vectors. Within the present disclosure, such signals may be ambient electromagnetic signals including direct broadcast signals/first magnetic field signal/direct magnetic field signal, and the reradiated signal/second magnetic field signal/induced magnetic field signal reradiating electromagnetic energy from the broadcast signal(s) that is coupled to a conductive utility line and/or conductive element, and/or the superposition of broadcast signals and reradiated signals. Gradients may be determined from measurements of one or more such signals.

Within the various embodiments herein, at least one broadcast signal having an orthogonal component to the direction between the signal's transmission source and the orientation of the conductive utility line may exist for coupling of electromagnetic signal to occur. In various embodiments, broadcast signals may originate from multiple sources and corresponding transmit antennas, which may be spaced-apart (e.g. about 30 degrees to 120 degrees) in varied directions, thus allowing for coupling of signals to utility lines and/or other conductive elements in various orientations within the ground and thereby resulting in a broader possible search pattern. The systems, methods, and devices in keeping with the present disclosure may be configured to measure multiple broadcast signals from multiple directions simultaneously, including directions with an orthogonal component between transmission source direction and utility line orientation.

Determining of gradients may include measuring of signals at two or more points and comparing the measured signal values. For instance, the measured value of broadcast signals and/or reradiated signals and/or the superposition of the two at different antenna arrays concurrently at a single location, at different points in time and locations within the locate environment, and/or a combination thereof may yield gradient measurements. In yet further methods and associated devices and systems in keeping with the present disclosure, gradients may be determined through tensor derivatives of a signal's magnetic field vector. The various gradient measurements may, as further discussed subsequently herein, be used to determine the presence or absence of underground utility lines and/or other locate information.

Gradient measurements may be determined through concurrent measurements of various different measureable aspects of broadcast signals, reradiated signals from a conductive element, and/or the superposition of reradiated signals and broadcast signals. In some such methods and associated utility locators, gradients may be determined through comparison of such signal measurements from a single point in time. For instance, changes in measureable aspects of signals at two or more antennas or antenna arrays at the same point in time may be used to determine such gradients. Such aspects of signals resulting in gradients from concurrent signal measurement methods and utility locators may include, but should not be limited to, B-field vector magnitude and/or direction measurements, phase measurements, and/or other measureable aspects of signals.

Embodiments of the present disclosure include methods and associated buried utility locators configured to concurrently measure aspects of signals associated with and for the purposes of determining vertical field gradients. Vertical field gradients may be defined herein as the difference in signal measurements along spatially separated locations of a shared vertical axis of a utility locator. Such vertical gradient information may result from differences in measurements of reradiating signal or signals from one or more buried utility lines and/or other conductive objects. For instance, comparison of B-field magnitudes calculated at each antenna array on a utility locator at the same point in time may result in a value beyond a predetermined threshold and further indicate the presence or absence and/or other locate information of conductive utility lines at the measured location.

Embodiments of the present disclosure also include methods and associated utility locators configured to concurrently measure aspects of signals associated with and for the purposes of determining shearing gradients. A shearing gradient, as used herein, may be defined as the measured change in azimuthal angle. As further defined herein, an 'azimuthal angle' may be the angle measured in the horizontal plane between the forward facing direction of the utility locator and the measured field in the horizontal plane from the transmission source of each measured broadcast signal. For instance, a utility locator may determine azimuthal angle from measurements of B-field vectors. In the absence of interference to the broadcast signal, azimuthal angle may correlate to the angle direction towards the transmission source. In contrast, interference to the broadcast signal, such as that caused by the superposition of reradiating signals from a conductive utility line and broadcast signal, may cause a change in azimuthal angle measurement such that the azimuthal angle may no longer correlate to the angle direction of the transmission source. In some method embodiments, a shearing gradient may be calculated by comparison of azimuthal angle measurements at different antenna arrays at the same point in time. In yet further method embodiments, shearing gradients may be determined through ratios of measured azimuthal angle to the true transmission source direction where the broadcast signal transmission source direction is known.

Embodiments of the present disclosure also include methods and associated utility locators configured to determine gradients from tensor derivatives of a signal's magnetic field vector, referred to hereafter as "gradient tensors". Such gradient tensors of a signal or signals generating a magnetic field will reflect the local linear change in magnetic field in three dimensions with respect to infinitesimal displacement in three dimensions. These gradient tensors may be both traceless, such that diagonals of the resultant three by three tensor may sum to zero, and symmetric, such that off-diagonal values are equal to their opposing counterparts. Such gradient tensors could be determined for uniform magnetic fields, such as AM radio signals, cylindrical magnetic fields, such as those generated by buried utilities, or other magnetic field types including superposition fields.

Embodiments of the present disclosure also include antenna arrays configured to measure and determine gradient tensor measurements. Such antenna arrays may be included within the various utility locators discussed herein.

Embodiments of the present disclosure also include methods and associated utility locators configured to determine gradients from various measureable aspects of broadcast signals, reradiated signals from a conductive element, and/or the superposition of reradiated signals and broadcast signals at different points in time and at different locations within the locate environment. For instance, measurement of signals at a first location may be compared to the same measurements of the same signal aspects at a second location resulting in gradient measurements. Such aspects of signals resulting in gradients from non-concurrent signal measurement methods and utility locators may include, but should not be limited to, B-field vector magnitude measurements at each location, phase measurements, and/or other measureable aspects of signals.

Embodiments of the present disclosure also include methods and associated utility locators configured to measure phase of signals at two or more locations at non-concurrent points in time. In such a method, the comparison of non-concurrent phase measurements at two or more locations may be used to determine the presence or absence of utility lines and/or other locate information. For instance, a change in phase measured at an antenna array between two locations beyond a predetermined threshold may indicate the presence or absence and/or other locate information of conductive utility lines at the measured location.

Embodiments of the present disclosure also include methods and associated utility locators configured to measure B-vector magnitudes of signals at two or more locations at non-concurrent points in time. In such a method, the comparison of non-concurrent B-vector magnitude measurements at two or more locations may be used to determine the presence or absence of utility lines and/or other locate information. For instance, a change in B-field magnitudes measured at an antenna array between two locations beyond a predetermined threshold may indicate the presence or absence and/or other locate information of conductive utility lines at the measured location.

Embodiments of the present disclosure also include methods and associated utility locators configured to compare two or more gradients from concurrent signal measurement methods determined at different locations and different points in time within the locate operation and/or gradient tensors and/or individual component measurements of gradient tensors. In such a gradient of gradients method, the comparison of a first gradient or gradients from concurrent signal measurement methods and/or gradient tensor methods at a first location may be compared to a corresponding gradient or gradients from the same concurrent signal measurement methods and/or gradient tensor methods at a second location at a different point in time. Within such a gradient of gradients method, any measured change beyond a predetermined threshold may indicate the presence or absence and/or other locate information of conductive utility lines at the measured location.

In some locating methods, known location of broadcast signal transmission source locations and utility locator locations may allow for modeling of predicted broadcast signals and determining utility information from comparing model values to that of measured broadcast signals.

Embodiment of the present disclosure also include methods for utilizing broadcast signals as a radio direction finder (RDF) system for navigating and/or determining position and/or orientation of the utility locator and/or correcting inertial navigation system information or other positional sensor data. Utility locators used with such methods may include GNSS, GPS, INS, precise gyroscopic sensors, and/or other position and navigation determining sensors.

Embodiments of the present disclosure also include methods for automating, displaying, and/or otherwise communicating the utility information to the user. Such methods may include graphical representations of the utility line or lines that may appear on a utility locator screen, computing devices, and/or other system devices.

Mapping methods and devices herein may utilize a heat mapping type scheme whereby a hierarchy of gradient and/or gradient tensor values may be represented by color, shading, patterns, and/or other representation of measured gradients at locations within the map.

Embodiments of the present disclosure also include one or more broadcast signal marker devices also referred to herein as "marker devices". Such broadcast signal marker devices may, when excited by one or more broadcast signals, radiate electromagnetic signal or signals measureable at a utility locator. Measurement of signals from such broadcast signal marker devices may be further used to determine the broadcast signal marker device's location.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 1C is a partial view illustration of the broadcast signal locating operation from FIG. 1A detailing vertical field gradient measurement.

DETAILED DESCRIPTION OF EMBODIMENTS

Terminology

Figure 1A:
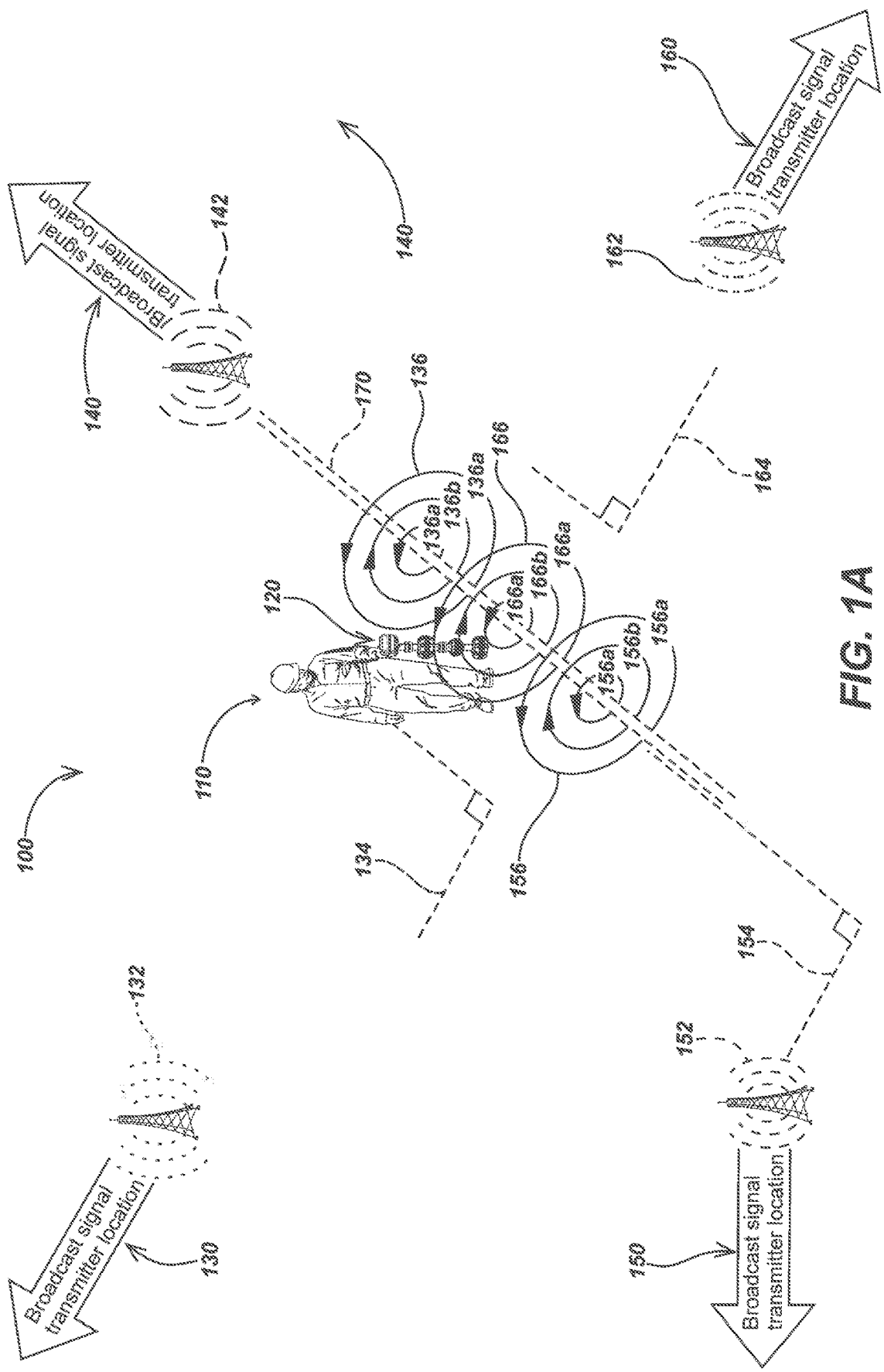
FIG. 1A is an illustration of a broadcast signal locating operation.

As used herein, the terms "utility locators", "buried object locators", "utility locators", and "locators" may refer to devices for sensing and measuring 'signals' or radiation of electromagnetic energy. The utility locators herein may further process the received signals to determine information about hidden or buried conductors (e.g., underground utilities such as pipes, conduits, or cables) and the associated underground environment. The terms "locate operation" or "locate" as used herein may refer to one or more processes or methods, which may involve the use of one or more buried object locators to measure one or more electromagnetic signals to determine various information regarding the locate area. Such information, notated herein as "locate information", may include, but is not limited to, using electromagnetic signal measurements to determine the presence or absence, position, depth, and/or orientation of underground utility lines and/or other conductors. Such locate information may further include changes in soil properties, other changes in properties of pipes or other conductors in time and/or space, quality metrics of measured data, azimuthal angles, measures of frequency, signal strength, and phase, and/or other aspects of the utility line and broadcast signals and/or locate environment.

The term "position" as used herein, may refer to a location within three dimensional space as well as an "orientation" or "pose" that may describe the direction and tilt at that location.

The terms "broadcast signal" and "remote broadcast signal" as used herein may refer to the radiation of electromagnetic energy from one or more remote transmission sources measureable at the utility locator. Exemplary broadcast signals may include, but are not limited to, AM radio broadcast signals, military/government radio broadcast signals, and/or other electromagnetic signals with an approximately uniform field within the locate environment.

The broadcast signal or broadcast signals discussed herein may have a "uniform field". A "uniform field" may be defined herein as a signal's field where measured change between points within the locate may be small and determinable when in the absence of a reradiating signal from coupling of the broadcast signal to a utility line or other conductive element and/or other interference. Measured points within the locate operation may be a small distance apart relative to the distance to a signal's transmission source. For instance, distance between broadcast signal measurements may occur at sub-meter distances whereas the distance to the AM radio tower or other transmission source may be multiple kilometers.

The term "reradiated signal" may refer to the radiation of electromagnetic energy from a conductor that has been excited by one or more broadcast signals. The superposition of broadcast signals and reradiated signals may result in a non-uniform field measured at the utility locator. The utility locators and methods as discussed herein may be configured to measure and process broadcast signals, reradiated signals, and/or the superposition of broadcast and reradiated signals.

The terms "gradient" or "gradient measurements" may refer to values representing a change in measured signal or signals. For instance, gradients may be determined by comparison of signal measurements at two or more points in time and/or in space. Gradients may result from a variety of measureable aspects of signals. For instance, measurements of phase, B-field vector and/or B-field vector component magnitudes, B-field vector directions or orientations, and/or other measureable aspects of signals may be used to determine gradients. Furthermore, such comparisons or differences in measured values may be achieved through the use of ratios, subtraction, and/or other known comparative or mathematic operations or methods.

The terms "local vertical field gradients", "vertical field gradients", or "vertical gradients" may refer to the difference in electromagnetic signal measured at spatially separated locations along a shared vertical axis of a utility locator. Such vertical gradient information may be measured from reradiated signals from one or more buried utility lines and/or other conductive objects. The term "azimuthal angle" as used herein refers to the angle measured in the horizontal plane between the forward facing direction of the utility locator to the measured field from the transmission source of each measured broadcast signal (B-field direction). The azimuthal angle may be a "local azimuthal angle" geocentric to the utility locator or a "world azimuthal angle" relative to geospatial or cardinal directions of the Earth. A "shearing gradient" may be calculated from differences in azimuthal angles measured at different points in time or space. For instance, azimuthal angle measurements at different antennas on the same utility locator and/or at different points in time at the same antenna may be used to calculate such a shearing gradient. In some embodiments, such gradients may also be determined through ratios of measured azimuthal angle and the true transmission source direction where the location of broadcast signal transmission source is known.

The term "gradient tensor" may refer to the tensor derivative of a magnetic vector field. As used herein, such gradient tensors and/or tensor components thereof may be used to determine locate information.

Overview

This disclosure relates generally to utility locators, systems, and methods used for locating utility lines, pipes, and/or other conductors that are obscured from view using broadcast signal measurements. In such systems, devices, and methods, broadcast signal measurements may directly and/or indirectly be used to determine locate information. For instance, measurements of broadcast signals, the reradiation of electromagnetic energy generated from the broadcast signal or signals coupling to a conductive utility line and/or conductive element, and/or the superposition of broadcast signals and reradiated signals may be used to determine various gradients. Gradients may further be used to determine locate information such as, but not limited to, the presence or absence, position, depth, and/or orientation of the underground utility or utilities and/or other conductors. Such locate information may further include changes in soil properties in time and/or space, changes in properties of pipes or other conductors in time and/or space, quality metrics of measured data, and/or other aspects of the utility line and/or locate environment.

The disclosures herein may be combined in various additional embodiments with elements, systems and methods as described in co-assigned patents and patent applications, including transmitter and locator devices and associated apparatus, systems, and methods disclosed in U.S. Pat. No. 7,009,399, issued Mar. 7, 2006, entitled Omnidirectional Sonde and Line Locator; U.S. Pat. No. 7,136,765, issued Nov. 14, 2006, entitled A Buried Object Locating and Tracing Method and System Employing Principal Components Analysis for Blind Signal Detection; U.S. Pat. No. 7,221,136, issued May 22, 2007, entitled Sondes for Locating Underground Pipes and Conduits; U.S. Pat. No. 7,276,910, issued Oct. 2, 2007, entitled Compact Self-Tuned Electrical Resonator for Buried Object Locator Applications; U.S. Pat. No. 7,288,929, issued Oct. 30, 2007, entitled Inductive Clamp for Applying Signal to Buried Utilities; U.S. Pat. No. 7,298,126, issued Nov. 20, 2007, entitled Sondes for Locating Underground Pipes and Conduits; U.S. Pat. No. 7,332,901, issued Feb. 19, 2008, entitled Locator with Apparent Depth Indication; U.S. Pat. No. 7,336,078, issued Feb. 26, 2008, entitled Multi-Sensor Mapping Omni-Directional Sonde and Line Locators; U.S. Pat. No. 7,443,154, issued Oct. 28, 2008, entitled Multi-Sensor Mapping Omnidirectional Sonde and Line Locator; U.S. Pat. No. 7,498,797, issued Mar. 3, 2009, entitled Locator with Current-Measuring Capability; U.S. Pat. No. 7,498,816, issued Mar. 3, 2009, entitled Omnidirectional Sonde and Line Locator; U.S. Pat. No. 7,518,374, issued Apr. 14, 2009, entitled Reconfigurable Portable Locator Employing Multiple Sensor Arrays Having Flexible Nested Orthogonal Antennas; U.S. Pat. No. 7,557,559, issued Jul. 7, 2009, entitled Compact Line Illuminator for Locating Buried Pipes and Cables; U.S. Pat. No. 7,619,516, issued Nov. 17, 2009, entitled Single and Multi-Trace Omnidirectional Sonde and Line Locators and Transmitter Used Therewith; U.S. Pat. No. 7,733,077, issued Jun. 8, 2010, entitled Multi-Sensor Mapping Omnidirectional Sonde and Line Locators and Transmitter Used Therewith; U.S. Pat. No. 7,741,848, issued Jun. 22, 2010, entitled Adaptive Multichannel Locator System for Multiple Proximity Detection; U.S. Pat. No. 7,755,360, issued Jul. 13, 2010, entitled Portable Locator System with Jamming Reduction; U.S. Pat. No. 7,825,647, issued Nov. 2, 2010, entitled Method for Locating Buried Pipes and Cables; U.S. patent application Ser. No. 12/939,591, filed Nov. 4, 2010, entitled SMART PERSONAL COMMUNICATION DEVICES AS USER INTERFACES; U.S. Pat. No. 7,830,149, issued Nov. 9, 2010, entitled An Underground Utility Locator with a Transmitter, a Pair of Upwardly Opening Pockets and Helical Coil Type Electrical Cords; U.S. patent application Ser. No. 12/947,503, filed Nov. 16, 2010, entitled IMAGE-BASED MAPPING LOCATING SYSTEM; U.S. Pat. No. 7,863,885, issued Jan. 4, 2011, entitled Sondes for Locating Underground Pipes and Conduits; U.S. Pat. No. 7,948,236, issued May 24, 2011, entitled Adaptive Multichannel Locator System for Multiple Proximity Detection; U.S. Pat. No. 7,969,151, issued Jun. 28, 2011, entitled Pre-Amplifier and Mixer Circuitry for a Locator Antenna; U.S. patent application Ser. No. 13/189,844, filed Jul. 25, 2011, entitled BURIED LOCATOR SYSTEMS AND METHODS; U.S. Pat. No. 7,990,151, issued Aug. 2, 2011, entitled Tri-Pod Buried Locator System; U.S. Pat. No. 8,013,610, issued Sep. 6, 2011, entitled High Q Self-Tuning Locating Transmitter; U.S. Pat. No. 8,035,390, issued Oct. 11, 2011, entitled Omnidirectional Sonde and Line Locator; U.S. Pat. No. 8,106,660, issued Jan. 31, 2012, entitled Sonde Array for Use with Buried Line Locators; U.S. patent application Ser. No. 13/493,883, issued Jun. 11, 2012, entitled MAGNETIC SENSING BURIED OBJECT LOCATOR INCLUDING A CAMERA; U.S. Pat. No. 8,203,343, issued Jun. 19, 2012, entitled Reconfigurable Portable Locator Employing Multiple Sensor Array Having Flexible Nested Orthogonal Antennas; U.S. patent application Ser. No. 13/584,799, issued Aug. 13, 2012, entitled BURIED OBJECT LOCATOR SYSTEMS AND METHODS; U.S. Pat. No. 8,248,056, issued Aug. 21, 2012, entitled Buried Object Locator System Employing Automated Virtual Depth Event Detection and Signaling; U.S. patent application Ser. No. 13/602,303, filed Sep. 3, 2012, entitled WIRELESS BURIED PIPE AND CABLE LOCATING SYSTEMS; U.S. patent application Ser. No. 13/605,960, filed Sep. 6, 2012, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled System and Method for Locating Buried Pipes and Cables with a Man Portable Locator and a Transmitter in a Mesh Network; U.S. patent application Ser. No. 13/676,989, filed Nov. 14, 2012, entitled QUAD-GRADIENT COILS FOR USE IN LOCATING SYSTEMS; U.S. patent application Ser. No. 13/677,223, filed Nov. 14, 2012, entitled MULTI-FREQUENCY LOCATING SYSTEMS AND METHODS; U.S. patent application Ser. No. 13/769,202, filed Feb. 15, 2013, entitled SMART PAINT STICK DEVICES AND METHODS; U.S. patent application Ser. No. 13/774,351, filed Feb. 22, 2013, entitled DOCKABLE TRIPODAL CAMERA CONTROL UNIT; U.S. patent application Ser. No. 13/793,168, filed Mar. 3, 2013, entitled BURIED OBJECT LOCATORS WITH CONDUCTIVE ANTENNA BOBBINS; U.S. patent application Ser. No. 13/787,711, filed Mar. 6, 2013, entitled DUAL SENSED LOCATING SYSTEMS AND METHODS; U.S. Pat. No. 8,400,154, issued Mar. 19, 2013, entitled Locator Antenna with Conductive Bobbin; U.S. patent application Ser. No. 13/850,181, filed Mar. 25, 2013, entitled GRADIENT ANTENNA COILS AND ARRAYS FOR USE IN LOCATING SYSTEMS; U.S. patent application Ser. No. 13/851,951, filed Mar. 27, 2013, entitled DUAL ANTENNA SYSTEMS WITH VARIABLE POLARIZATION; U.S. patent application Ser. No. 13/894,038, filed May 14, 2013, entitled OMNI-INDUCER TRANSMITTING DEVICES AND METHODS; U.S. patent application Ser. No. 13/958,492, filed Aug. 2, 2013, entitled OPTICAL ROUND TRACKING APPARATUS, SYSTEMS AND METHODS; U.S. patent application Ser. No. 14/022,067, filed Sep. 9, 2013, entitled USER INTERFACES FOR UTILITY LOCATORS; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. patent application Ser. No. 14/080,582, filed Nov. 14, 2013, entitled MULTI-FREQUENCY LOCATING SYSTEMS AND METHODS; U.S. Pat. No. 8,547,428, issued Oct. 1, 2013, entitled Pipe Mapping System; U.S. patent application Ser. No. 14/053,401, filed Oct. 14, 2013, entitled BURIED OBJECT LOCATING DEVICES AND METHODS; U.S. patent application Ser. No. 14/148,649, filed Jan. 6, 2014, entitled MAPPING LOCATING SYSTEMS AND METHODS; U.S. patent application Ser. No. 14/154,128, filed Jan. 13, 2014, entitled UTILITY LOCATOR SYSTEMS AND METHODS; U.S. Pat. No. 8,635,043, issued Jan. 21, 2014, entitled Locator and Transmitter Calibration System; U.S. patent application Ser. No. 14/179,538, filed Feb. 12, 2014, entitled OPTICAL GROUND TRACKING APPARATUS, SYSTEMS, AND METHODS; U.S. patent application Ser. No. 14/207,502, filed Mar. 12, 2014, entitled GRADIENT ANTENNA COILS AND ARRAYS FOR USE IN LOCATING SYSTEMS; U.S. patent application Ser. No. 14/210,251, filed Mar. 13, 2014, entitled MULTI-FREQUENCY LOCATING SYSTEMS AND METHODS; U.S. patent application Ser. No. 14/210,291, filed Mar. 13, 2014, entitled OMNI-INDUCER TRANSMITTING DEVICES AND METHODS; U.S. patent application Ser. No. 14/214,051, filed Mar. 14, 2014, entitled GROUND-TRACKING SYSTEMS AND APPARATUS; U.S. patent application Ser. No. 14/214,151, filed Mar. 14, 2014, entitled DUAL ANTENNA SYSTEMS WITH VARIABLE POLARIZATION; U.S. patent application Ser. No. 14/214,263, filed Mar. 14, 2014, entitled USER INTERFACES FOR UTILITY LOCATORS; U.S. patent application Ser. No. 14/215,290, filed Mar. 17, 2014, entitled SONDE DEVICES INCLUDING A SECTIONAL FERRITE CORE; U.S. patent application Ser. No. 14/229,813, filed Mar. 28, 2014, entitled UTILITY LOCATOR TRANSMITTER APPARATUS AND METHODS; U.S. Pat. No. 8,717,028, issued May 6, 2014, entitled Spring Clips for Use with Locating Transmitters; U.S. patent application Ser. No. 14/321,699, filed Jul. 1, 2014, entitled UTILITY LOCATOR APPARATUS, SYSTEMS, AND METHODS; U.S. Pat. No. 8,773,133, issued Jul. 8, 2014, entitled Adaptive Multichannel Locator System for Multiple Proximity Detection; U.S. patent application Ser. No. 14/332,268, filed Jul. 15, 2014, entitled UTILITY LOCATOR TRANSMITTER DEVICES, SYSTEMS, AND METHODS WITH DOCKABLE APPARATUS; U.S. patent application Ser. No. 14/446,145, filed Jul. 29, 2014, entitled UTILITY LOCATING SYSTEMS WITH MOBILE BASE STATION; U.S. patent application Ser. No. 14/446,279, filed Jul. 29, 2014, entitled INDUCTIVE CLAMP DEVICES, SYSTEMS, AND METHODS; U.S. Pat. No. 8,841,912, issued Sep. 23, 2014, entitled Pre-Amplifier and Mixer Circuitry for a Locator Antenna; U.S. patent application Ser. No. 14/516,558, filed Oct. 16, 2014, entitled ELECTRONIC MARKER DEVICES AND SYSTEMS; U.S. patent application Ser. No. 14/580,097, filed Dec. 22, 2014, entitled NULLED-SIGNAL LOCATING DEVICES, SYSTEMS, AND METHODS; U.S. Provisional Patent Application 62/107,985, filed Jan. 26, 2015, entitled SELF-STANDING MULTI-LEG ATTACHMENT DEVICES FOR USE WITH UTILITY LOCATORS; U.S. patent application Ser. No. 14/709,301, filed May 11, 2015, entitled PIPE MAPPING SYSTEMS AND METHODS; U.S. Pat. No. 9,041,794, issued May 26, 2015, entitled Pipe Mapping Systems and Methods; U.S. patent application Ser. No. 14/733,810, filed Jun. 8, 2015, entitled ECONOMICAL MAGNETIC LOCATOR APPARATUS AND METHODS; U.S. Pat. No. 9,057,754, issued Jun. 16, 2015, entitled Economical Magnetic Locator Apparatus and Method; U.S. patent application Ser. No. 14/752,834, filed Jun. 27, 2015, entitled GROUND TRACKING APPARATUS, SYSTEMS, AND METHODS; U.S. patent application Ser. No. 14/797,760, filed Jul. 13, 2015, entitled HAPTIC DIRECTIONAL FEEDBACK HANDLES FOR LOCATING DEVICES; U.S. patent application Ser. No. 14/797,840, filed Jul. 13, 2015, entitled GROUND-TRACKING DEVICES AND METHODS FOR USE WITH A UTILITY LOCATOR; U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled Ground-Tracking Devices for Use with a Mapping Locator; U.S. Pat. No. 9,082,269, issued Jul. 14, 2015, entitled Haptic Directional Feedback Handles for Location Devices; U.S. patent application Ser. No. 14/800,490, filed Jul. 15, 2015, entitled UTILITY LOCATOR TRANSMITTER DEVICES, SYSTEMS, AND METHODS WITH SATELLITE AND MAGNETIC FIELD SONDE ANTENNA SYSTEMS; U.S. patent application Ser. No. 14/802,791, filed Jul. 17, 2015, entitled METHODS AND SYSTEMS FOR SEAMLESS TRANSITIONING IN INTERACTIVE MAPPING SYSTEMS; U.S. Pat. No. 9,085,007, issued Jul. 21, 2015, entitled Marking Paint Applicator for Portable Locator; U.S. Provisional Patent Application 62/209,824, filed Aug. 25, 2015, entitled COMBINED PASSIVE AND ACTIVE UTILITY LOCATING DEVICES, SYSTEMS, AND METHODS; United States Provisional Patent Application 62/244,658, filed Oct. 21, 2015, entitled SIGNAL KEYING UTILITY LOCATING DEVICES, SYSTEMS, AND METHODS; U.S. patent application Ser. No. 14/949,868, filed Nov. 23, 2015, entitled BURIED OBJECT LOCATOR APPARATUS AND SYSTEMS; U.S. Provisional Patent Application 62/260,199, filed Nov. 25, 2015, entitled UTILITY LOCATING SYSTEMS, DEVICES, AND METHODS USING RADIO BROADCAST SIGNALS; U.S. patent application Ser. No. 15/006,119, filed Jan. 26, 2016, entitled SELF-STANDING MULTI-LEG ATTACHMENT DEVICES FOR USE WITH UTILITY LOCATORS; U.S. Provisional Patent Application 62/295,502, filed Feb. 16, 2016, entitled BURIED UTILITY MARKER DEVICES, SYSTEMS, AND METHODS; U.S. Provisional Patent Application 62/307,365, filed Mar. 11, 2016, entitled UTILITY LOCATOR SUPPORT STRUCTURES; U.S. Provisional Patent Application 62/327,412, filed Feb. 25, 2016, entitled SYSTEMS AND METHODS FOR LOCATING AND/OR BURIED UTILITIES USING VEHICLE MOUNTED LOCATING DEVICES; U.S. patent application Ser. No. 15/150,208, filed May 9, 2016, entitled OPTICAL GROUND TRACKING APPARATUS, SYSTEMS, AND METHODS; U.S. Pat. No. 9,341,740, issued May 17, 2016, entitled Optical Ground Tracking Apparatus, Systems, and Methods; U.S. Provisional Patent Application 62/350,147, filed Jun. 14, 2016, entitled TRACKABLE DIPOLE DEVICES, METHODS, AND SYSTEMS FOR USE WITH MARKING PAINT STICKS; U.S. patent application Ser. No. 15/187,785, filed Jun. 21, 2016, entitled BURIED UTILITY LOCATOR GROUND TRACKING APPARATUS, SYSTEMS, AND METHODS; U.S. Provisional Patent Application 62/352,731, filed Jun. 21, 2016, entitled SYSTEMS AND METHODS FOR UNIQUELY IDENTIFYING BURIED UTILITIES IN A MULTI-UTILITY ENVIRONMENT; U.S. Pat. No. 9,372,117, issued Jun. 21, 2016, entitled Optical Ground Tracking Methods and Apparatus for Use with Buried Utility Locators; U.S. patent application Ser. No. 15/225,623, filed Aug. 1, 2016, entitled SONDE-BASED GROUND-TRACKING APPARATUS AND METHODS; U.S. patent application Ser. No. 15/225,721, filed Aug. 1, 2016, entitled SONDES AND METHODS FOR USE WITH BURIED LINE LOCATOR SYSTEMS; U.S. Pat. No. 9,411,067, issued Aug. 9, 2016, entitled Ground-Tracking Systems and Apparatus; U.S. Pat. No. 9,411,066, issued Aug. 9, 2016, entitled Sondes and Methods for use with Buried Line Locator Systems; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. patent application Ser. No. 15/250,666, filed Aug. 29, 2016, entitled PHASE-SYNCHRONIZED BURIED OBJECT TRANSMITTER AND LOCATOR METHODS AND APPARATUS; U.S. patent application Ser. No. 15/269,702, filed Sep. 19, 2016, entitled OMNI-INDUCER TRANSMITTING DEVICES AND METHODS; and U.S. Pat. No. 9,435,907, issued Sep. 6, 2016, entitled Phase Synchronized Buried Object Locator Apparatus, Systems, and Methods. The content of each is incorporated by reference herein in its entirety for all purposes.

The above applications may be collectively denoted herein as the "co-assigned applications" or "incorporated applications."

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

In one aspect, the disclosure relates to a utility locator configured to determine its own location (e.g. GNSS, GPS, INS, and/or other position determining sensors and systems) and/or the location of broadcast signal transmission sources (e.g. database containing the location of AM radio tower locations for each measureable signal or other transmitter location data).

In another aspect, the disclosure relates to a method for determining gradients from various concurrently measured aspects of broadcast signals, reradiated signals, and/or the superposition of broadcast signals and reradiated signals.

In another aspect, the disclosure relates to a method for determining vertical field gradients from concurrent measurements of reradiating signal or signals at two or more antennas or antenna arrays.

In another aspect, the disclosure relates to a method for determining shearing gradients from concurrent measurements of azimuthal angles at spatially separated antennas or antenna arrays.

In another aspect, the disclosure relates to a method for determining shearing gradients from at least one measurement of azimuthal angles and the true direction toward that signal's transmission source of the same broadcast signal.

In another aspect, the disclosure relates to a method for determining gradient tensors from tensor derivatives of a signal's magnetic field vectors.

In another aspect, the disclosure relates to a method for determining gradients from various non-concurrently measured aspects of broadcast signals, reradiated signals, and/or the superposition of broadcast signals and reradiated signals at two or more locations within the locate area.

In another aspect, the disclosure relates to a method for determining phase gradients from non-concurrent phase measurements.

In another aspect, the disclosure relates to a method for determining B-field vector magnitude gradients from non-concurrent B-field vector magnitude measurements at two or more locations within the locate area.

In another aspect, the disclosure relates to a locating method whereby gradients may be used to determine the presence or absence of a utility line or lines and/or other associated utility information.

In another aspect, the disclosure relates to a method for determining gradients from other gradient measurements.

In another aspect, the disclosure relates to a combined method for using gradient measurements correlated to positional information to determine and map locate information.

In another aspect, this disclosure relates to a heat map type scheme whereby a hierarchy of gradient values may be represented by color, shading, patterns, and/or other representation at measured locations within a map.

In another aspect, the disclosure relates to a method whereby one or more suites or sets of frequencies may be determined based upon measured signal strength of the broadcast signal, determined azimuthal angle, and quantity of available filters within the utility locator.

In another aspect, the broadcast signals as discussed herein may be AM radio broadcast signals. The wide availability of AM radio simultaneously measureable from multiple signal sources from varied directions may allow for a broad search pattern for buried utility lines and/or other conductive elements.

In another aspect, the disclosure may include a method whereby distortion metrics and azimuthal angle measurements may be used to qualify and/or adjust inertial navigation system and/or other positional or navigation measurements within the utility locator. Furthermore, broadcast signals may be used as a radio direction finder (RDF) system for navigating and/or determining position of the utility locator.

In another aspect, this disclosure may include methods for determining the presence or absence of utility lines by comparing measured broadcast signals to that of model predictions of each signal at a known location.

In another aspect, the disclosure relates to antenna and antenna arrays for measuring signal to determine gradient tensor measurements.

In another aspect, the disclosure relates to utility locators equipped with aforementioned antenna arrays for determining gradient tensor measurements.

In another aspect, the disclosure relates to methods for automating, displaying, and/or otherwise communicating the utility information to the user.

In another aspect, the disclosure relates to a broadcast signal marker device for use in locate operations.

Various additional aspects, features, and functions are described below in conjunction with FIGS. 1A through 18 of the appended Drawings.

It is noted as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Locating Systems, Devices, and Methods Using Broadcast Signal Gradients

Figure 1B:
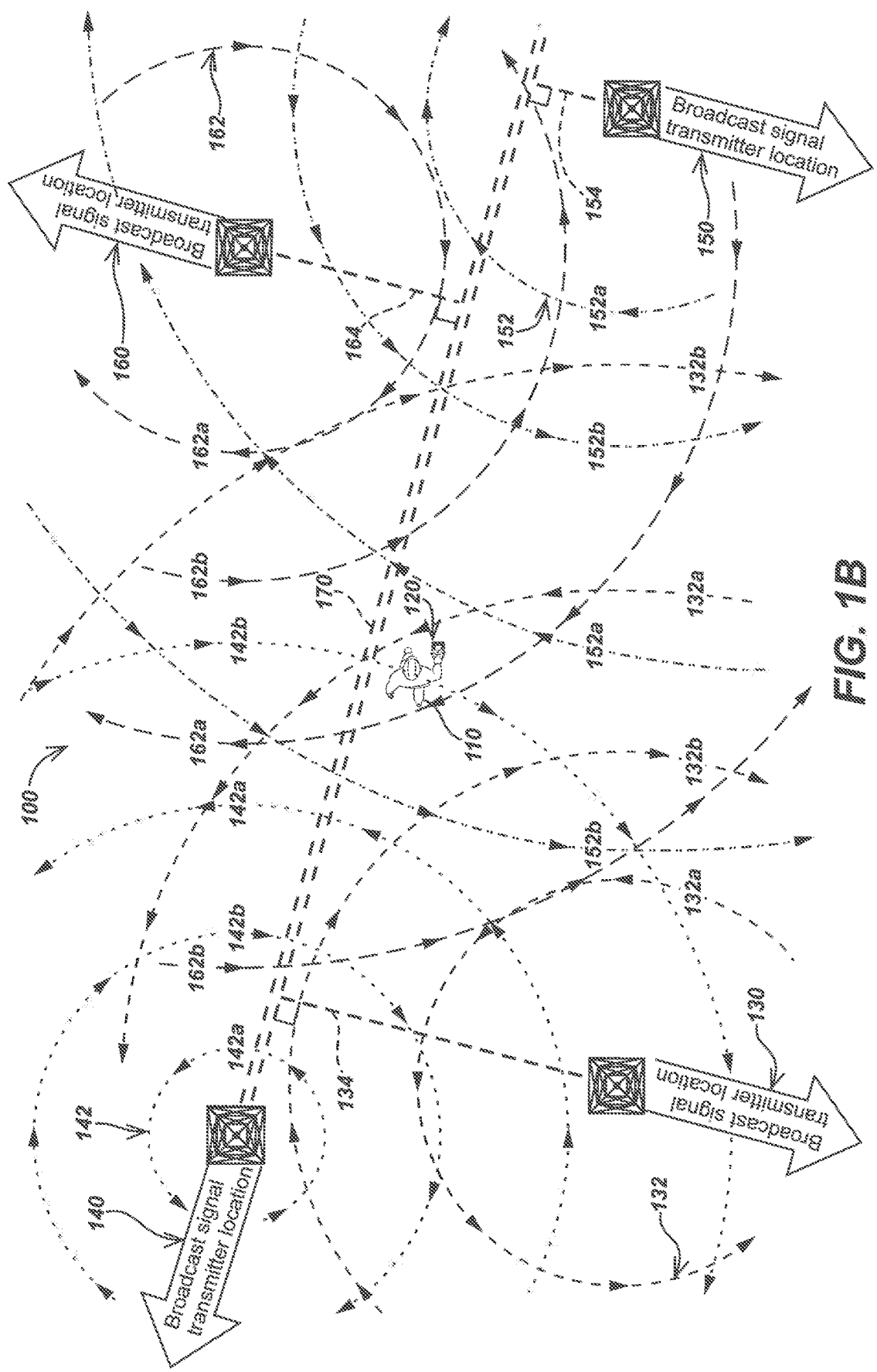
FIG. 1B is an illustration of the broadcast signal locating operation from FIG. 1A from above.

A utility locator in keeping with the present disclosure may be configured to measure broadcast signals and, through differences in such measurements, determine the presence or absence, position, depth, orientation, and/or other locate information of buried utility lines and/or other conductive objects. As illustrated in FIGS. 1A and 1B, an exemplary broadcast signal locate operation 100 may include a user 110 equipped with a utility locator 120 configured to measure broadcast signals from a multitude of remote transmission sources such as broadcast signal transmitters 130, 140, 150, and 160. The broadcast signal transmitters 130, 140, 150, and 160 may each transmit a corresponding signal such as signals 132, 142, 152, and 162. The broadcast signals 132, 142, 152, and 162 may have a relatively uniform field whereby the distance between measured points of each broadcast signal 132, 142, 152 and 162 may be small relative to the distance to their respective broadcast signal transmitter 130, 140, 150, and 160. For exemplary purposes, the broadcast signal transmitters 130, 140, 150, and 160 are illustrated at distances which may be nearer to the locate area and utility locator 120 within FIGS. 1A and 1B as well as various other figures within the present disclosure than they may be in use. For instance, the distance between the points of broadcast signal measurements may occur at sub-meter distances whereas the distance to broadcast signal transmission sources may be multiple kilometers.

Still referring to FIGS. 1A and 1B, where an orthogonal component exists between transmission source direction and a utility line or other conductive elements orientation, a coupling of electromagnetic signal may occur. For instance, broadcast signal transmitters 130, 150, and 160 may have a corresponding orthogonal component 134, 154, and 164 allowing for the coupling of signals 132, 152, and 162 to utility line 170 and reradiation of electromagnetic signals 136, 156, and 166 (FIG. 1A) to occur. As broadcast signal transmitter 140 lacks in such an orthogonal direction component, the corresponding signal 142 may fail to couple to utility line 170 and thereby fail to reradiate a corresponding signal from utility line 170.

Referring to FIG. 1B, each broadcast signal 132, 142, 152 and 162 may further oscillate in polarity such that signal may induce onto conductive utility line 170. The oscillation of each broadcast signal 132, 142, 152 and 162 may be notated within FIG. 1B with change in arrow direction at each illustrated field line as well as addition of suffixes 'a' and 'b' at each line. For instance, 132a may have the opposite polarity as 132b, 142a may have the opposite polarity as 142b, 152a may have the opposite polarity as 152b, and 162a may have the opposite polarity as 162b.

Referring to FIG. 1A, corresponding reradiated signals 136, 156, and 166 may likewise oscillate such that 136a may have the opposite polarity as 136b, 156a may have the opposite polarity as 156b, and 166a may have the opposite polarity as 166b.

Each reradiated signal discussed herein may share a frequency with its corresponding broadcast signal. For instance, broadcast signals 132, 152, and 162 may have the same unique measured frequency as each of their corresponding reradiated signals 136, 156, and 166 (FIG. 1A). Coupling of broadcast signals 132, 152, and 162 may cause a phase shift and/or other measurable differences in the corresponding reradiated signals 136, 156, and 166 (FIG. 1A). Furthermore, various aspect of reradiated signals 136, 156, and 166 (FIG. 1A) may be measurably different along different vertical points of the mast of the utility locator when a superposition of broadcast signals 132, 152, and 162 and reradiated signals 136, 156, and 166 (FIG. 1A) occurs.

Measured changes in various measured aspects of signals may result in gradient values further used to determine the presence or absence, position, orientation, depth of underground utility lines and/or other conductors and/or other locate information. For instance, the measured value of broadcast signals and/or reradiated signals and/or the superposition of the two at different antennas or antenna arrays concurrently at a single location, at different points in time and locations within the locate environment, and/or a combination thereof may yield gradient measurements. In yet further methods and associated devices and systems in keeping with the present disclosure, gradient tensors may be determined through signal measurements occurring at a single point of time and at a single location. Gradient and gradient tensor measurements may, as further discussed subsequently herein, be used to determine the presence or absence of underground utility lines and/or other locate information In some embodiments, gradient measurements used to determine utility information may be from, or may include, concurrently measured broadcast signal values at two or more antenna and/or antenna arrays at one or more utility locators. Such gradient measurements may include, but should not be limited to, one or more vertical field gradients, phase measurements, azimuthal angle measurements (as discussed subsequently herein), measured differences in B-field vector magnitude, and/or other aspects of the measured signals. For instance, as illustrated in FIG. 1C, which may correspond to FIGS. 1A and 1B, the utility locator 120 may have multiple antenna arrays 122, 124, and 126 that are spaced apart along its vertical mast. Each antenna array 122, 124, and 126 may be tuned to one or more broadcast signal frequencies such as broadcast signal 132. Alternatively, a utility locator may have antenna configurations such as those illustrated in FIGS. 15A-16B and further described subsequently herein. When in close enough proximity to a conductive element, such as utility line 170, the reradiation of signal (e.g. reradiated signal 134), and superposition of the reradiated signal 134 and broadcast signal 132, may cause a difference in measured signal strength at the tuned frequency at each different antenna array 122, 124, and 126. If there is no apparent difference in measured signal between separate antenna arrays 122, 124, and 126 it may be determined that no coupling of broadcast signal or signals has occurred. In a locating environment where transmission sources may transmit broadcast signals from various different directions simultaneously (e.g. widely available AM radio station broadcast signals or other broadcast signals provided by commercial, military, or other sources), and thus assuring an orthogonal direction component and a coupling of broadcast signal regardless of orientation of utility line, it may be determined that no conductive utility line may be present when no difference in vertical field gradient is measured. Methods for determining gradient values from concurrent signal measurements at two or more spatially separated antennas or antenna arrays may be found in methods described in FIGS. 2A-2D.

In some embodiments, measures of azimuthal angle, which may be either local or world coordinates, may be used to find gradients. For instance, a shearing gradient may be determined through measured difference in azimuthal angle values. Shearing gradients may be determined through measured differences in azimuthal angles at different points in time or space and/or ratios of measured azimuthal angles to corresponding actual transmission source directions. Within FIG. 1D, which may correspond to FIGS. 1A and 1B, the azimuthal angle 180 is illustrated as the measured angle between the forward facing direction of the utility locator 120 (illustrated herein as carried by the user 110 in a direction facing along the utility line 170) to the direction of the measured field which may, when in the absence of interfering signal, be orthogonal to the direction from the broadcast signal transmitter 150. As the superposition of the reradiated signal 156 onto the uniform broadcast signal 152 may cause such interference that is measurably different at each antenna array 122, 124, and 126 of the utility locator 120, a measureable change of azimuthal angle 180 may occur. For instance, when in the presence of an interfering signal superimposed onto a broadcast signal, the azimuthal angle may not measure truly orthogonally to the broadcast signal transmission source. Furthermore, a different azimuthal angle measurement may be determined at each antenna array 122, 124, and 126 when interfering signal is present. For instance, the superposition of the reradiated signal 156 from utility line 170 onto broadcast signal 152 may produce such interference that may fall off as the signal is measured at the different antenna arrays 122, 124, and 126 positioned at different distances from utility line 170 along the mast of the utility locator 120. In such embodiments, measured differences of azimuthal angle may indicate the presence of a conductive utility line and/or other conductive elements. In the absence of interference to broadcast signal 152 there may be no difference in measured azimuthal angle between antenna arrays 122, 124, and 126. In some embodiments, where the location of the transmission source, such as broadcast signal transmitter 150, is known relative to the utility locator, shearing gradients may be determined through the difference in azimuthal angle measurements to the true location direction of the broadcast transmission source. Different methods for determining shearing gradients are described in conjunction with method 240 of FIG. 2C and method 260 of FIG. 2D as discussed subsequently herein.

Figure 2A:
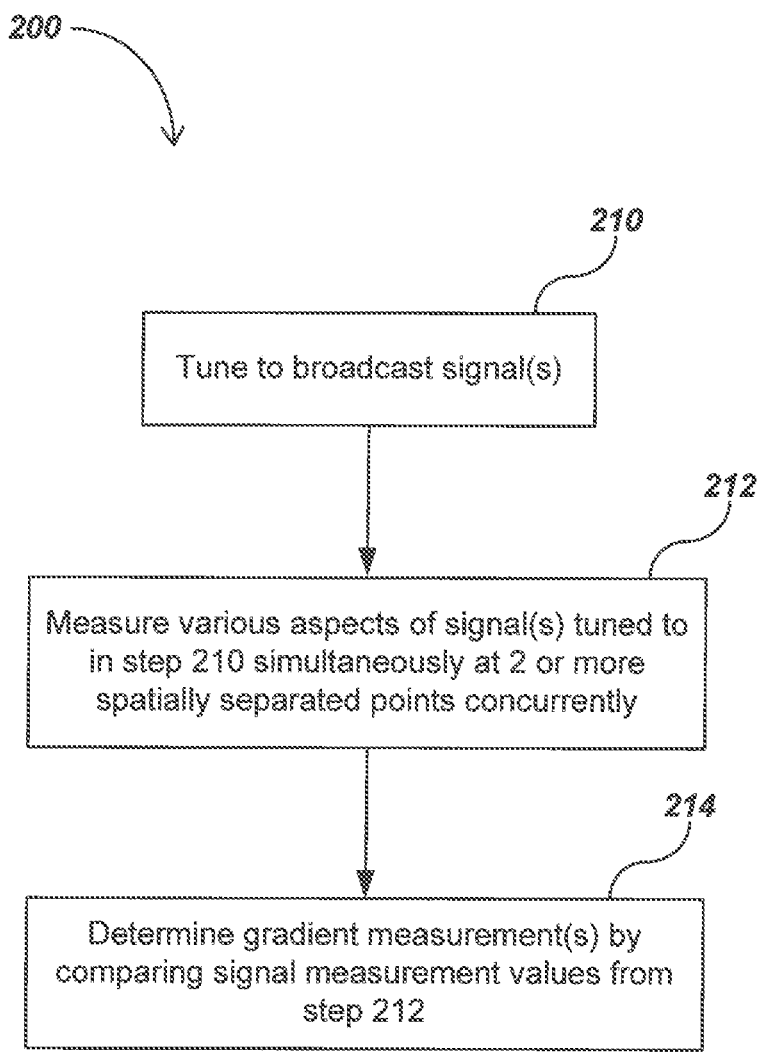
FIG. 2A is a method for determining gradient measurements from concurrent signal measurements.

Turning to FIG. 2A, a method 200 for determining gradients from concurrent signal measurements may include a first step 210 whereby a utility locator may be tuned to one or more broadcast signals. For instance, in some embodiments, broadcast signals may be AM broadcast radio signals and the utility locator may detect and tune to one or more of the available signals. In some embodiments, a database of broadcast signals may be accessed by the utility locator to select one or more broadcast signals based on the utility locator and/or transmission source locations. In a subsequent step 212, various aspects of each signal tuned at step 210 may be measured simultaneously at two or more spatially separated points either concurrently or separated in time. For instance, each broadcast signal and/or reradiated signal and/or the superposition of broadcast and reradiated signals may be measured at different antennas and/or antenna arrays spatially separated along the mast of a utility locator. Signal measurements may include, but should not be limited to, measurements of signal strength, azimuthal angle, phase, current direction, and/or other measureable aspects of signals. In a step 214, gradient measurements may be determined through comparison of measured values of signals at step 212.

Figure 2B:
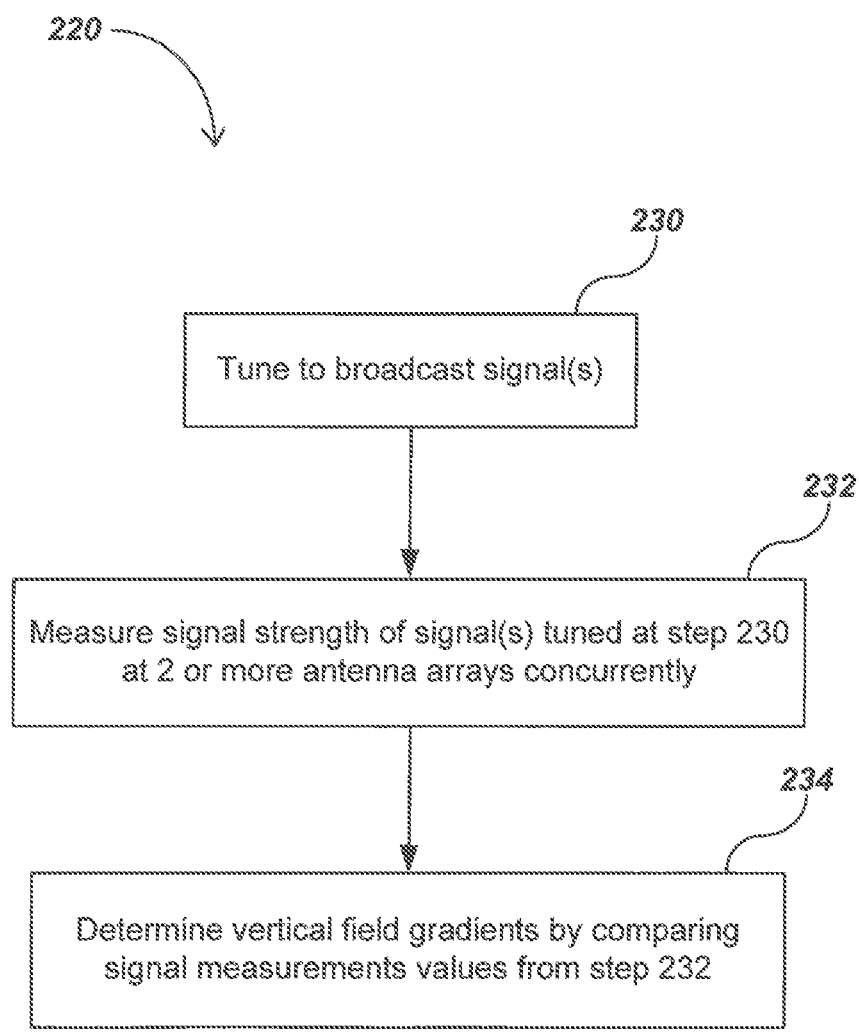
FIG. 2B is a method for determining vertical field gradient measurements from concurrent signal measurements.

Turning to FIG. 2B, a method 220 for determining vertical field gradients from concurrent signal measurements may include a first step 230 whereby a utility locator may be tuned to one or more broadcast signals (e.g. AM radio signals or other broadcast signals). In a subsequent step 232, the signal strength of each measured signal tuned at step 230 may be measured simultaneously at two or more antenna arrays along the vertical mast of a utility locator. In a step 234, vertical field gradient measurements may be determined through comparison of measured values of signals from step 232.

Figure 2C:
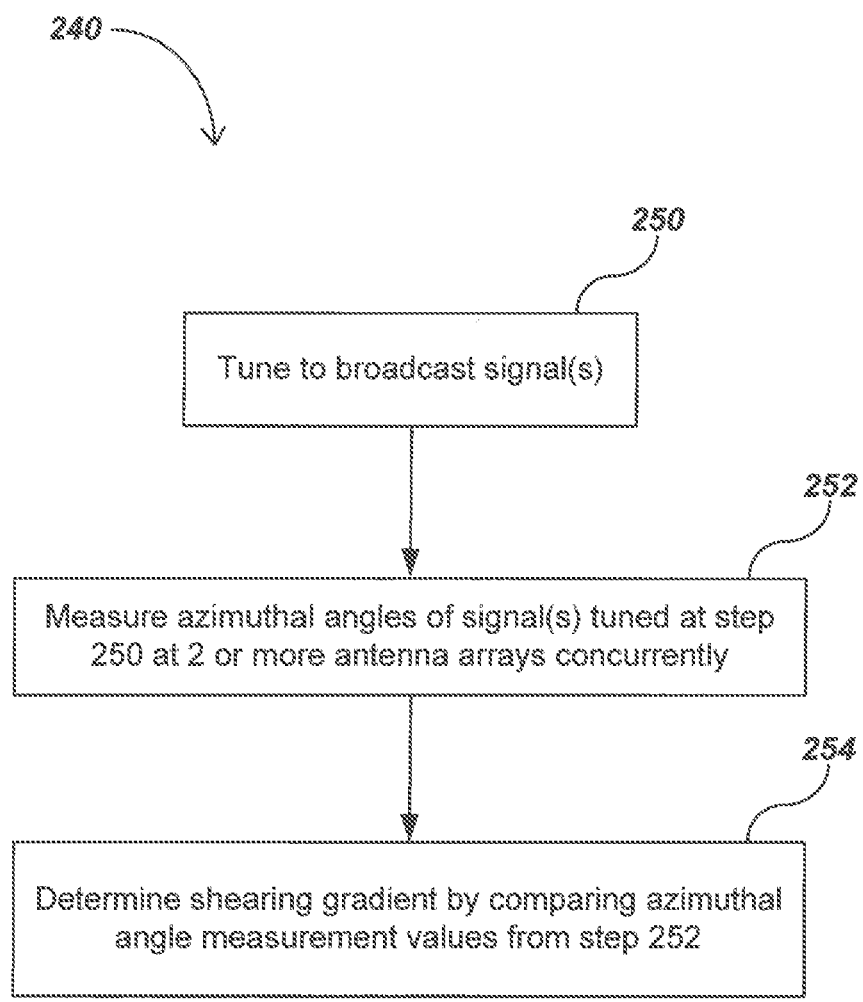
FIG. 2C is a method for determining shearing gradient measurements from concurrent signal measurements of azimuthal angles at two or more antennas or antenna arrays.

Turning to FIG. 2C, a method 240 for determining shearing gradients from concurrent signal measurements may include a first step 250 whereby a utility locator may be tuned to one or more broadcast signals (e.g. AM radio signals or other broadcast signals). In a subsequent step 252, the azimuthal angle of each signal tuned at step 250 may be measured simultaneously at two or more antenna arrays along the vertical mast of a utility locator. In a step 254, shearing gradient measurements may be determined through comparison of measured values of signals at step 252.

Figure 2D:
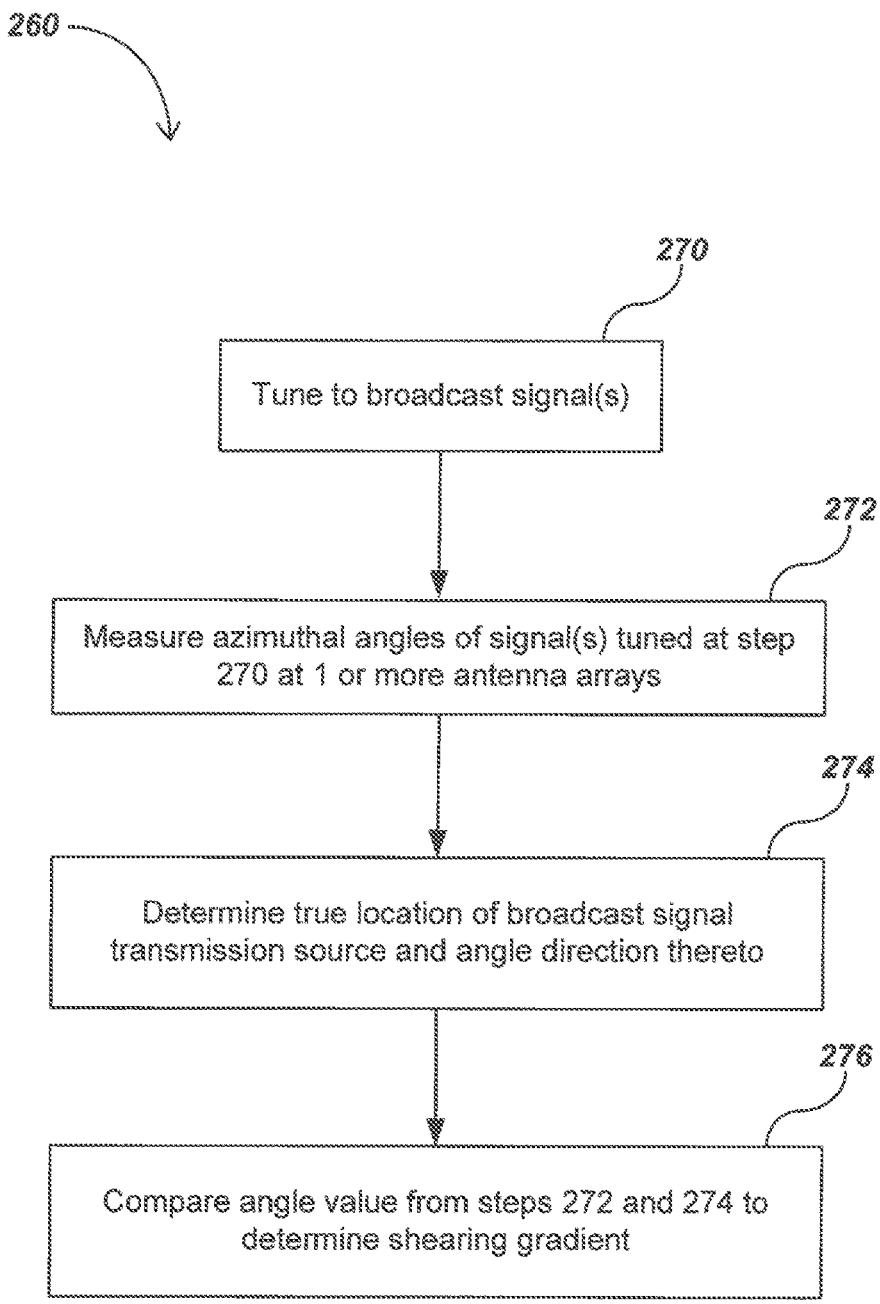
FIG. 2D is a method for determining shearing gradient measurements from at least one azimuthal angle measurement and a known direction to its transmission source.

Turning to FIG. 2D, a method 260 for determining shearing gradients may include a first step 270 whereby a utility locator may be tuned to one or more broadcast signals (e.g. AM radio signals or other broadcast signals). In a subsequent step 272, the azimuthal angle of each signal tuned at step 270 may be measured by at least one antenna array along the vertical mast of a utility locator. In a step 274, the true location of the broadcast signal transmission source and angular direction thereto is determined. For instance, a utility locator may include a database and/or be configured to access a database containing the location and corresponding frequency for all known broadcast signal transmitter sources. The same utility locator may further include GPS and/or other position determining sensors and systems allowing for the utility locator's position to be known relative to each broadcast signal transmitter. In a step 276, comparison of angle values from steps 272 and 274 may be used to determine a shearing gradient.

Figure 3A:
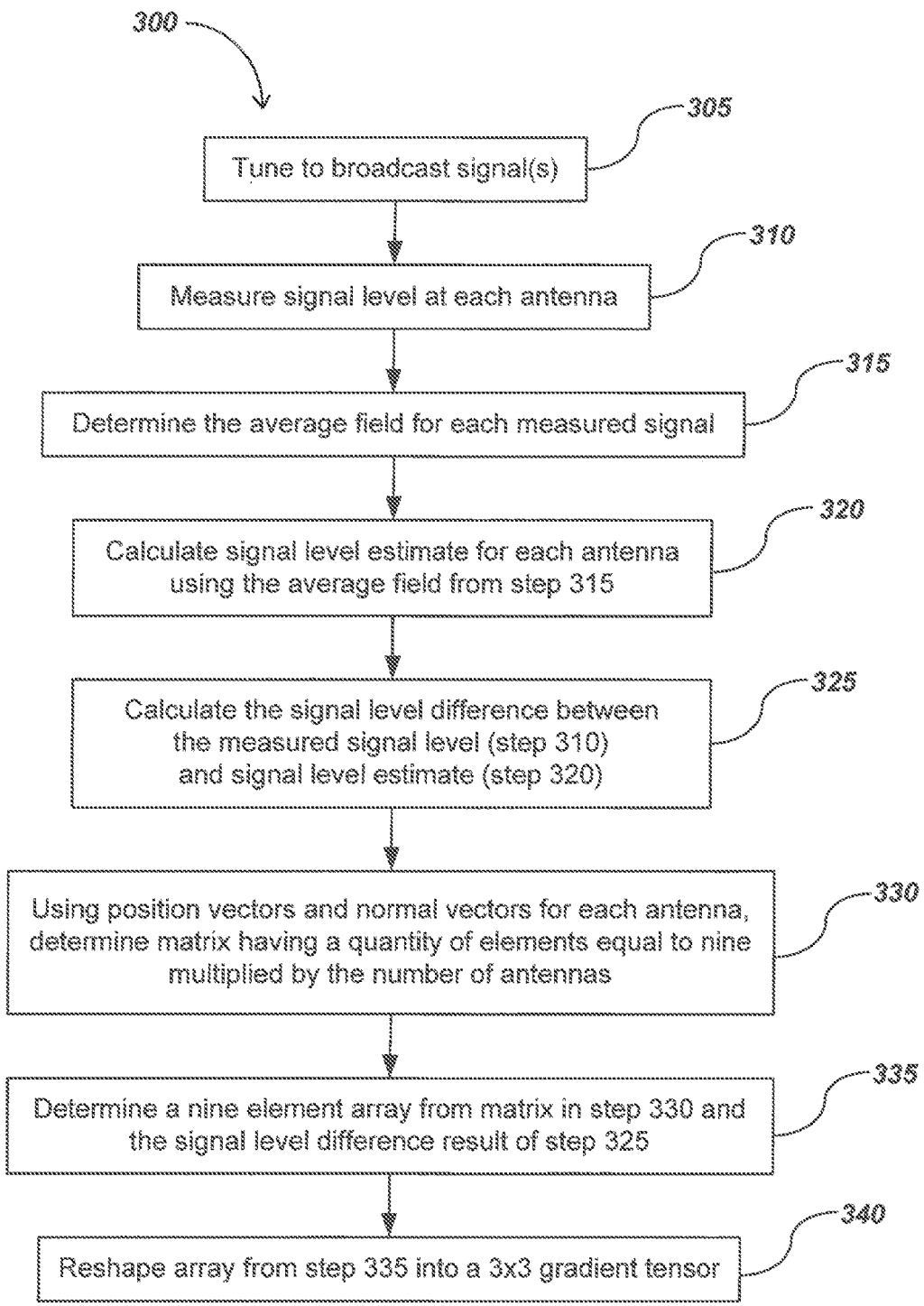
FIG. 3A is a method for determining gradient tensors.

In some embodiments, tensor gradients may be determined from broadcast signal measurements and further used in later described methods as the gradient values for determining locate information. Such tensor gradient methods may include E-field and/or B-field measurements of broadcast signals. As illustrated in FIG. 3A, a method 300 for determining gradient tensors may include a first step 305 whereby a utility locator may be tuned to one or more broadcast signals (e.g. AM radio signals or other broadcast signals). In a subsequent step 310, signal levels are measured at each antenna within the utility locator. Within some utility locator embodiments used to carry out method 300 and/or other methods within the present disclosure, the antennas may be individual antenna coils within an antenna array arranged in various geometries such as those illustrated in FIG. 15A. In yet further utility locator embodiments, the antennas may be other antenna types and combinations of antenna types arranged in a variety of different geometries. For instance, some utility locator embodiments may include both an array of coil antennas and one or more whip antennas. In a next step 315, a calculation may be made to determine the average signal level for each measured signal. In a next step 320, the signal level at each antenna for the average signal level may be determined. In a subsequent step 330, using the position vectors and normal vectors for each antenna, determine a matrix having a quantity of elements equal to nine multiplied by the number of antennas. The nine elements may describe each antenna's displaced position and orientation. In step 335, a nine element array may be determined. In step 340, the nine element array from step 335 may be reshaped into a three by three gradient tensor. In use, method 300 may be repeated as the utility locator is moved about the locate operation.

Figure 3B:
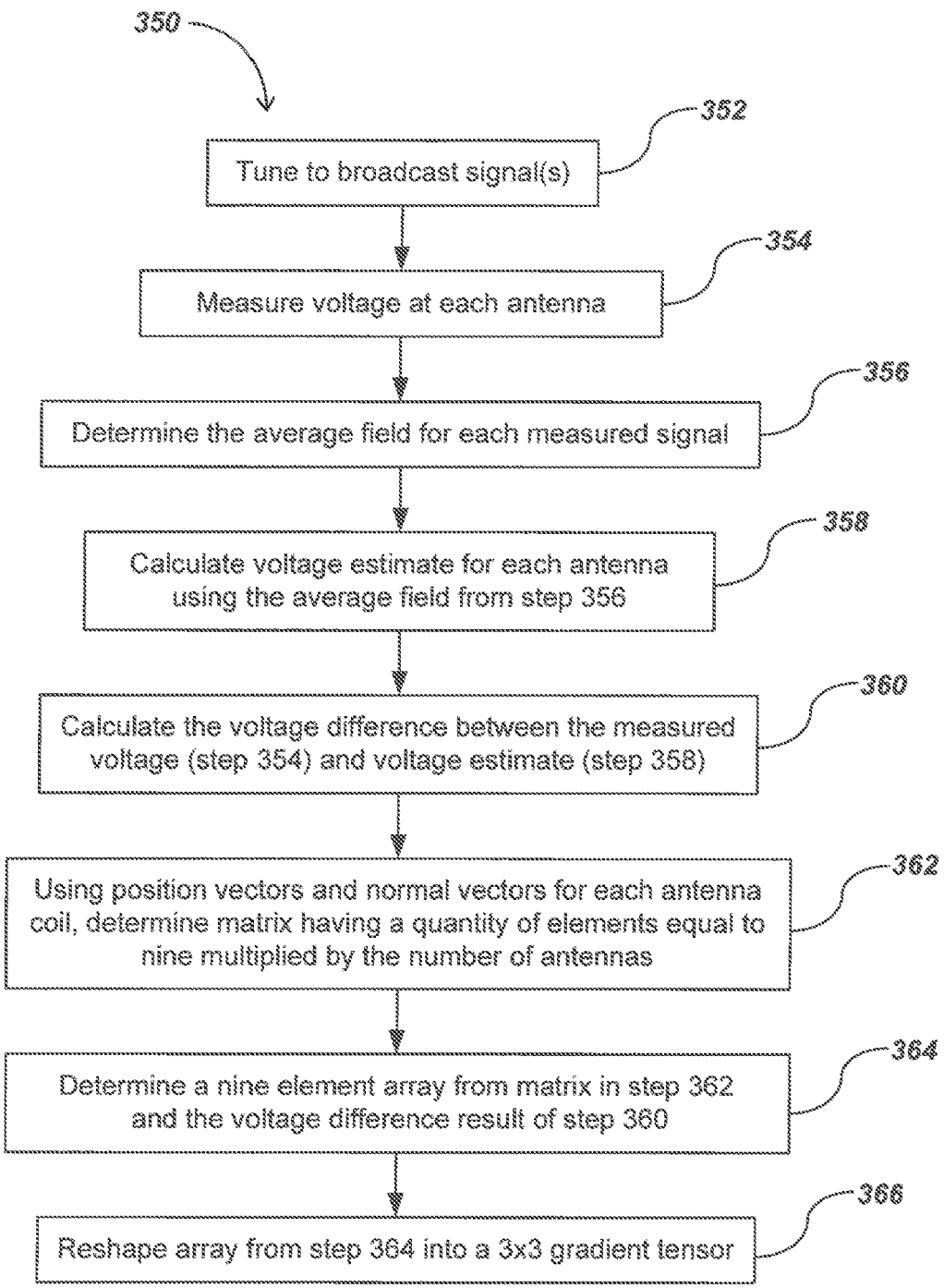
FIG. 3B is a method for determining gradient tensors.

In some methods, gradient tensors may be determined through B-field measurements at the utility locator. As illustrated in FIG. 3B, a method 350 for determining gradient tensors may include a first step 352 whereby a utility locator may be tuned to one or more broadcast signals (e.g. AM radio signals or other broadcast signals). In a subsequent step 354, voltage is measured at each antenna within the utility locator. The voltage may be notated herein as $V_{meas\_i}$. As discussed in the equations herein, the utility locator may have i number of antennas which may be antenna coils. Furthermore, each antenna may have a position vector, $\vec{cp_i}$, as well as a normal vector, $\vec{N_i}$. In a next step 356, a calculation may be made to determine the average field for each measured signal, notated herein as $\vec{B'_0}$. For instance, given a uniform field $B_0$ measured at i antennas and a measured voltage $V_{meas\_i}$ from step 354, the average field $B'_0$ may be found by solving for the equations $V_{meas\_i} \propto B_{ox}N_{xi} + B_{oy}N_{yi} + B_{oz}N_{zi}$. In a next step 358, the voltage at each antenna for the average field, notated herein as $V_{estimated\_i}$ may be calculated. Step 358 may be achieved through solving for $V_{estimated_j}$ where $V_{estimated\_i} = B'_{ox}N_{xi} + B'_{oy}N_{yi} + B'_{oz}N_{zi}$. In step 360, the voltage difference, $V_{difference\_i}$, may be found between the measured voltage $V_{meas\_i}$ at step 354 and the voltage estimate $V_{estimated\_i}$ of step 358 where $V_{estimated\_i} = V_{meas\_i} - V_{estimated\_i}$. In a subsequent step 362, using the position vectors and normal vectors for each antenna, determine matrix, notated herein as A, having a quantity of elements equal to nine multiplied by the number of antennas. The nine elements may describe each antenna's displaced position and orientation. In step 364, a nine element array, $G_{array}$, is determined using the Moore-Penrose pseudoinverse where $G_{array}$=A*pseudoinv ($V_{difference}$). In step 366, the nine element array $G_{array}$ may be reshaped into a three by three gradient tensor, notated as G. In use, method 350 may be repeated as the utility locator is moved about the locate operation. In further methods, gradient tensors may be determined through E-field measurements, B-field measurements, or a combination thereof.

Figure 3C:
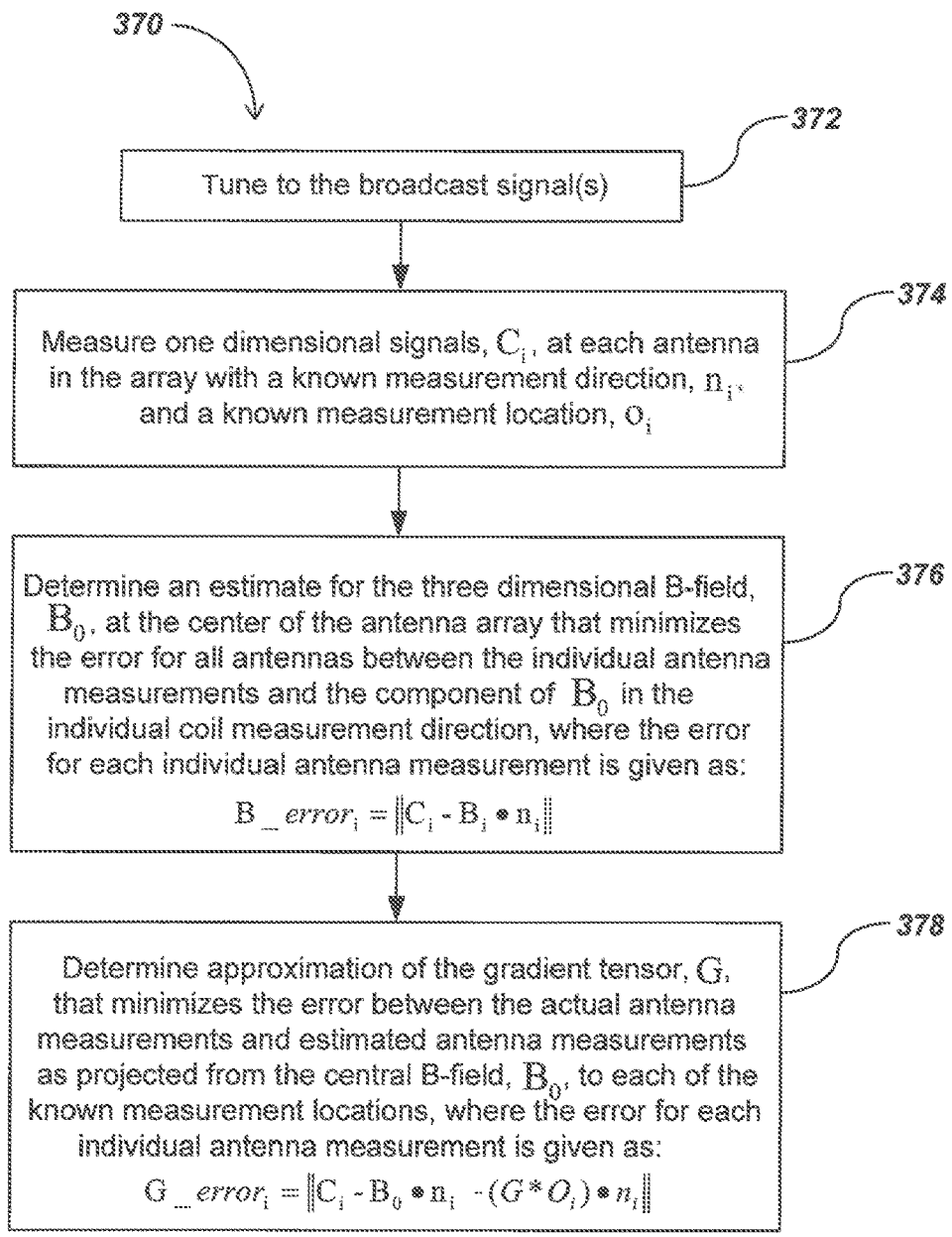
FIG. 3C is a method for determining gradient tensors.

Notation used within the gradient tensor determining method 370 described in FIG. 3C is defined here. Within method 370 of FIG. 3C, the notated $B_0$ may be defined as an averaged B-field at a specified location within the antenna array, for example the centroid of the antenna array, denoted herein as the locus of the antenna array. The notation B, may be defined as the B-field at the location of any of the individual antenna coils that may be measured in whole or in part by the antennas at that location in arbitrary units of coil voltage measurement. As used herein, "i" may refer to the individual antenna coil. As a subscript, this may generally be a measurement or value at the specific individual antenna which may be determined for each antenna in the array. For instance, equations in which one or more variables utilize the subscript "i" may be determined individually at each individual antenna in the array. Each antenna may have a given offset from the center of the array and a given normal vector, notated herein as $o_i$ and $n_i$ respectively. Each antenna coil will provide a one dimensional measurement of its local B-field notated as $C_i$ where $C_i = B_i \cdot n_i$. A gradient tensor, notated herein as G, may be a 3×3 matrix that describes the linear change of B-field per unit length at a specific location. The tensor gradient determining method 370 of FIG. 3C may include a first step 372 wherein the utility locator is tuned to the broadcast signal or signals. In another step 374, the utility locator may measure one dimensional signal, $C_i$, at each antenna in the array with a known measurement direction, $n_i$, and a known measurement location, $o_i$. In a step 376, an estimate for the three dimensional B-field, $B_0$, at the center of the antenna array that minimizes the error for all antennas between the individual antenna measurements and the component of $B_0$ in the individual coil measurement direction, is determined, where the error for each individual antenna measurement is given as: $B\_error_i = \|C_i - B_0 \cdot n_i\|$. In another step 378, approximation of the gradient tensor, G, that minimizes the error between the actual antenna measurements and estimated antenna measurements as projected from the central B-field, $B_0$, to each of the known measurement locations, where the error for each individual antenna measurement is given as: $G\_error_i = \|C_i - B_0 \cdot n_i - (G*o_i) \cdot n_i\|$.

In some embodiments, gradient values may be determined from non-concurrent signal measurements. Such measurements may result from two or more signal measurements (e.g. phase, azimuthal angle, B-field vector magnitude, and/or other signal aspect) at different times within the locate operation. For instance, as the utility locator is moved about the locate operation measuring signals, gradients may be determined from signal measurements from different points in time which may further be at different locations. Such non-concurrent gradient measurement methods are described with the methods of FIGS. 4A-4C and FIG. 5B.

Figure 4A:
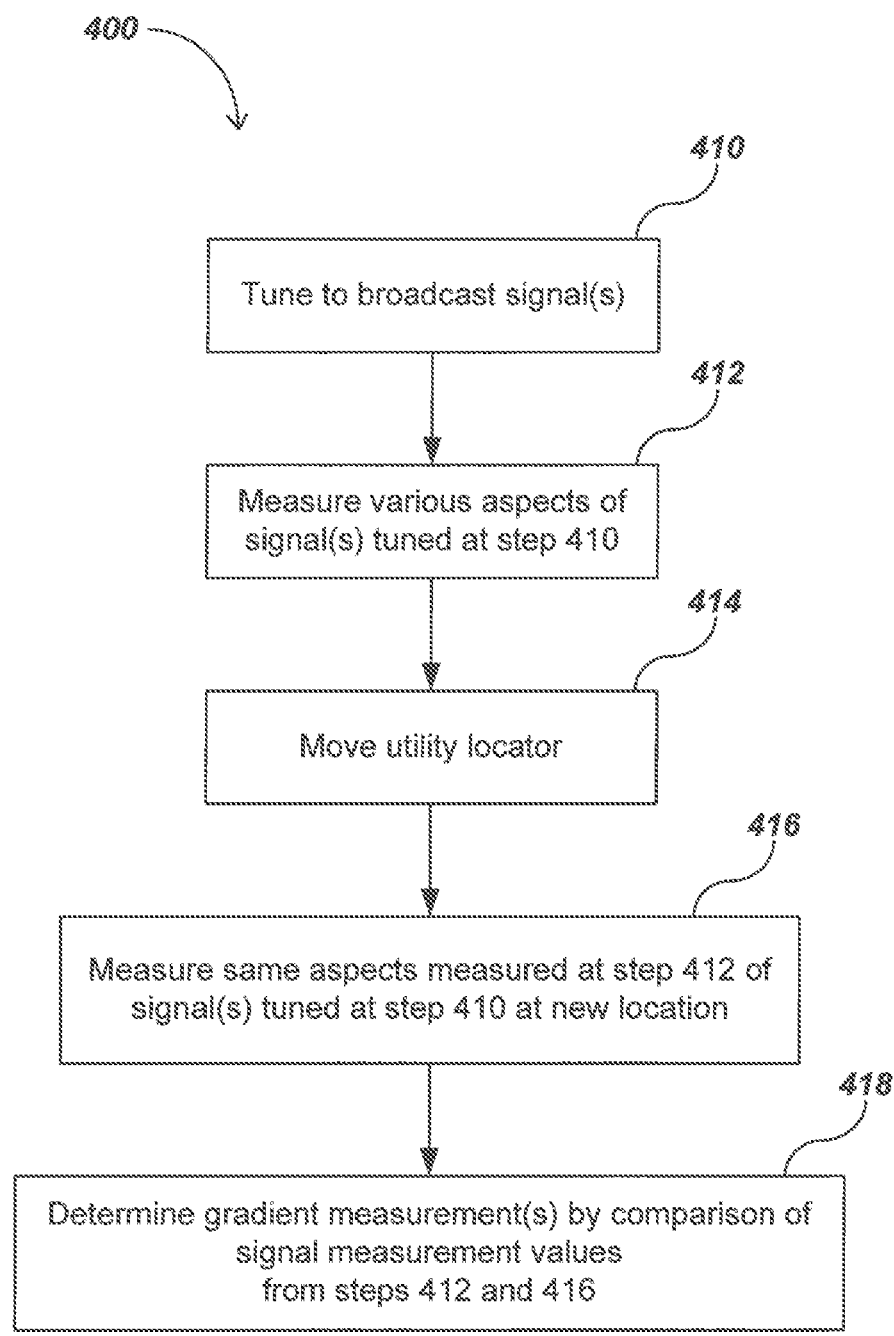
FIG. 4A is a method for determining gradient measurements from non-concurrent signal measurements.

Turning to FIG. 4A, a method 400 for determining gradients from non-concurrent signal measurements may include a first step 410 whereby a utility locator may be tuned to one or more broadcast signals. For instance, in some embodiments, broadcast signals may be AM broadcast radio signals and the utility locator may detect and tune to one or more of the available signals. In some embodiments, a database of broadcast signals may be accessed by the utility locator to select one or more broadcast signals based on the utility locator and/or transmission source locations. In a subsequent step 412, various aspects of the signal(s) tuned at step 410 may be measured. Such measured aspects may include, but should not be limited to, measurements of phase, current direction, signal strength, azimuthal angle, B-field vector magnitudes, and/or other measurable aspects of the signals. In a subsequent step 414, the utility locator may be moved. In another subsequent step 416 the same aspects measured at step 412 of the signal(s) tuned at step 410 may again be measured at the new location. In a step 418, gradient measurements may be determined through comparison of measured values from steps 412 and 416.

Figure 4B:
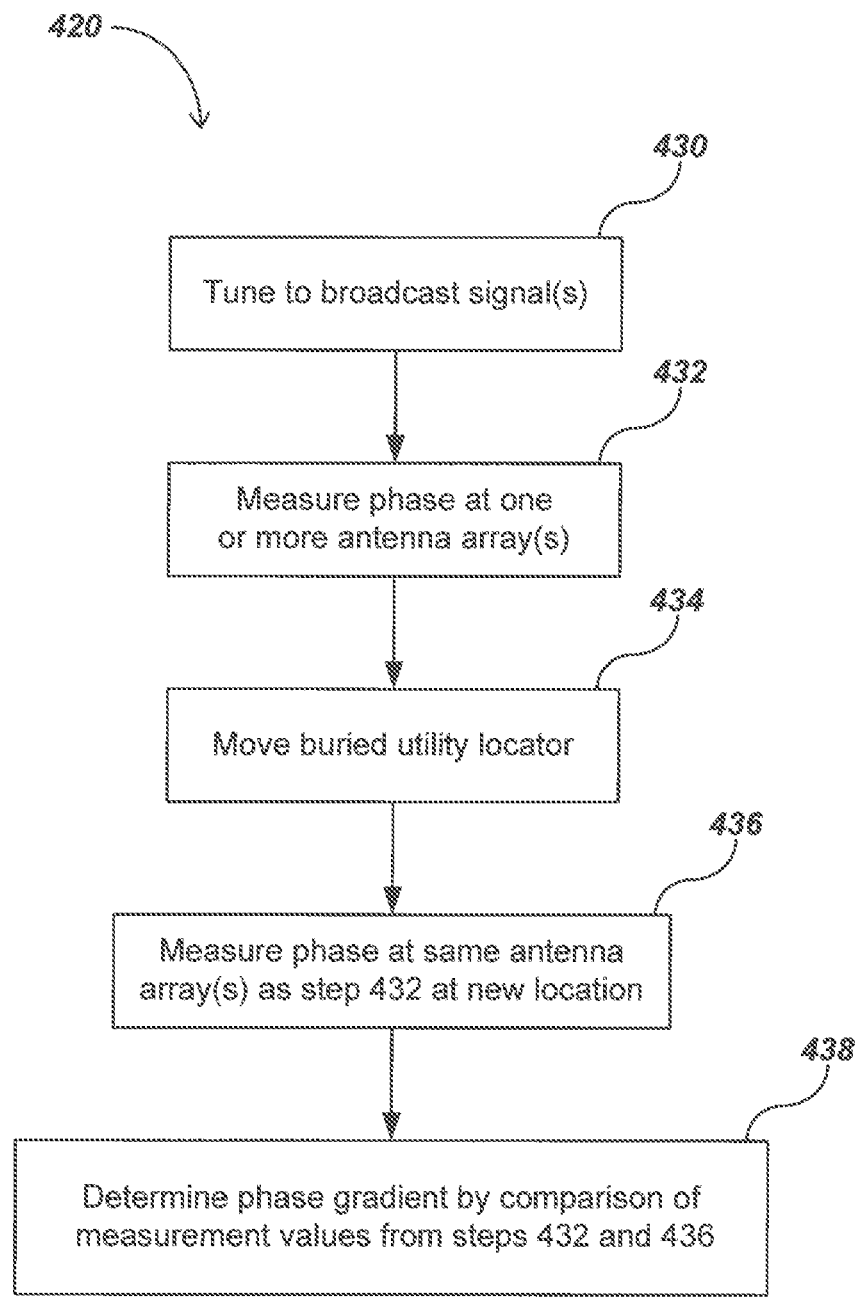
FIG. 4B is a method for determining phase gradients from non-concurrent signal measurements.

Turning to FIG. 4B, a method 420 for determining phase gradients from non-concurrent signal measurements may include a first step 430 whereby a utility locator may be tuned to one or more broadcast signals (e.g. AM radio signals or other broadcast signals). In a subsequent step 432, phase measurements may be determined at one or more antenna arrays on the utility locator of the signal(s) tuned at step 430. In a subsequent step 434, the utility locator may be moved. In a subsequent step 436, phase measurements at the same antenna array or arrays as step 432 may be determined at the new location. In a step 438, phase gradients may be determined by comparison of measured values from steps 432 and 436.

Figure 4C:
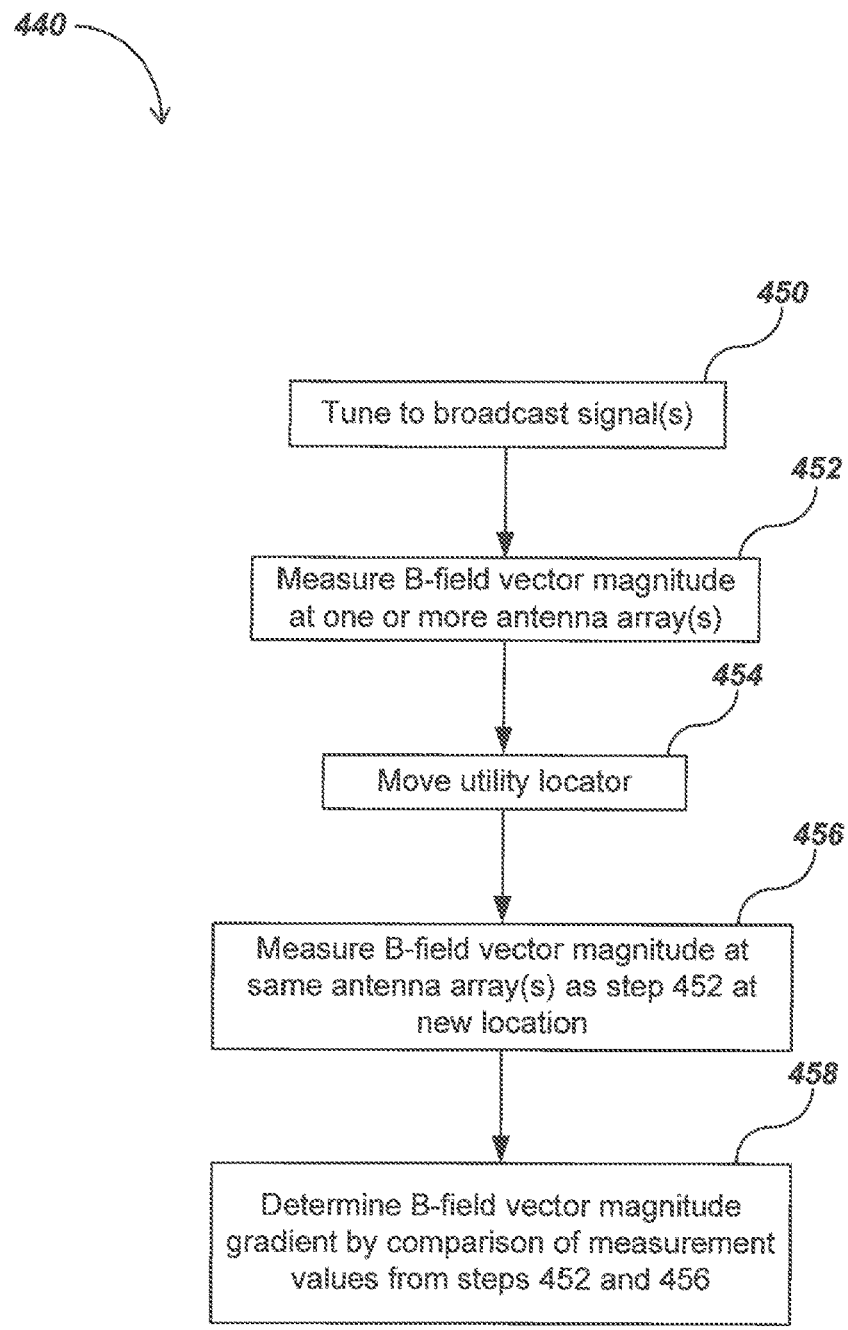
FIG. 4C is a method for determining B-field vector magnitude gradients from non-concurrent signal measurements.

Turning to FIG. 4C, a method 440 for determining B-field vector magnitude gradients from non-concurrent signal measurements may include a first step 450 whereby a utility locator may be tuned to one or more broadcast signals (e.g. AM radio signals or other broadcast signals). In a subsequent step 452, B-field vector magnitude measurements may be determined at one or more antenna arrays on the utility locator of the signal(s) tuned at step 450. In a subsequent step 454, the utility locator may be moved. In another subsequent step 456, measurement of B-field vector magnitudes at the same antenna array or arrays as step 452 may be determined at the new location. In a step 458, B-field vector magnitude gradients may be determined by comparison of measured values from steps 452 and 456.

Figure 5A:
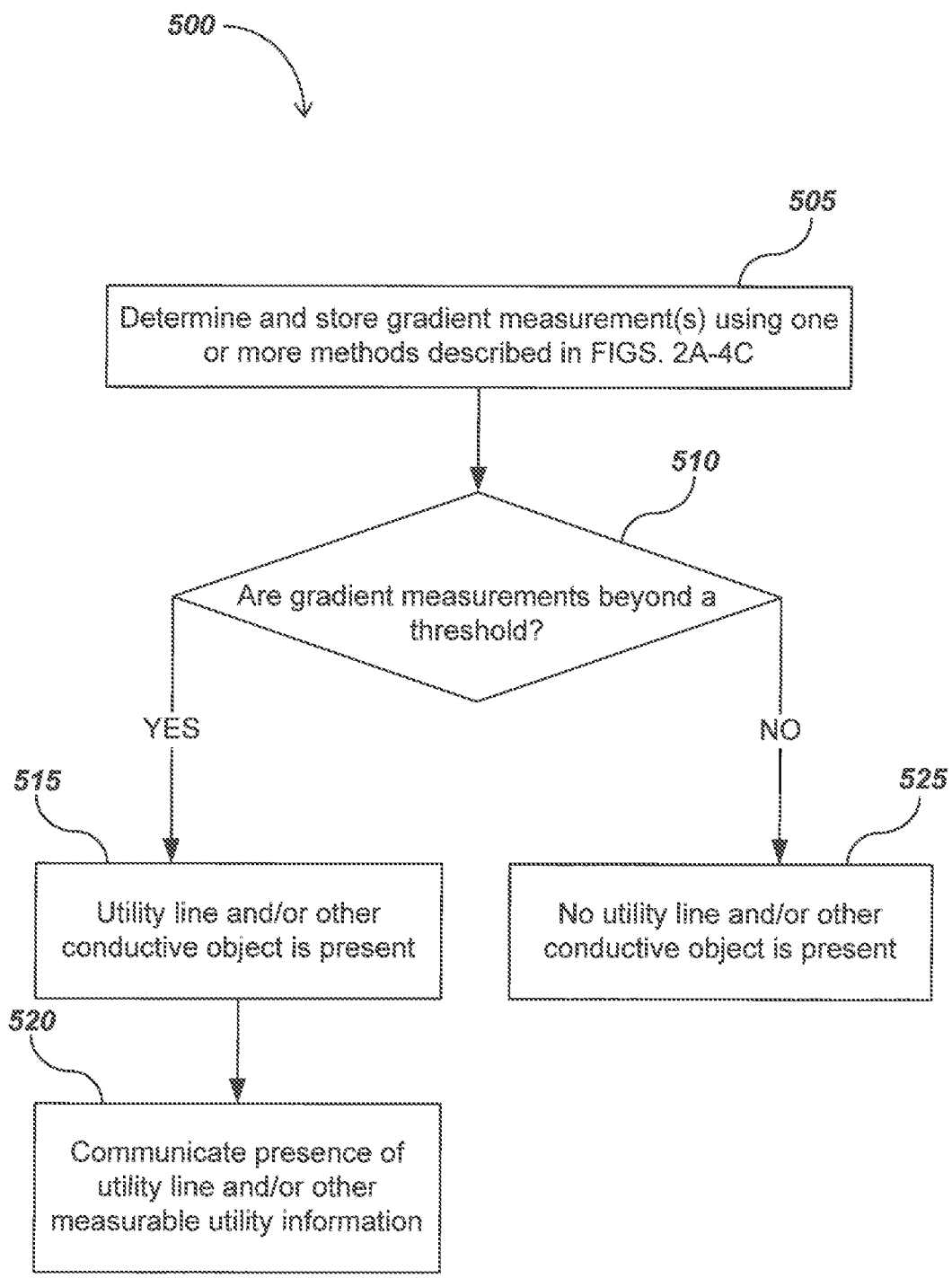
FIG. 5A is a method for using gradient measurements for determining the presence or absence of a conductive utility line.

Turning to FIG. 5A, a method 500 for determining the presence or absence of buried utilities from gradients may include a first step 505 whereby gradient measurements are determined and stored utilizing the methods discussed in conjunction with FIGS. 2A-4C. In a subsequent step 510, a decision may be made as to whether gradient measurements from step 505 are beyond a threshold. In some embodiments, such a threshold may be predetermined. Such threshold boundaries may further be determined in various ways. For instance, threshold boundaries may be defined as a possible difference in signal measurement that, without interference on the measured signal, may occur within a certain distance and/or time at a given frequency and/or distance from a broadcast signal transmission source. If the gradient measurement or measurements falls beyond the threshold in step 510, method 500 may proceed to step 515 where a utility line and/or other conductive object may be determined to be present. Within method 500, if the presence of one or more utility lines has been detected in step 515, a subsequent step 520 may include communicating such information and/or other associated utility information to users. For instance, the location, orientation, and depth of a utility line as well as other associated utility information may be displayed on a graphical user interface of a utility locator, such as graphical user interface 1000 of FIG. 10. If the gradient measurement or measurements falls within the threshold in step 510, method 500 may proceed to step 525 where no utility line and/or other conductive object may be determined to be present. Once completed, method 500 may be repeated as the utility locator is moved about the locate area where utility information may be georeferenced for purposes of locating and/or mapping of buried utilities as discussed in greater detail subsequently herein.

Figure 5B:
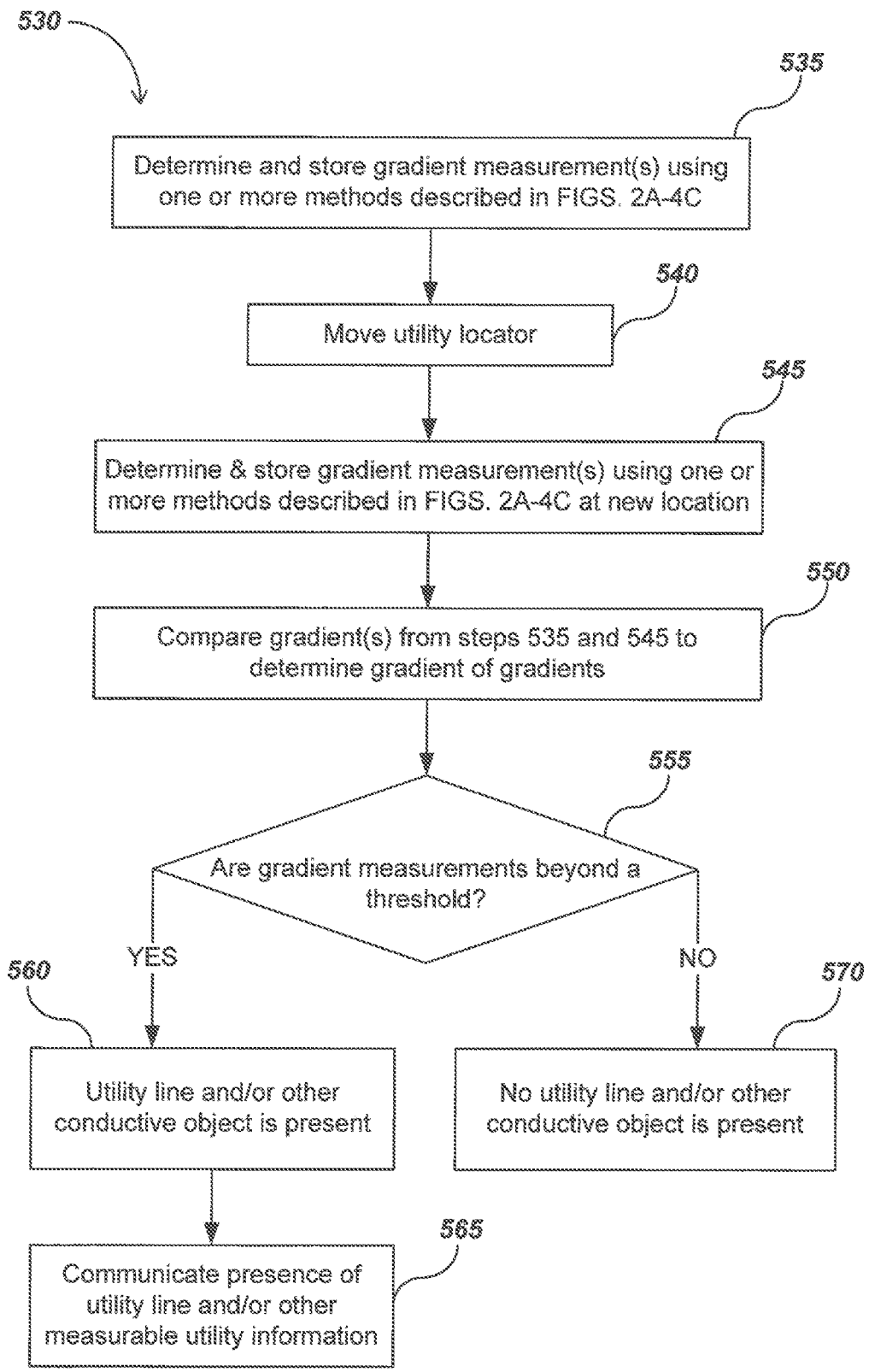
FIG. 5B is a method for determining gradients from other gradient measurements and further determining locate information.

Turning to FIG. 5B, a gradient of gradients method 530 for determining the presence or absence of buried utility lines may include a first step 535 whereby gradient measurements are determined and stored utilizing the methods discussed in conjunction with FIGS. 2A-4C. In a subsequent step 540, the utility locator may be moved. In step 545, gradient measurements are again determined and stored at the new location utilizing the methods discussed in conjunction with FIGS. 2A-4C. In step 550, a gradient of gradients is determined through comparison of the first gradient at step 535 and the gradient at step 545. In some additional embodiments, any number of gradient measurements may be compared from any number of new locations within the locate operation. In a decision step 555, a decision may be made as to whether gradient of gradients measurements from step 550 are beyond a threshold. In some embodiments, such a threshold may be predetermined. Such threshold boundaries may further be determined in various ways. For instance, threshold boundaries may be defined as a possible difference in gradients that, without interference, may occur within a certain distance and/or time at a given frequency and/or distance from a broadcast signal transmission source and/or other gradient boundary. If the gradient of gradients measurement or measurements falls beyond the threshold in step 555, method 530 may proceed to step 560 where a utility line and/or other conductive object may be determined to be present. Within method 530, if the presence of one or more utility lines has been detected in step 560, a subsequent step 565 may include communicating such information and/or other associated utility information to users. For instance, the location, orientation, and depth of a utility line as well as other associated utility information may be displayed on a graphical user interface of a utility locator, such as graphical user interface 1000 of FIG. 10. If the gradient measurement or measurements fall within the threshold in step 555, method 530 may proceed to step 570 where no utility line and/or other conductive object may be determined to be present. Once completed, method 530 may be repeated as the utility locator is moved about the locate area where utility information may be georeferenced for purposes of locating and/or mapping of buried utilities as discussed in greater detail subsequently herein. In some embodiments, all or some of the steps of method 530 may be carried out as a post process rather than in real time.

Figure 5C:
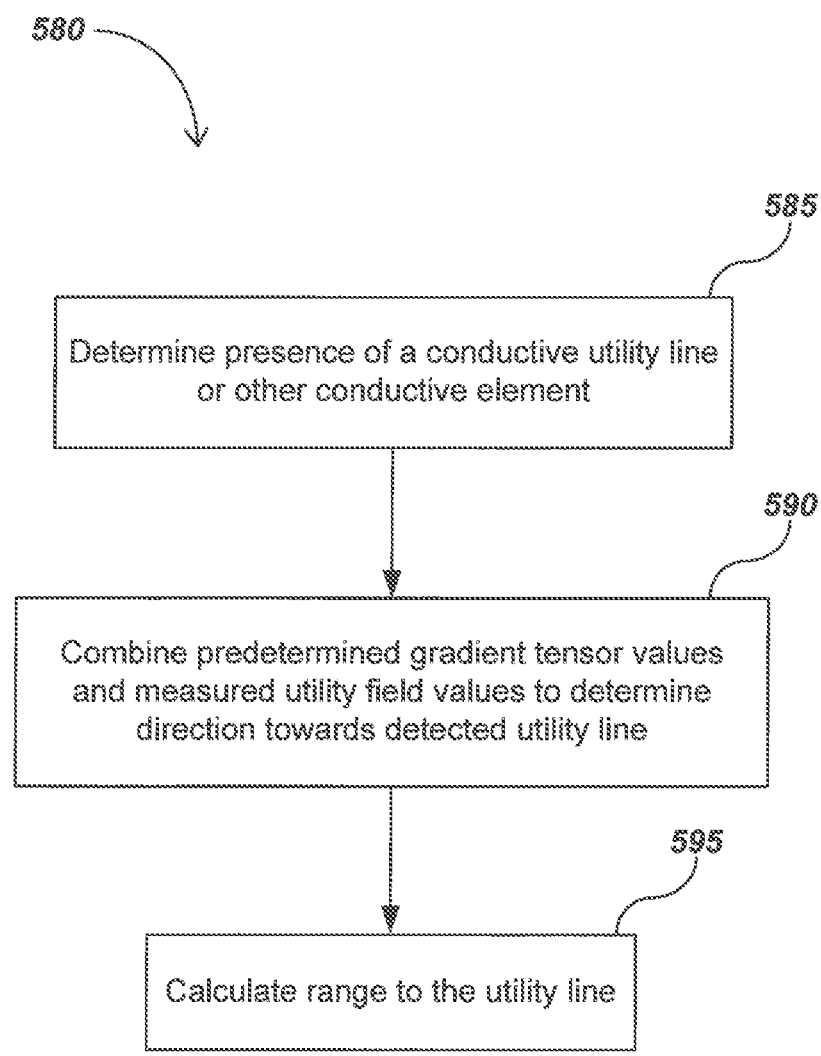
FIG. 5C is a method for determining the direction to and distance of a detected utility line utilizing gradient tensors.
Figure 6:
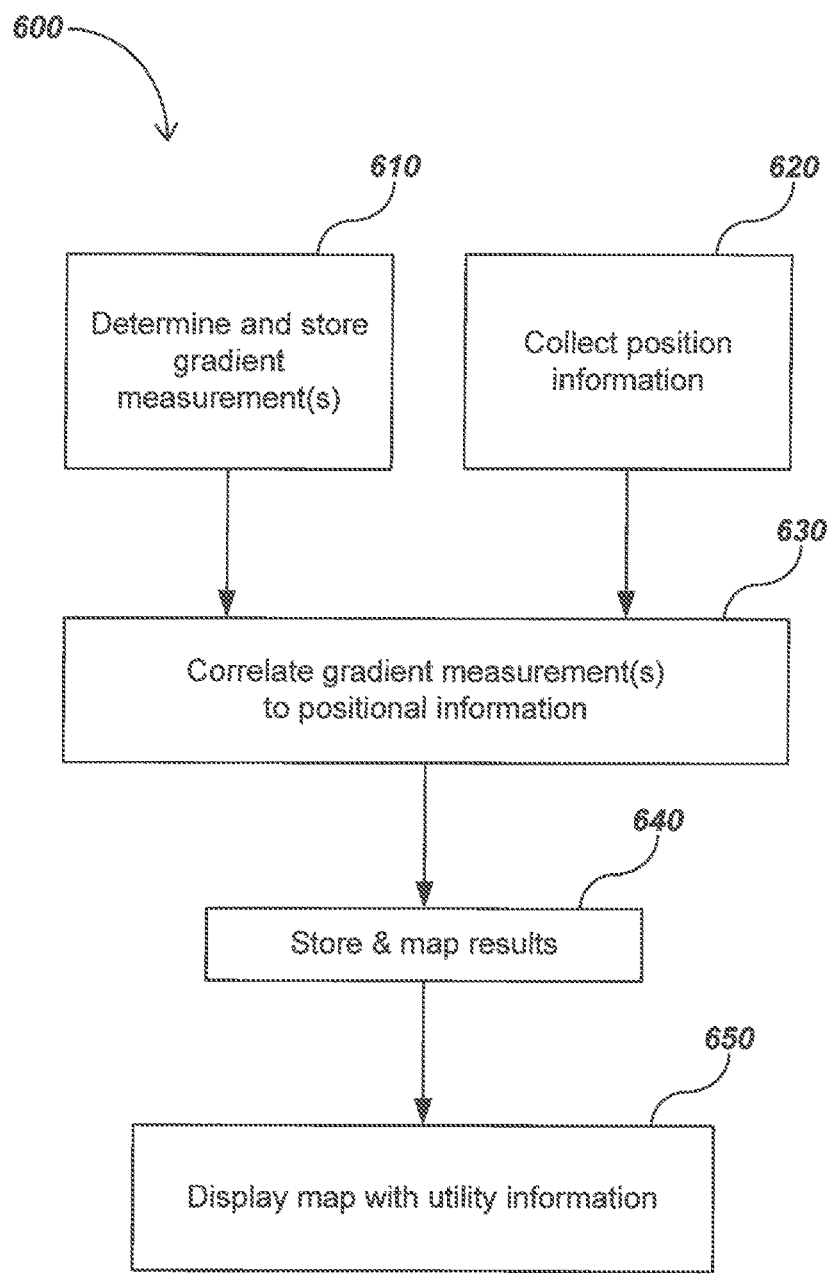
FIG. 6 is a method for mapping gradient measurements.

Turning to FIG. 5C, a method 580 is described for determining the location of and distance to a detected conductive utility line or other conductive element. Within method 580, a predetermined measure of the uniform field of one or more broadcast signals in the absence of interference may be predetermined resulting in gradient tensor values using method 300 of FIG. 3A and/or method 350 of FIG. 3B and/or method 370 of FIG. 3C. In a first step 585, the presence of a utility line or other conductive element is determined. Step 585 may include the use of method 500 of FIG. 5A and/or method 530 of FIG. 5B and/or other methods for determining the presence of a buried utility line. In some embodiments, the presence of a utility line in step 585 may be determined through any non-zero measure of the gradient tensor value. In a subsequent step 590, the predetermined gradient tensor values are combined with the utility field resulting in a gradient of the magnitude of the measured signal. Individually calculating along each of three axes may allow for results in three dimensional space and provide direction towards the detected conductor. For instance, the measured signal, $\vec{B}_{total}$, may be understood as the sum of the measured broadcast signal, $\vec{B}_{tower}$, plus the signal reradiating from the utility, $\vec{B}_{utility}$. As such, it may be also true that $\vec{B}_{utility} = \vec{B}_{total} - \vec{B}_{tower}$. Direction to the utility line may be achieved by combining the utility field measurements and gradient tensor values along x, y, and z axes by the following equations:

$$\vec{\nabla}(|\vec{B}|)_x = G_{xx}B_{utility\_x} + G_{xy}B_{utility\_y} + G_{xz}B_{utility\_z}$$

$$\vec{\nabla}(|\vec{B}|)_y = G_{yx}B_{utility\_x} + G_{yy}B_{utility\_y} + G_{yz}B_{utility\_z}$$

$$\vec{\nabla}(|\vec{B}|)_z = G_{zx}B_{utility\_x} + G_{zy}B_{utility\_y} + G_{zz}B_{utility\_z}$$

In another step 595, the range to the detected utility may be calculated using the equation:

$$\text{Range} = \frac{|\vec{B}_{utility}|}{|\vec{\nabla}|\vec{B}||}$$

The method 580 may be repeated throughout the locate environment, either in real time or through post processing with stored data.

In the various method and utility locator embodiments herein, mapping of utilities may be achieved through gradient measurements. Within such a mapping method 600 described in FIG. 6, a utility locator or locators may be configured with position and/or mapping capabilities, for instance, global navigation system sensors (GNSS) such as global positioning system (GPS) sensors, inertial navigation system (INS) sensors, and/or other position determining systems/sensors. In some such embodiments, positioning systems may include ground tracking systems such as those described in co-assigned patents and patent applications, including transmitter and locator devices and associated apparatus, systems, and methods disclosed in U.S. patent application Ser. No. 13/958,492, filed Aug. 2, 2013, entitled OPTICAL GROUND TRACKING APPARATUS, SYSTEMS, AND METHODS; U.S. patent application Ser. No. 14/179,538, filed Feb. 12, 2014, entitled OPTICAL GROUND TRACKING APPARATUS, SYSTEMS, AND METHODS; U.S. patent application Ser. No. 14/214,051, filed Mar. 14, 2014, entitled GROUND-TRACKING SYSTEMS AND APPARATUS; U.S. patent application Ser. No. 14/215,239, filed Mar. 17, 2014, entitled OPTICAL GROUND TRACKING APPARATUS, SYSTEMS, AND METHODS; U.S. patent application Ser. No. 14/752,834, filed Jun. 27, 2015, entitled GROUND TRACKING APPARATUS, SYSTEMS, AND METHODS; U.S. patent application Ser. No. 14/797,840, filed Jul. 13, 2015, entitled GROUND-TRACKING DEVICES AND METHODS FOR USE WITH A UTILITY LOCATOR; U.S. Pat. No. 9,081,109, issued Jul. 14, 2015, entitled Ground-Tracking Devices for Use with a Mapping Locator; U.S. Pat. No. 9,372,117, issued Jul. 23, 2015, entitled Optical Ground Tracking Methods and Apparatus for Use with Buried Utility Locators; U.S. Pat. No. 9,341,740, issued May 17, 2016, entitled Optical Ground Tracking Apparatus, Systems, and Methods; and U.S. Pat. No. 9,411,067, issued Aug. 9, 2016, entitled Ground-Tracking Systems and Apparatus.

In method 600, a first step 610 may include determining and storing gradient measurements. Such gradient measurements may, for instance, use one or more of the methods described in conjunction with FIGS. 2A-4C. In a parallel first step 620, position information is collected at the utility locator. In a subsequent step 630, the gradient measurements determined at step 610 may be correlated to and/or associated with the positional information determined at 620. In a step 640, results from step 630 may be stored and added to one or more maps and/or map systems. For instance, the position referencing utility information from step 630 may be fit to map imagery of the locate area and/or other map or map system. In some such embodiments, mapping imagery may be collected by the utility locator. The positions of the detected utility may be positioned within the images, orthorectified or otherwise. For instance, orthorectified map imagery of the locate area may further be made to include representations of utility information such as the location of detected utilities. In a step 650, a map with utility information may be displayed. Displaying of such maps may occur on a visual display element of the utility locator, smart phones, tablets, other system devices, and/or other computing devices. Method 600 may be repeated as the utility locator is moved about the locate area.

The device, system, and method embodiments herein using a utility map or map system may be made to include utility information through a heat map type scheme whereby a hierarchy of gradient values may be represented through the use of colors, shading, and/or other representations to show gradient measurements at each location. Within such embodiments, heat mapping of gradient measurements may provide a visual solution to finding utility lines and/or other conductive objects within the ground.

Figure 7A:
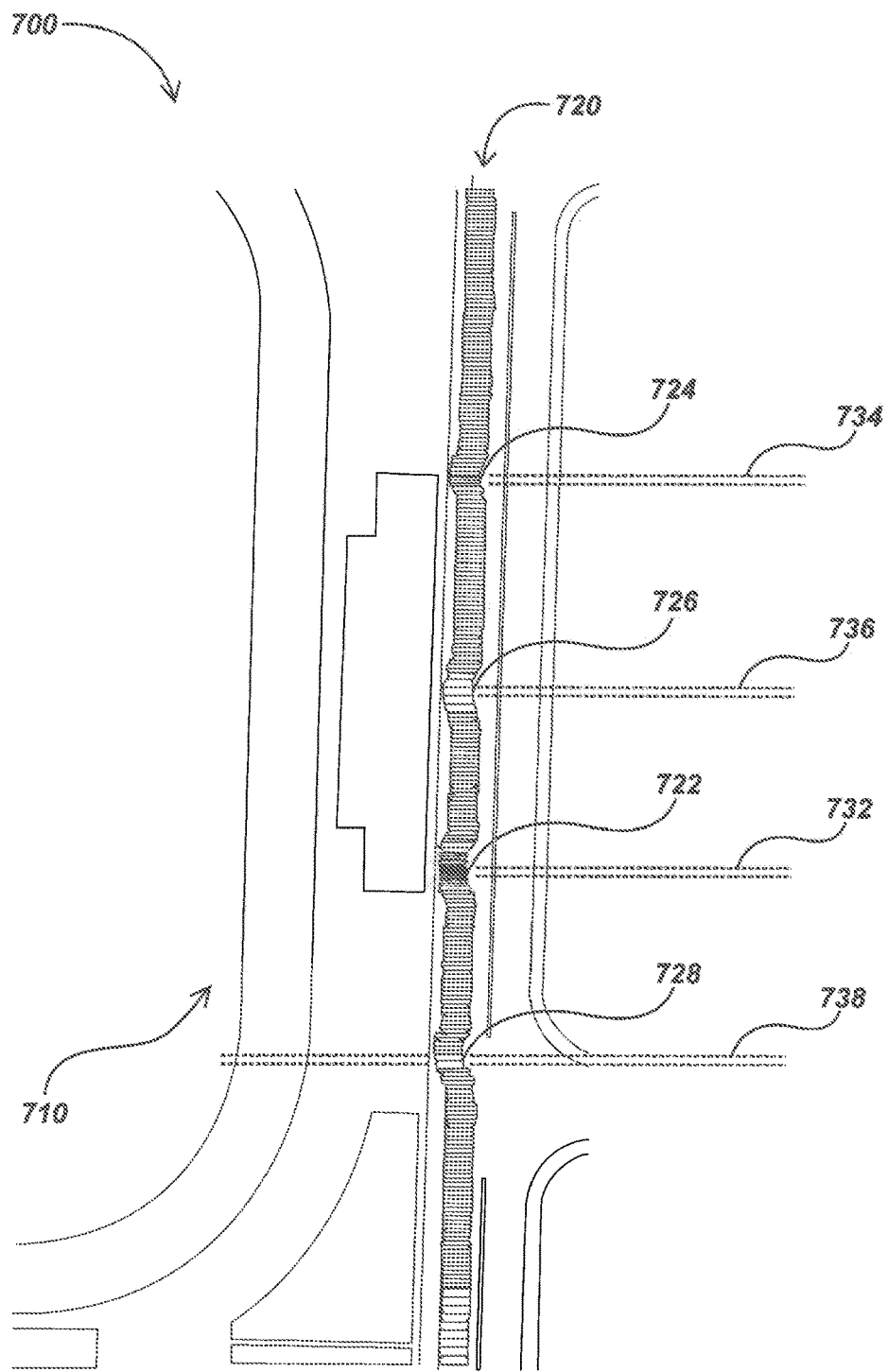
FIG. 7A is a utility locating heat map.

As illustrated in utility locating heat map 700 of FIG. 7A, a locate area map element 710 representative of the locate area may further be made to include visual representations of values of gradient measurements at each location as measured by the utility locator. For instance, a user equipped with a utility locator in keeping with the present disclosure may move about the locate area whilst determining and storing gradient measurements to its correlating location on the locate area map element 710 using method 600 of FIG. 6. Within utility locating heat map 700, a path 720 may be comprised of numerous successive points within the locate area whereby such gradient measurements have been determined and displayed at their correlated location on the locate area map element 710. Within path 720 of FIG. 7A, a hierarchy of gradient values may be represented through shading for each point within the locate area where gradient measurements are determined. For instance, higher values may be represented through darker shading whereas lower values of gradient measurements may be represented through lighter or no shading. In other embodiments, the hierarchy of gradient values at each measured location may be represented through other color schemes, patterns, and/or other representations to show the spectrum of gradient measurements at each location. The path 720 further reveals various locations within itself where a change in gradient measurements may be visible. For instance, change in gradient measurement locations 722 and 724 may be shaded darker whereas gradient measurement locations 726 and 728 may be shaded lighter in color. Locations where distinct changes in hierarchy are evident, such as with change in gradient measurement locations 722, 724, 726, and/or 728, may indicate the presence of a buried utility line (e.g. corresponding utility lines 732, 734, 736, and 738) at that location. In some utility locating methods, the user may measure gradients throughout the entire locate area thus creating an overall utility locating heat map. For instance, a user with a utility locator may walk along multiple parallel paths to the path 720 covering the locate area map element 710. In such uses, distinct gradient measurement changes in contiguous locations may further add to the confidence in utility line location results.

Figure 7B:
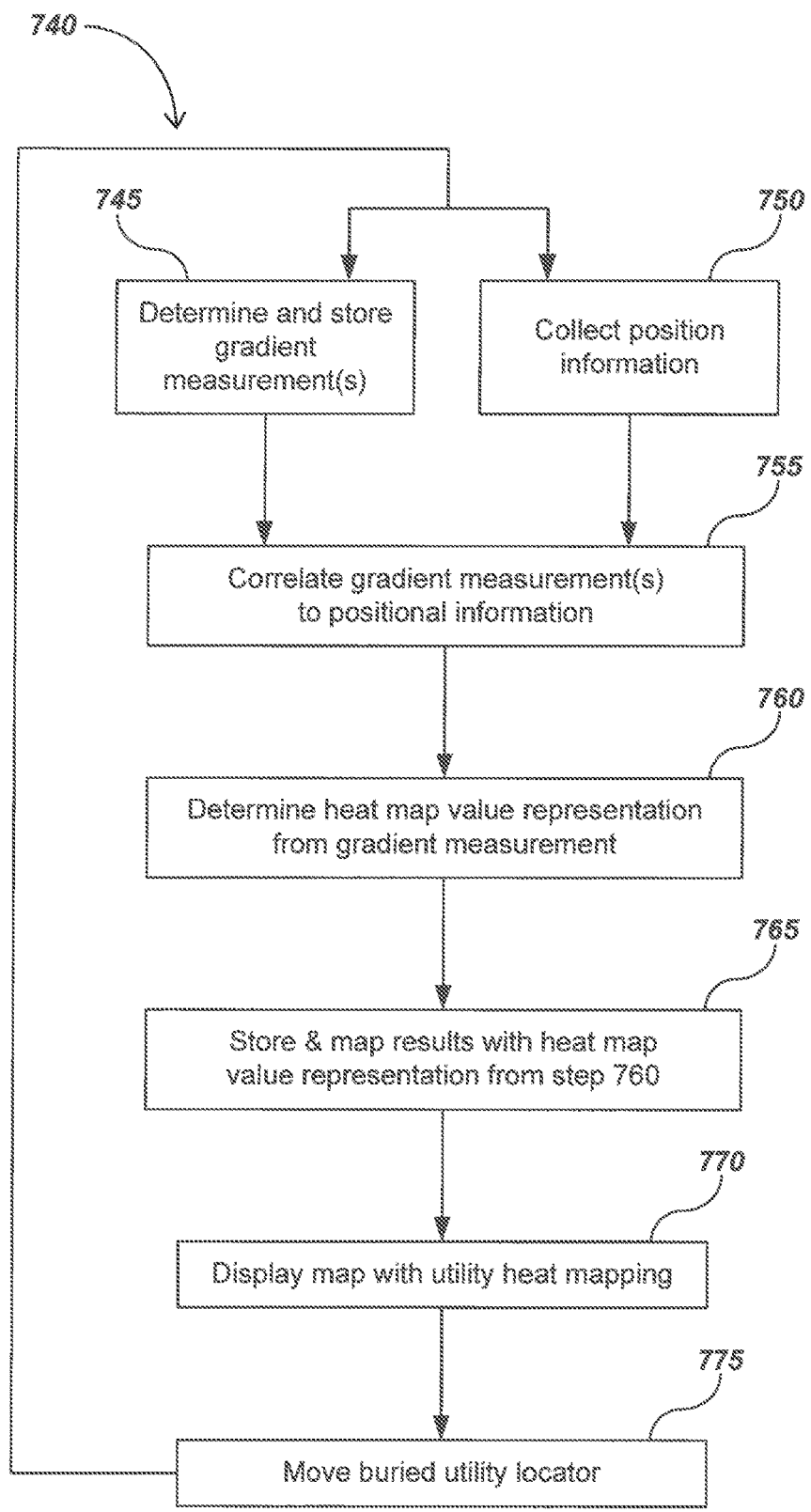
FIG. 7B is a method for utility locating heat maps.

Turning to FIG. 7B, a heat map locating method 740 may include parallel first steps 745 and 750. Within step 745, gradient measurements may be determined and stored. This step may be accomplished, for instance, using one or more of the methods discussed in conjunction with FIGS. 2A-4C. This heat map may include encoded azimuthal information graphically indicating the utility orientation on the map and/or within an image. In the parallel first step 750, position information is collected by the utility locator. For instance, GNSS, GPS, INS, ground tracking devices, and/or other position determining systems and sensors may be used within the utility locator and/or a utility locator system. In a subsequent step 755, the gradient measurements determined at step 745 may be correlated to the positional information determined at 750. In a step 760, a heat map value representation may be assigned to the gradient measurement(s) from step 745 from a predetermined range of value representations. For instance, the heat map value representation of the gradient measurement(s) may be a particular color, shade, pattern, and/or other representation to indicate the gradient measurements value within a hierarchy of gradient measurement values. In a subsequent step 765, results from previous steps may be stored and added to a map with heat map representation from step 760. In another subsequent step 770, a map with utility heat mapping may be displayed. Displaying of such maps may occur on the visual display element of the utility locator, smart phones, tablets, other system devices, and/or other computing devices. In a subsequent step 775, the utility locator may be moved to the next location within the locate area. Method 740 may be repeated as the utility locator is moved about the locate area. In some such locating methods in keeping with the present disclosure, a user equipped with a utility locator may be made to measure broadcast signal gradients throughout the entire locate area so as to create a complete utility locating heat map. The locations where such changes in gradient measurements occur may indicate the presence of a buried utility line at those locations. The resulting utility locating heat map may provide a solution whereby the location of buried utility lines may be visually identifiable to a user and/or identified by pattern recognition and/or other machine learning methods within the utility locator and/or other system devices.

Figure 8A:
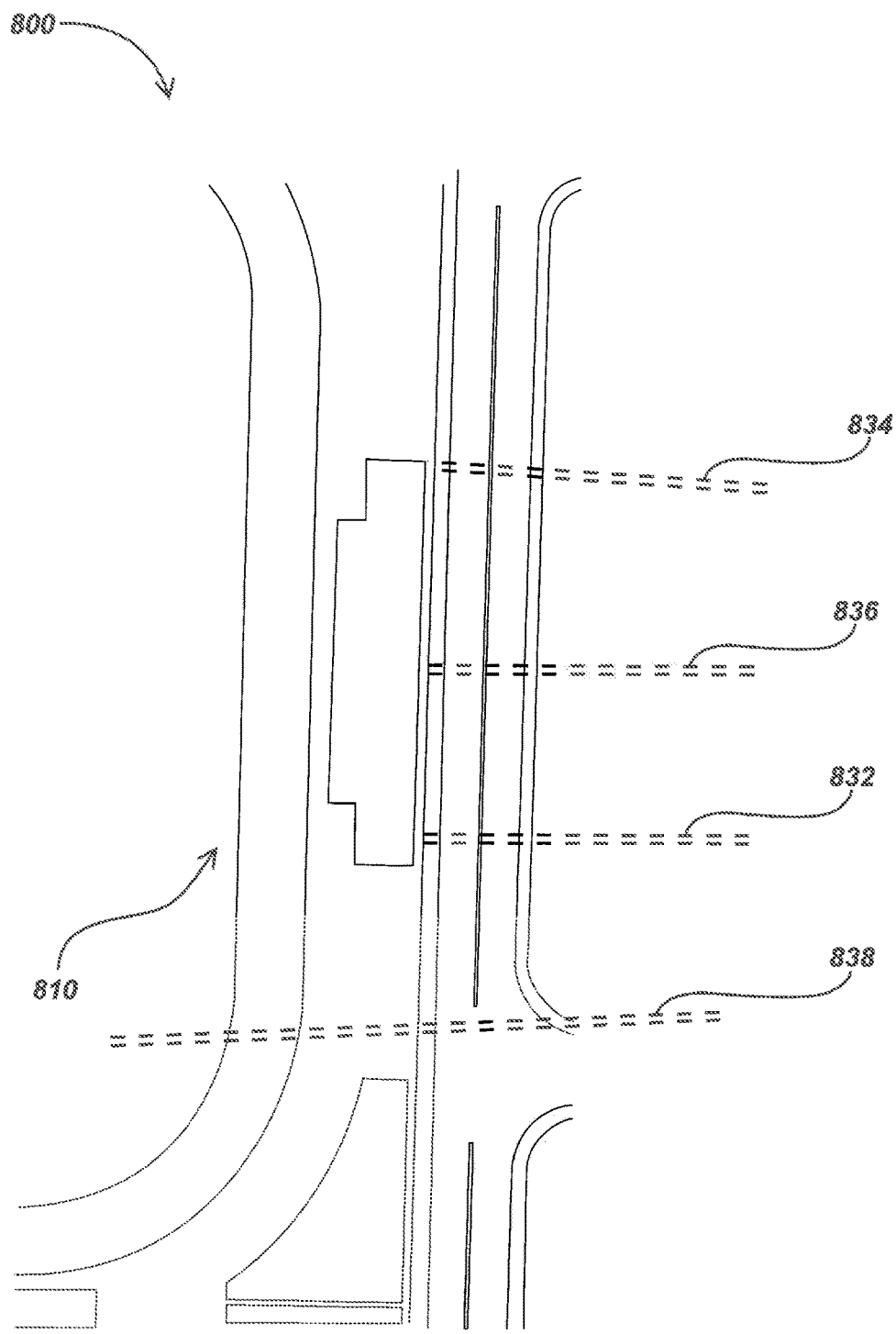
FIG. 8A is a utility locating map.

In some embodiments, heat mapping and/or other mapping and locating methods may be used to create a more refined map containing the location and depth and orientation of buried utilities. As illustrated in FIG. 8A, map 800 with locate area map element 810, which may correspond in location to the utility locating heat map 700 and locate area map element 710 of FIG. 7A, may indicate the location of buried utility lines such as utility lines 832, 834, 836, and 838. In some embodiments other information may be represented within a utility locating map such as map 800. For instance, additional information that such a map may contain may include but should not be limited to a determined depth of each utility line at various measured points, type of utility line, and various measurements of phase, frequency, current direction, and/or other measured aspects of the broadcast signal(s).

Figure 8B:
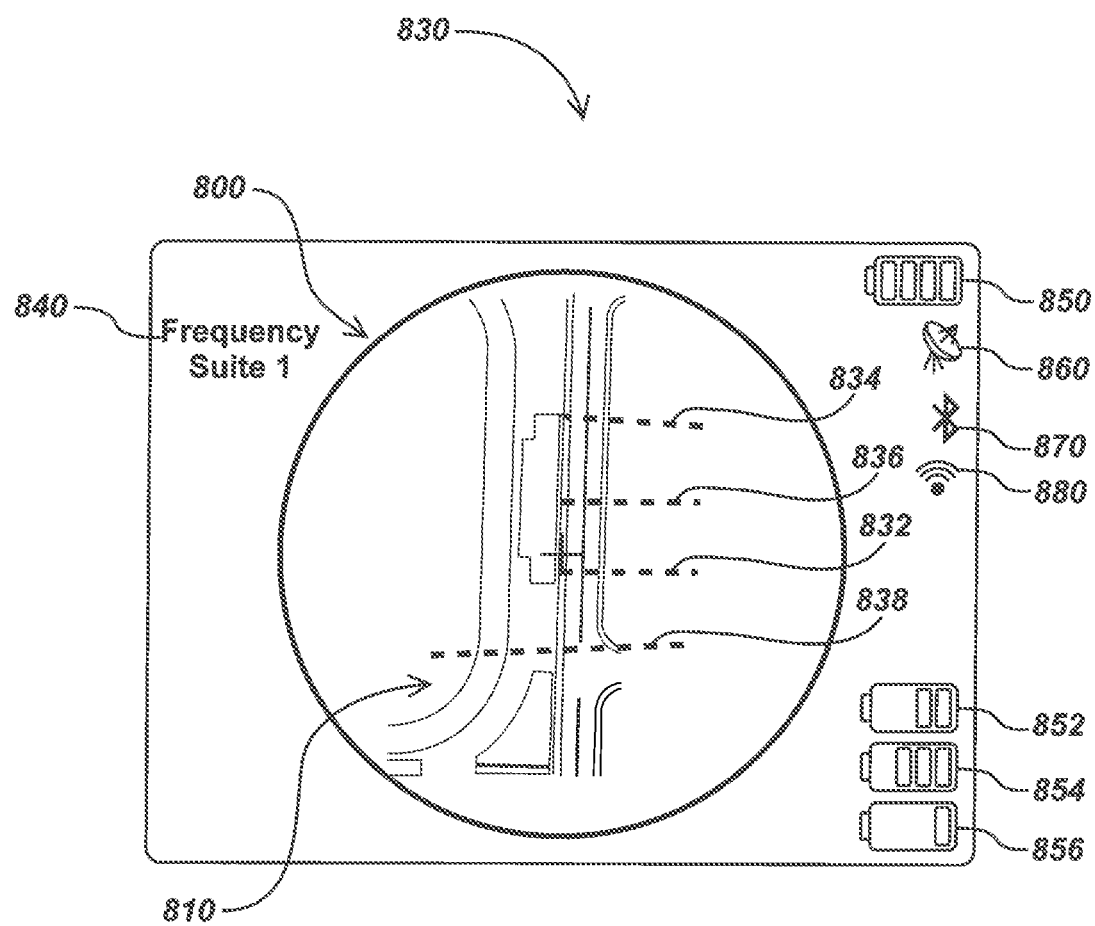
FIG. 8B is a graphical user interface showing a utility locating map.

The map 800 may further be displayed upon various electronic computing devices and/or other system devices. For instance, as illustrated in FIG. 8B, map 800 may be displayed upon the graphical user interface 830 of a utility locator. Graphical user interface 830 may further include device and system indicators. For instance, graphical user interface 830 may include a frequency suite indicator 840 as to which frequency or frequencies the utility locator is currently tuned. Other indicators may further include a battery power indicator 850 indicating remaining battery power available for the utility locator, other system device battery indicators 852, 854, and 856 indicating the remaining battery power of other connected system devices. Other indicators may include, but may not be limited to, a GPS connection indicator 860, Bluetooth connection indicator 870, and a WI-FI connection indicator 880.

Figure 9A:
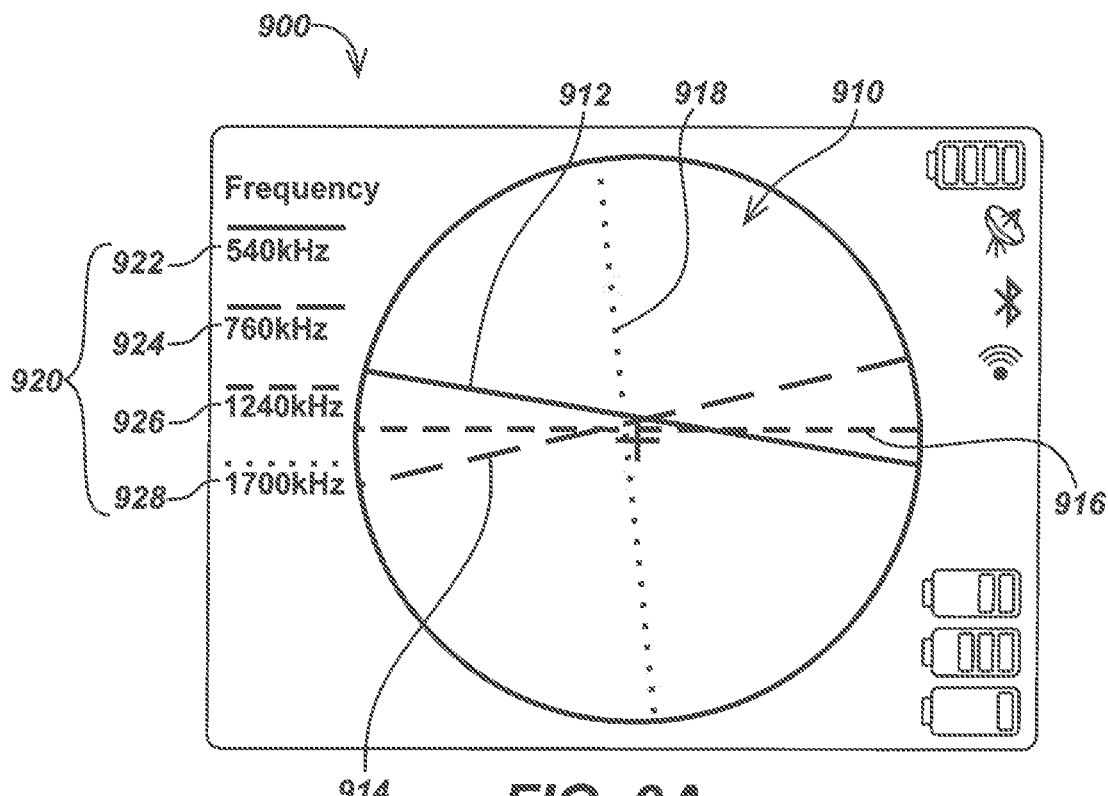
FIG. 9A is a graphical user interface showing broadcast signal measurements.
Figure 9B:
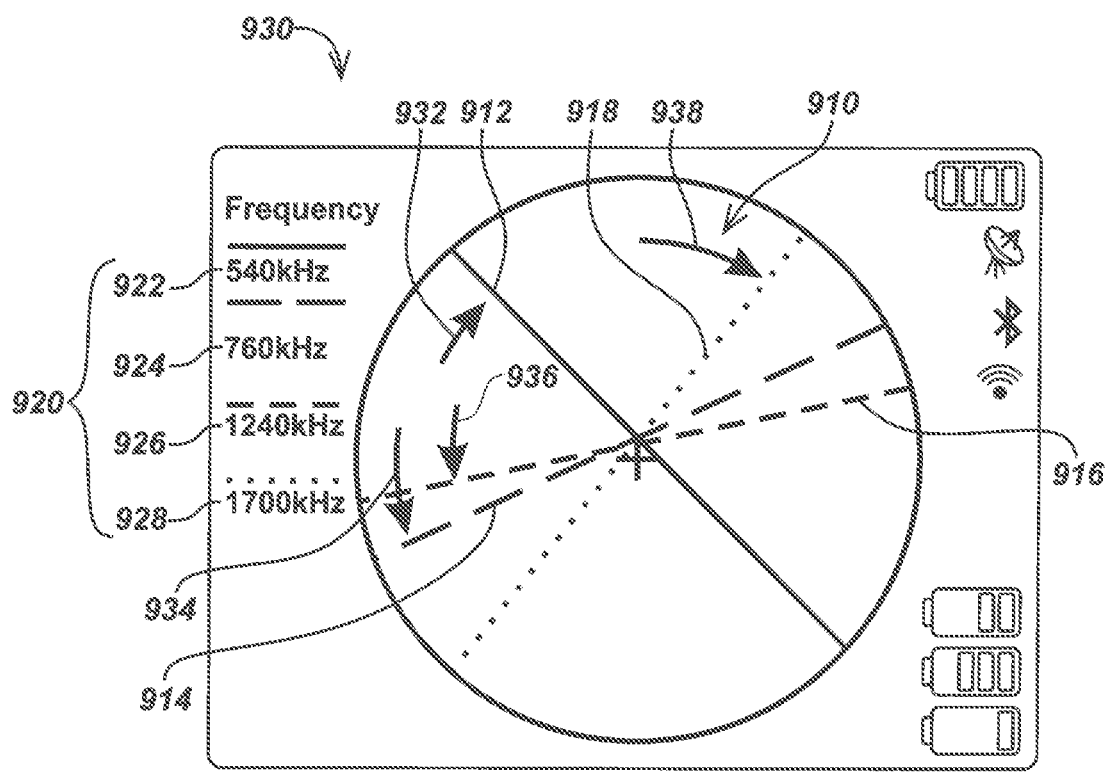
FIG. 9B is the graphical user interface of FIG. 8A showing change in broadcast signal measurements.
Figure 10:
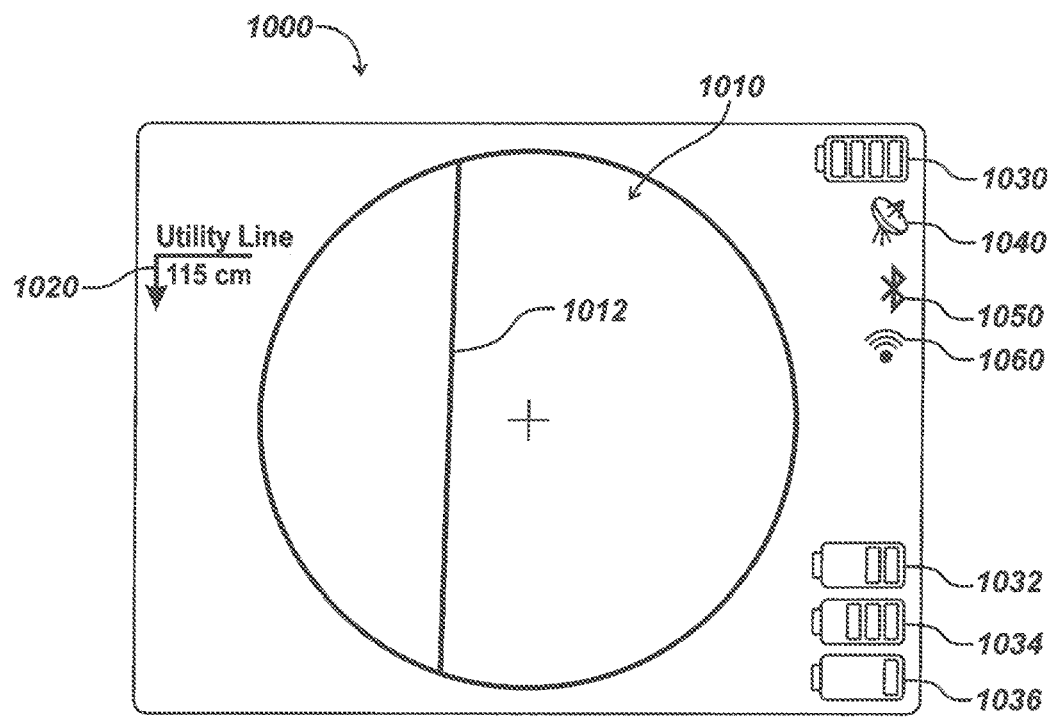
FIG. 10 is a graphical user interface showing utility line location and orientation.

Turning to FIGS. 9A and 9B, gradient measurements may be communicated to the user in various other ways. For instance, within graphical user interface 900 of FIG. 9A, display screen 910 may indicate a series of lines 912, 914, 916, and 918. Lines 912, 914, 916, and 918 may be representative of some measureable aspect of signals of the broadcast signals 922, 924, 926, 928 tuned to within frequency suite 920. For instance, lines 912, 914, 916, and 918 may be representative of azimuthal angle or a clocking of phase measurements of broadcast signals 922, 924, 926, 928. As illustrated in graphical user interface 930 of FIG. 9B which may correspond to graphical user interface 900 of FIG. 9A, but with signals corresponding to the tuned to broadcast signals 922, 924, 926, and 928 measured at a second point in time or space, movement/rotation of lines 912, 914, 916, and 918 in directions 932, 934, 936, and 938 respectively may indicate a change in broadcast signals 922, 924, 926, and/or 928 and may further indicate the presence of a buried utility line. In yet other embodiments, such changes in signal measurements beyond a threshold may be indicated in various other ways including audible and haptic feedback alerts as well as other graphical representations on a utility locator and/or other system device screen.

In some further embodiments, such signal measurement differences and calculated gradients may not be communicated to the user at the utility locator but rather only essential information for a user to visualize and/or locate the buried utility or utilities may be communicated. For instance, position, orientation, and depth of a utility line may be represented on a graphical user interface. Such a graphical user interface 1000 illustrated in FIG. 10, may include a display screen 1010 correlating to the immediate locate location. Display screen 1010 may further show an indication as to the location and orientation of a detected utility line 1012. A depth indicator 1020 for utility line 1012 may indicate its determined depth within the ground. In some embodiments, other utility information may include, but should not be limited to, type of utility line detected, current direction, and/or other information. Graphical user interface 1000 may also include other indicators such as a battery power indicator 1030 indicating remaining battery power available for the utility locator, and/or other system device battery indicators 1032, 1034, and 1036 indicating the remaining battery power of other connected system devices. Other indicators may include, but may not be limited to, a GPS connection indicator 1040, Bluetooth connection indicator 1050, and a WI-FI connection indicator 1060.

Figure 11:
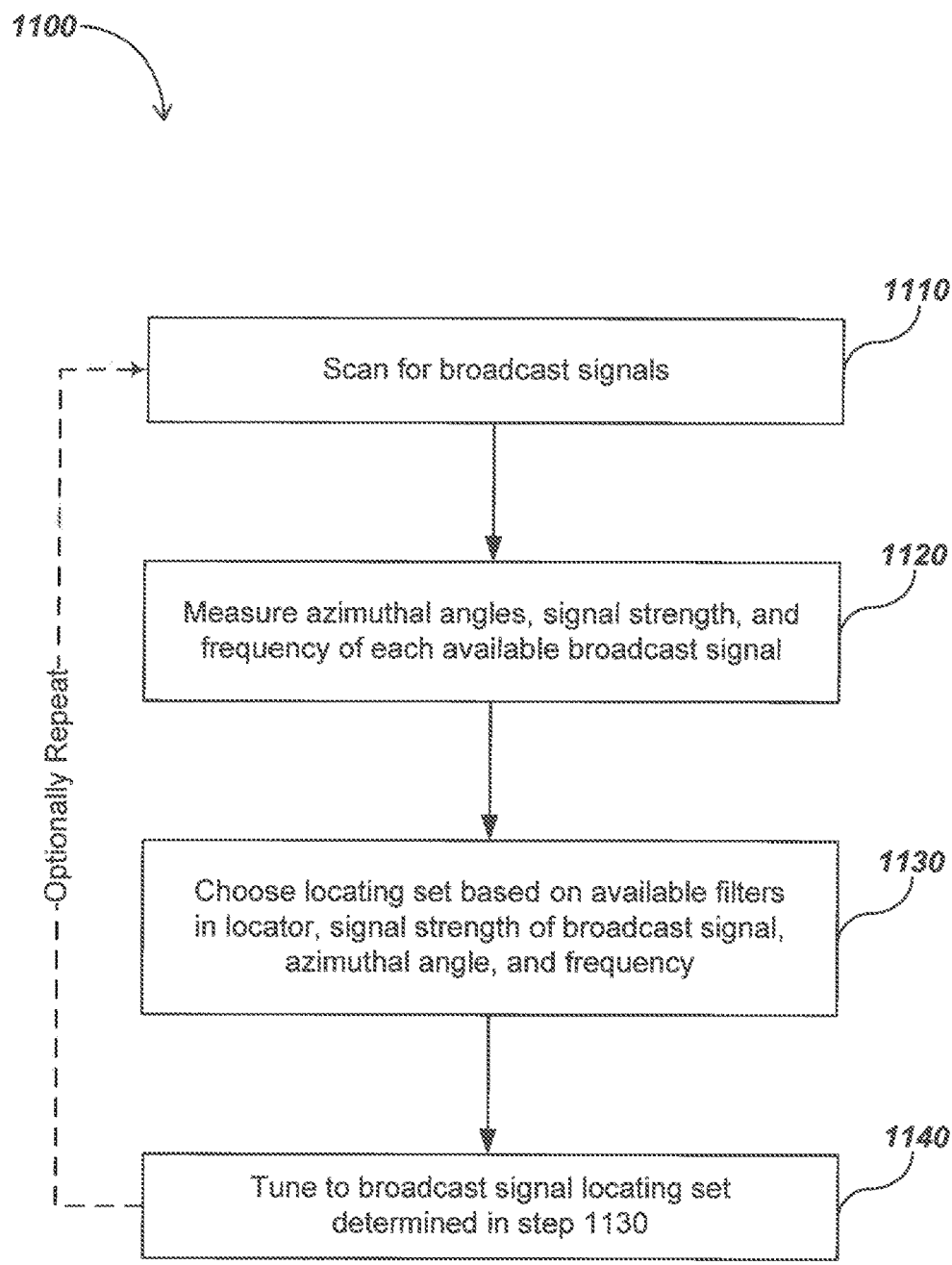
FIG. 11 is a method for determining the best available broadcast signal or broadcast signals.

Turning to FIG. 11, a method 1100 for selecting best available broadcast signals is described. Within method 1100, a first step 1110 may include scanning for available broadcast signals. In some embodiments, broadcast signals may be AM radio signals. In a second step 1120, the azimuthal angles, signal strength, and frequency of each available signal may be measured. In a third step 1130, a locating set may be determined based on available quantity of digital filters within the utility locator and measured signal strengths, azimuthal angles, and/or particular frequencies. In some embodiments a suite of signals may be selected based on one or more of these criteria. This may include broadcast signals at particular frequencies and/or at a wide range of frequencies (e.g. 530-1710 kHz) as broadcast signals may induce differently onto a buried conductor based on it's particular frequency. Embodiments configured for measuring signals across a wide range of low to high frequencies may provide increased opportunity to collect and determine information regarding buried utility lines. In a final step 1140, the utility locator may be tuned to the selected frequency or frequencies determined in step 1130. Tuning may be continuous as the signal broadcast changes with time and position.

In embodiments where position of the utility locator and transmission sources are known values, modeling of broadcast signals therefrom may be used to determine the presence or absence, position, depth, orientation of underground utility lines, and/or other locate information. For instance, a utility locator may include database information of locations of AM radio broadcast towers that may further detail frequencies and signal power by which each are transmitted and/or other aspects of the locate environment and/or broadcast signal(s). Comparison of measured broadcast signals at the utility locator's location to predicted signal measurements from a model of signals at the same location may allow for the determination of the presence of a buried utility line when there is a measured difference and/or the absence of a buried utility line when there is no measured difference between the two.

Figure 12:
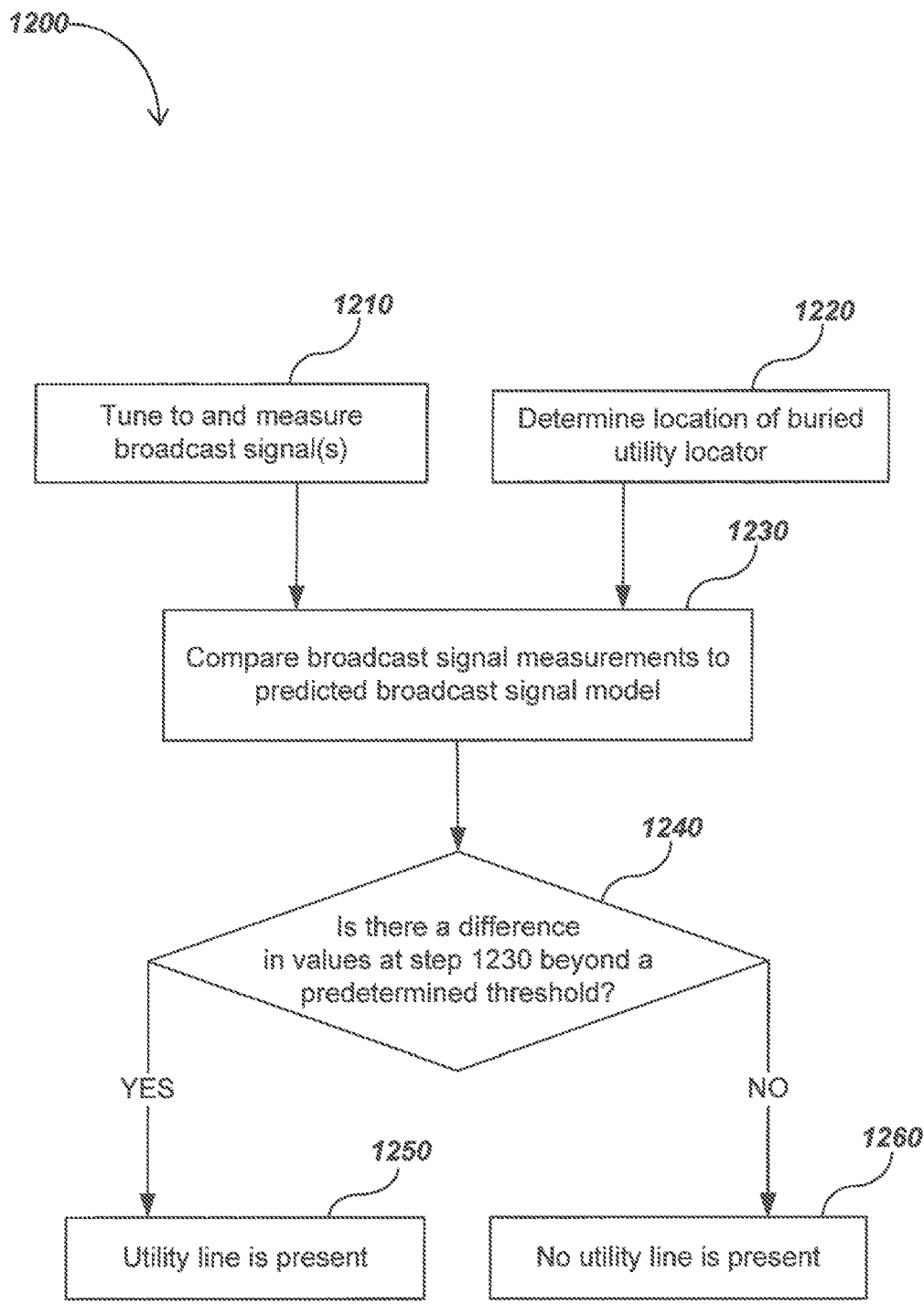
FIG. 12 is a method demonstrating a broadcast signal modeling approach to locating utility lines.

As illustrated in method 1200 of FIG. 12, such a modeling comparison method may include a first step 1210 whereby the utility locator may tune to and measure broadcast signals. In a parallel first step 1220, location of the utility locator may be determined. In a subsequent step 1230, broadcast signal measurements may be compared to database model information regarding predicted signal measurements based on current location determined at step 1220. In a decision step 1240, a determination may be made as to whether the differences in values at step 1230 are beyond a predetermined threshold. If the values from step 1230 are beyond the threshold at step 1240, method 1200 may proceed to step 1250 where a utility line may be determined to be present. The presence of the utility line or lines as well as other utility information may be communicated to the user. If the values from step 1230 are not beyond the threshold at step 1240, method 1200 may proceed to step 1260 where no utility line may be determined to be present. Method 1200 may be repeated as the utility locator is moved about the locate area.

Figure 13:
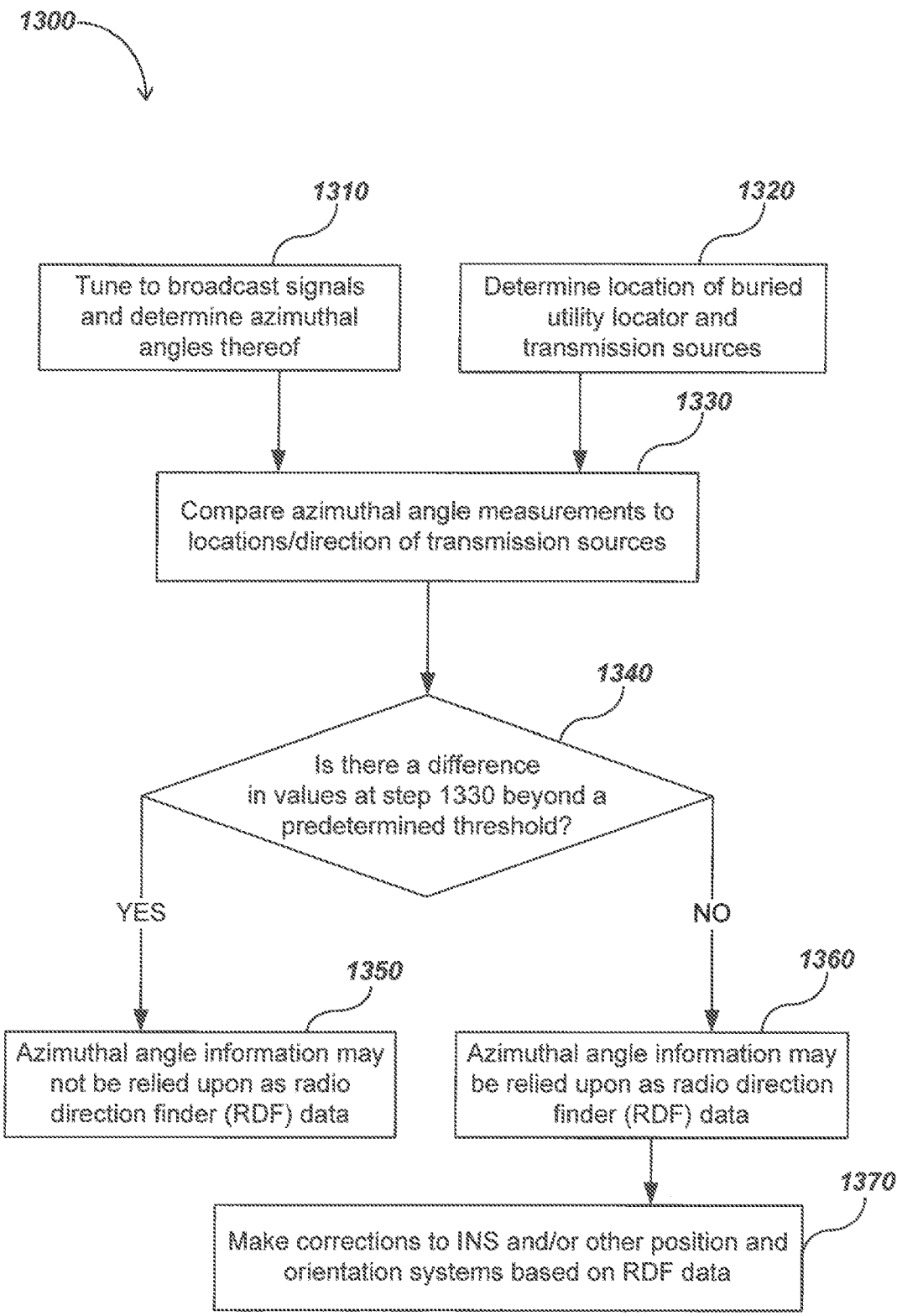
FIG. 13 is a method for using azimuthal angle data as radio direction finder for correcting INS and/or other position and orientation systems and sensor data.

Turning to FIG. 13, a method 1300 for using distortion metrics of azimuthal angle measurements may be used to qualify and/or adjust inertial navigation systems and/or other positional or navigation measurements within the utility locator. In a first step 1310, the utility locator may tune to and determine azimuthal angles of one or more broadcast signals. In a parallel first step 1320, the locations of the utility locator and transmission sources may be determined.

In a subsequent step 1330, a comparison of azimuthal angles and actual directions/locations of transmission sources is made based on database locations of transmission sources. In a decision step 1340, a determination may be made as to whether the differences in values at step 1330 are beyond a predetermined threshold. If the values from step 1330 are beyond the threshold at step 1340, method 1300 may proceed to step 1350 where it may be determined that azimuthal angle information may not be relied upon as radio direction finder (RDF) data. If the values from step 1330 are not beyond the threshold at step 1340, method 1300 may proceed to step 1360 where it may be determined that azimuthal angle information may be relied upon as radio direction finder (RDF) data. From step 1360, a subsequent step 1370 may include making adjustment to INS and/or other position and orientation systems within the utility locator based on the RDF data of step 1360. Method 1300 may be repeated throughout the locate operation.

Figure 14A:
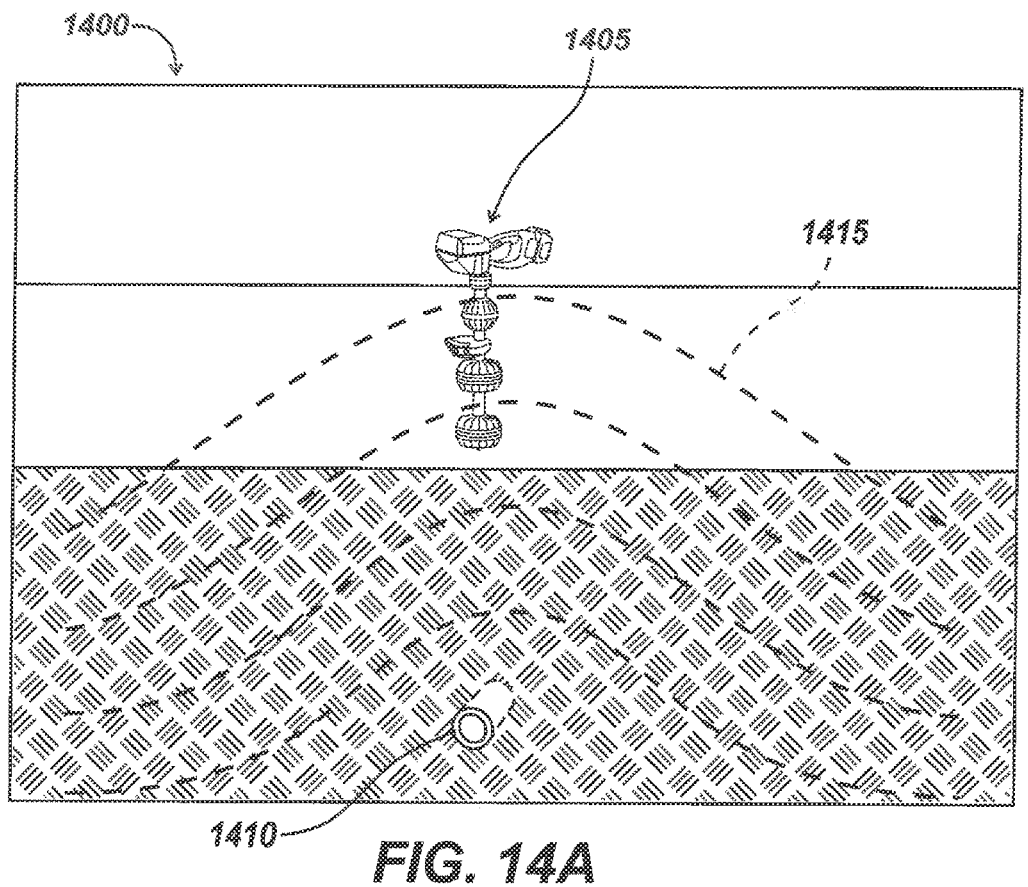
FIG. 14A is an illustration demonstrating depth of utility lines and corresponding broad signal pattern.
Figure 14B:
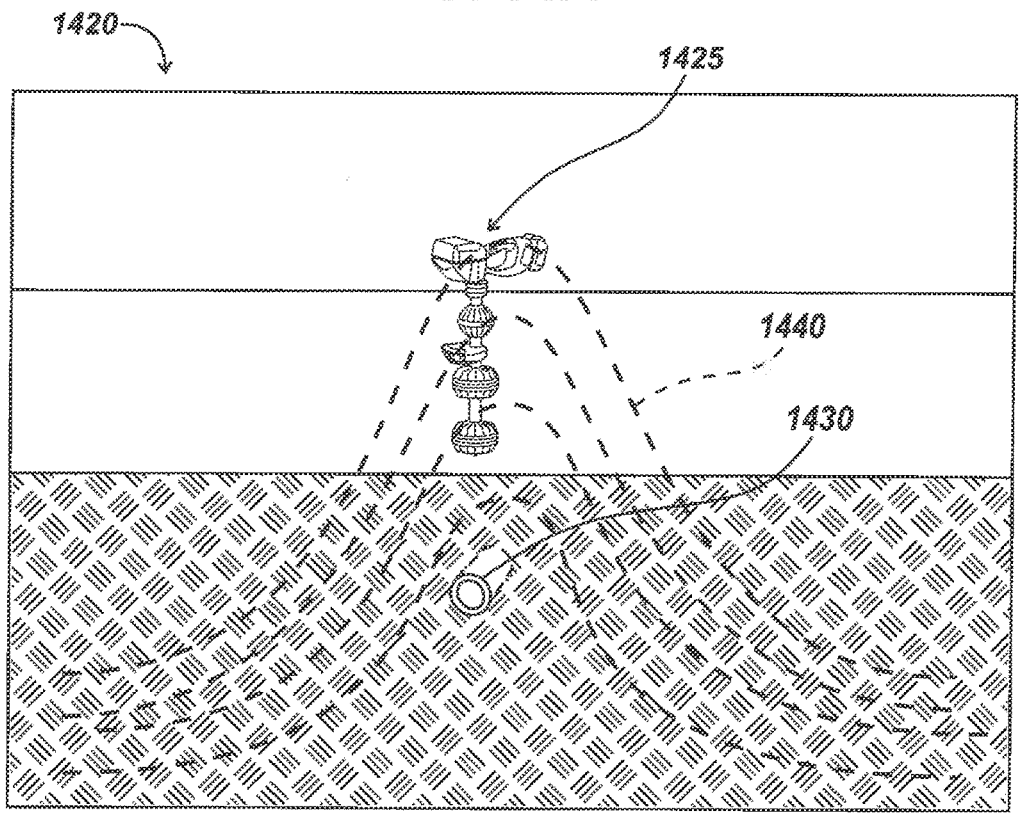
FIG. 14B is an illustration demonstrating shallowness of utility line and corresponding abrupt signal pattern

Turning to FIGS. 14A and 14B, the depth of a conductive buried utility line may be determined by the shape of the measured field. For instance, within locate operation 1400 of FIG. 14A, the utility locator 1405 may be configured to determine that the utility line 1410 may be deep within the ground due to the gradual slope of field 1415. Within locate operation 1420 of FIG. 14B, the utility locator 1425 may be configured to determine that the utility line 1430 may be shallow within the ground due to the steep slope of field 1440. Signal models may be used to quantify the actual depth of the utility based on the gradualness or steepness of slope of the measured field.

Figure 14C:
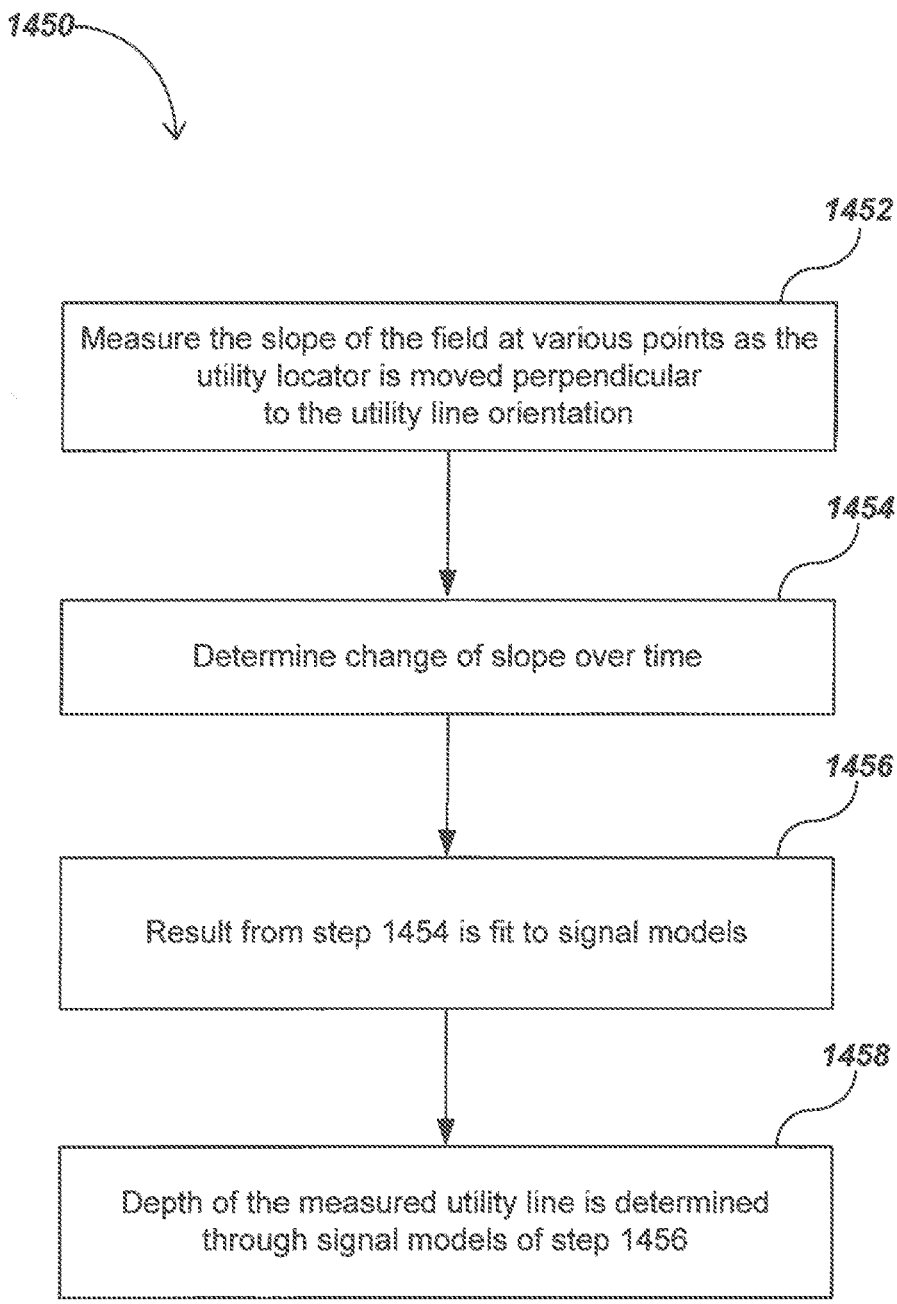
FIG. 14C is an illustration describing locations within a locate operation that may be used to determine utility line depth.

Turning to FIG. 14C, such a method 1450 may include a first step 1452 whereby slope of the field is measured at various points as the utility locator is moved perpendicular to the utility line orientation. In a subsequent step 1454, the change of slope over time is determined. In a step 1456, the result from step 1454 is fit to signal models. In a final step 1458, the signal model is used to reference a depth of the measured utility line.

The depth of a conductive buried utility line may further be determined through range calculations described within method 580 of FIG. 5C. For instance, within locate operation 1460, measurement $\vec{B}_{tower}$ of the broadcast signal 1465 from transmission source 1470 may be determined at a first location 1475 where there is an absence of interference or superposition of signals. In a second location 1480, a measurement $\vec{B}_{total}$ is determined wherein the presence of a conductive utility line 1485 may cause a superposition of reradiated signal 1490 and broadcast signal 1465. Subtracting of values may result in a measure of $\vec{B}_{utility}$. The gradient tensor measurements of $\vec{B}_{utility}$ may then further be used to determine range to the buried utility line 1485 using method 580 of FIG. 5C. When the utility locator is positioned and measuring signal above the utility line, such as with second location 1480, the range may be the depth of the utility line.

Figure 15A:
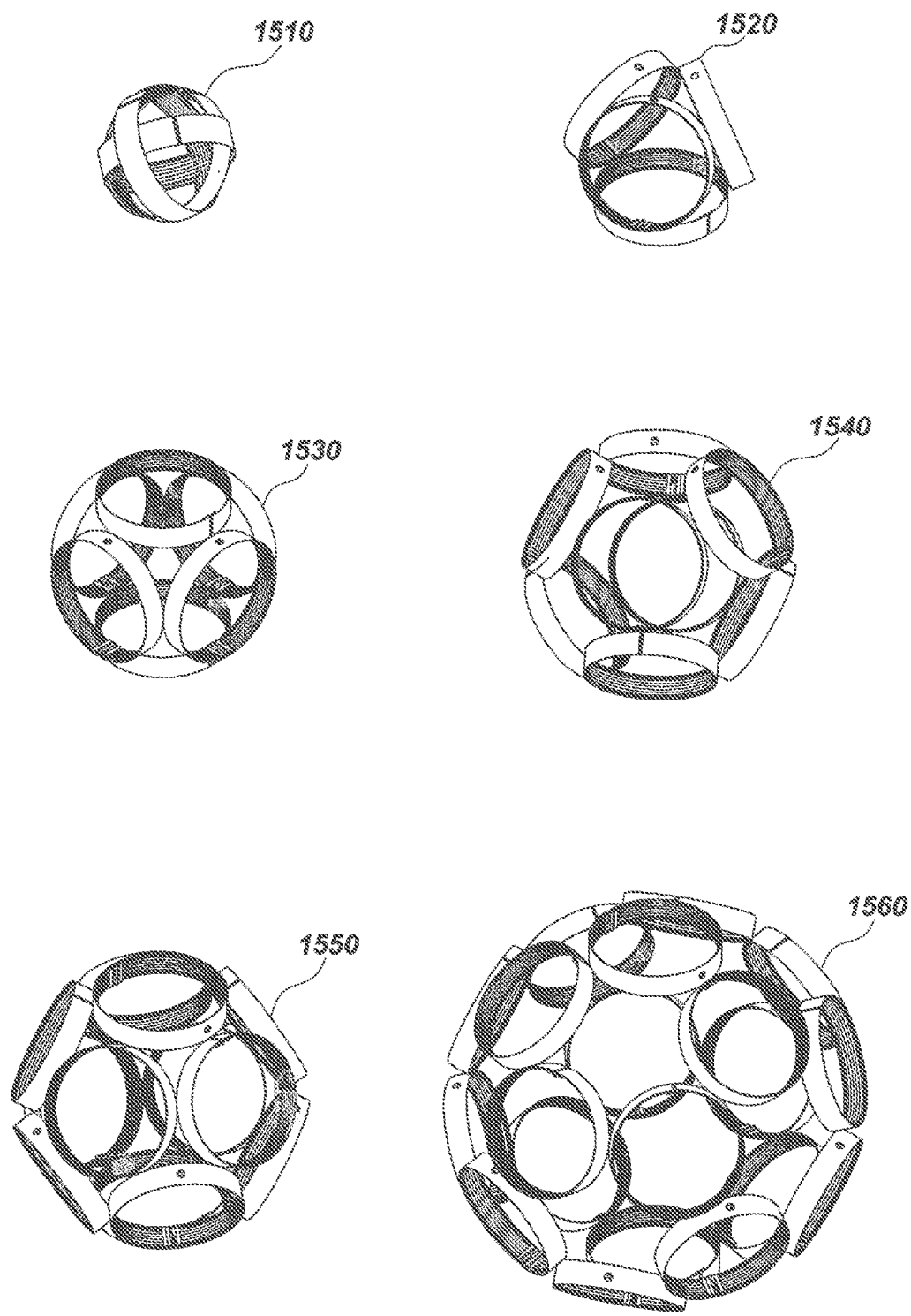
FIG. 15A is an illustration of various antenna array configurations.

Turning to FIG. 15A, a variety of antenna array configurations which may be used within a utility locator are illustrated. For instance, antenna array 1510 may be an omnidirectional antenna as described in U.S. Pat. No. 7,009,399, issued Mar. 7, 2006, entitled Omnidirectional Sonde and Line Locator; U.S. Pat. No. 7,498,816, issued Mar. 3, 2009, entitled Omnidirectional Sonde and Line Locators; U.S. Pat. No. 7,619,516, issued Nov. 17, 2009, entitled Single and Multi-Trace Omnidirectional Sonde and Line Locators and Transmitter Used Therewith; U.S. Pat. No. 7,830,149, issued Nov. 9, 2010, entitled Single and Multi-Trace Omnidirectional Sonde and Line Locators and Transmitter Used Therewith; and U.S. Pat. No. 8,035,390, issued Oct. 11, 2011, entitled Omnidirectional Sonde and Line Locators. The content of each of these applications is incorporated by reference herein in its entirety. The various other antenna configurations illustrated may be regular convex polyhedrons in shape. For instance, tetrahedron antenna array 1520, cube antenna array 1530, octahedron antenna array 1540, dodecahedron antenna array 1550, icosahedron antenna array 1560, and gradient antenna array (not shown) may all be antenna array configurations employed in the various embodiments herein. These various antenna arrays can be used in combination in a single instrument or on a single platform such as a moving vehicle. Further information regarding dodecahedron antenna configurations and utility locators and associated systems and methods may be found in U.S. Pat. No. 9,207,350, issued Dec. 8, 2015, entitled Buried Object Locator Apparatus with Safety Lighting Array, the content of which is incorporated by reference herein in its entirety. In some embodiments and methods, greater sensitivity in measuring gradients may result from regular convex polyhedron antenna arrays where the antenna array has both the largest number of coils possible as well as parallel oppositely paired antenna coils such as with dodecahedron antenna array 1550.

Signal measurement resulting in gradient tensors may be achieved through various different antenna array configurations. For instance, given the tensor field $$\begin{bmatrix} G_{xx} & G_{xy} & G_{xz} \\ G_{yx} & G_{yy} & G_{yz} \\ G_{zx} & G_{zy} & G_{zz} \end{bmatrix}$$

the individual tensor components may be defined as $G_{xx}$, $G_{xy}$, $G_{xz}$, $G_{yx}$, $G_{yy}$, $G_{yz}$, $G_{zx}$, $G_{zy}$, and $G_{zz}$. Utility locators in keeping with the present disclosure may have antenna coils, antenna arrays, and/or diametrically opposed antenna coil pairs oriented and positioned to measure signal resulting in individual tensor component values for $G_{xx}$, $G_{xy}$, $G_{xz}$, $G_{yx}$, $G_{yy}$, $G_{yz}$, $G_{zx}$, $G_{zy}$, and $G_{zz}$. Such antenna and antenna array configurations may include antenna arrays 1510-1560 illustrated in FIG. 15A. The gradient tensor may be both traceless and symmetric such that the diagonal of the resultant three by three tensor may sum to zero and the off-diagonal values may be equal such that $G_{xx}+G_{yy}+G_{zz}=0$, $G_{xy}=G_{yx}$, $G_{yz}=G_{zy}$, and $G_{xz}=G_{zx}$. By solving for various tensor components, several unknown tensor components may be calculated instead of measured. For instance, since $G_{xx}+G_{yy}=-G_{zz}$ may be true and since $G_{xy}=G_{yx}$, $G_{yz}=G_{zy}$, and $G_{xz}=G_{zx}$ is given, signal measurements resulting in five tensor components, such as $G_{xx}$, $G_{yy}$, $G_{xy}$, $G_{xz}$, and $G_{zy}$ or their equivalents, may be used to calculate all nine tensor components in a uniform field. In some embodiments, two diametrically opposed antenna coils may be utilized to determine each tensor component. Such diametrically opposed antenna coil pairs may further be oriented along different axes corresponding to various orientations needed to measure signal associated with the various tensor component orientations. For instance, dodecahedron array 1550 of FIG. 15A having six diametrically opposed antenna coil pairings at various orientations, when included in a utility locator device (e.g. utility locator 1600 of FIGS. 16A and 16B), may be suited for signal measurement resulting in such gradient tensors by utilizing the symmetry and tracelessness of gradient tensors to solve for all nine components as described above. In other embodiments, a single antenna or antenna coil may be used to determine each required tensor component. In such embodiments, five antennas or antenna coils may be used to measure signal or signals and determine gradient tensors.

Figure 15B:
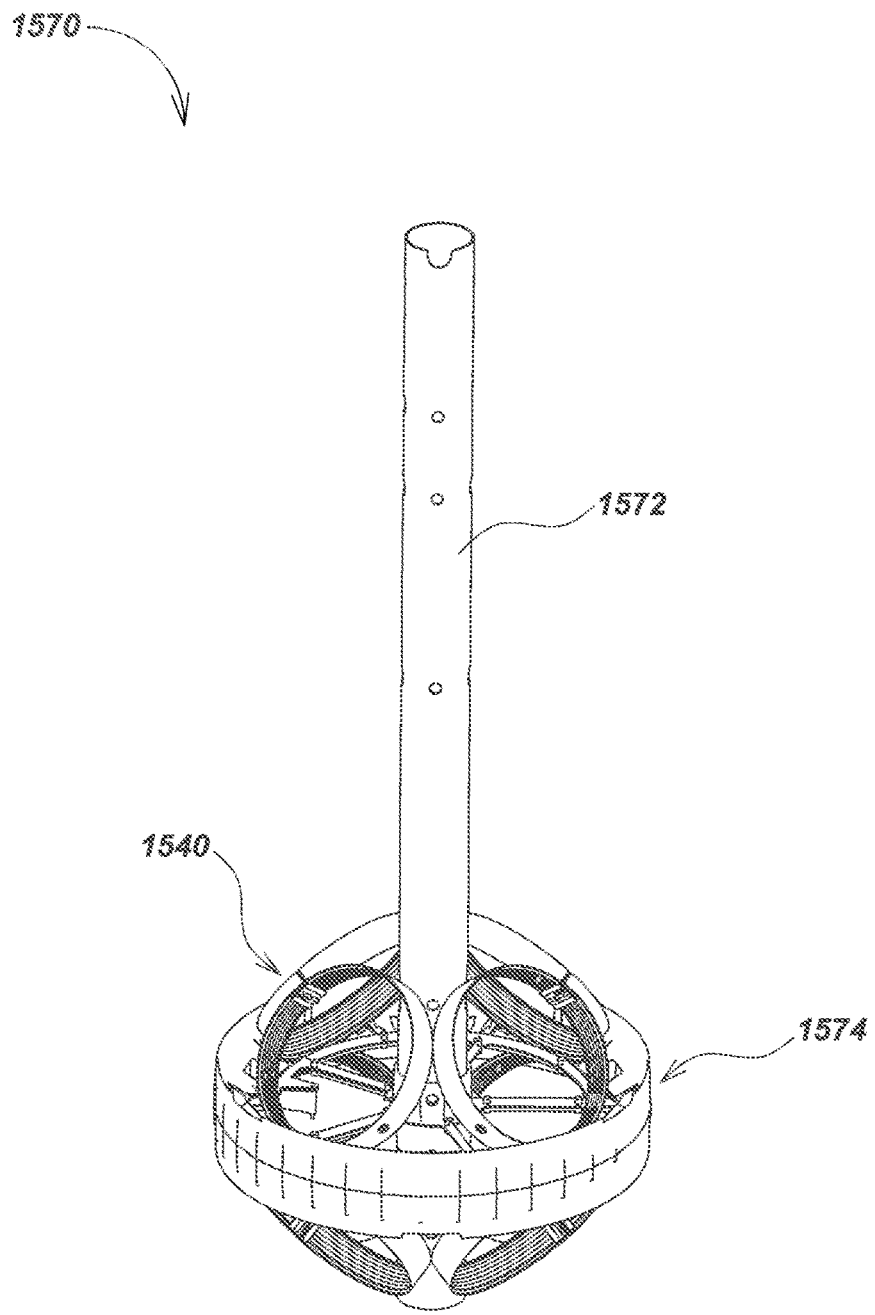
FIG. 15B is an illustration of a possible antenna array and mast configuration.
Figure 15C:
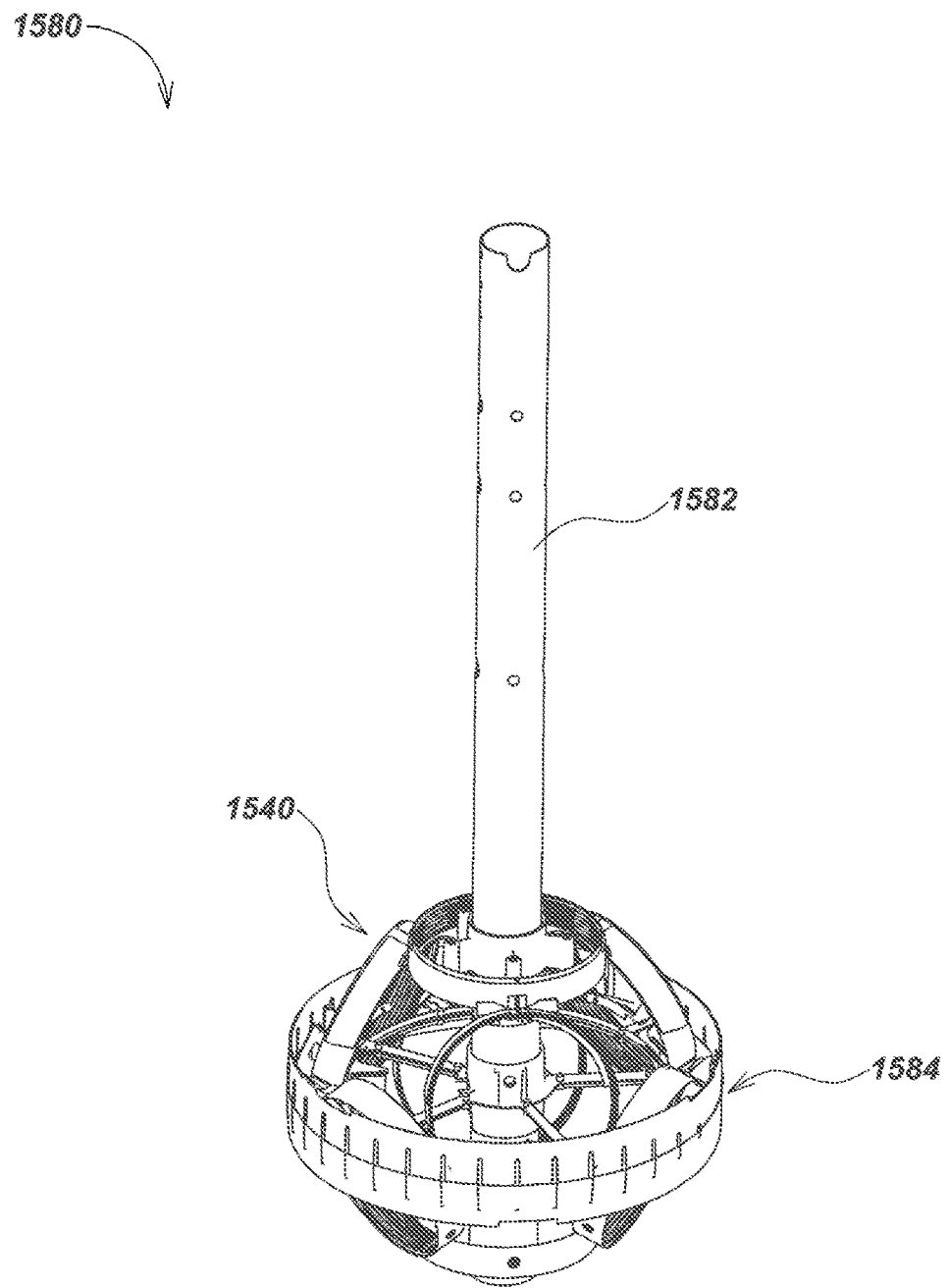
FIG. 15C is an illustration of another possible antenna array and mast configuration.

Turning to FIGS. 15B and 15C, the various antenna arrays may be secured or may attach to a utility locator mast in different orientations. For instance, within antenna array and mast embodiment 1570 of FIG. 15B the octahedron antenna array 1540 may attach to a mast 1572 by retaining assembly 1574. The octahedron antenna array 1540 may be oriented such that the mast 1572 may pass between antenna coils. In an alternative mounting orientation, such as antenna array and mast embodiment 1580 of FIG. 15C, the octahedron antenna array 1540 may attach to a mast 1582 by retaining assembly 1584 such that the mast 1572 may pass through the center of one antenna coil. In other embodiments, antenna arrays may be secured to the mast of a locator using other attachment methods or elements. Antenna arrays containing various quantities and orientations of antenna coils may be used.

Figure 1D:
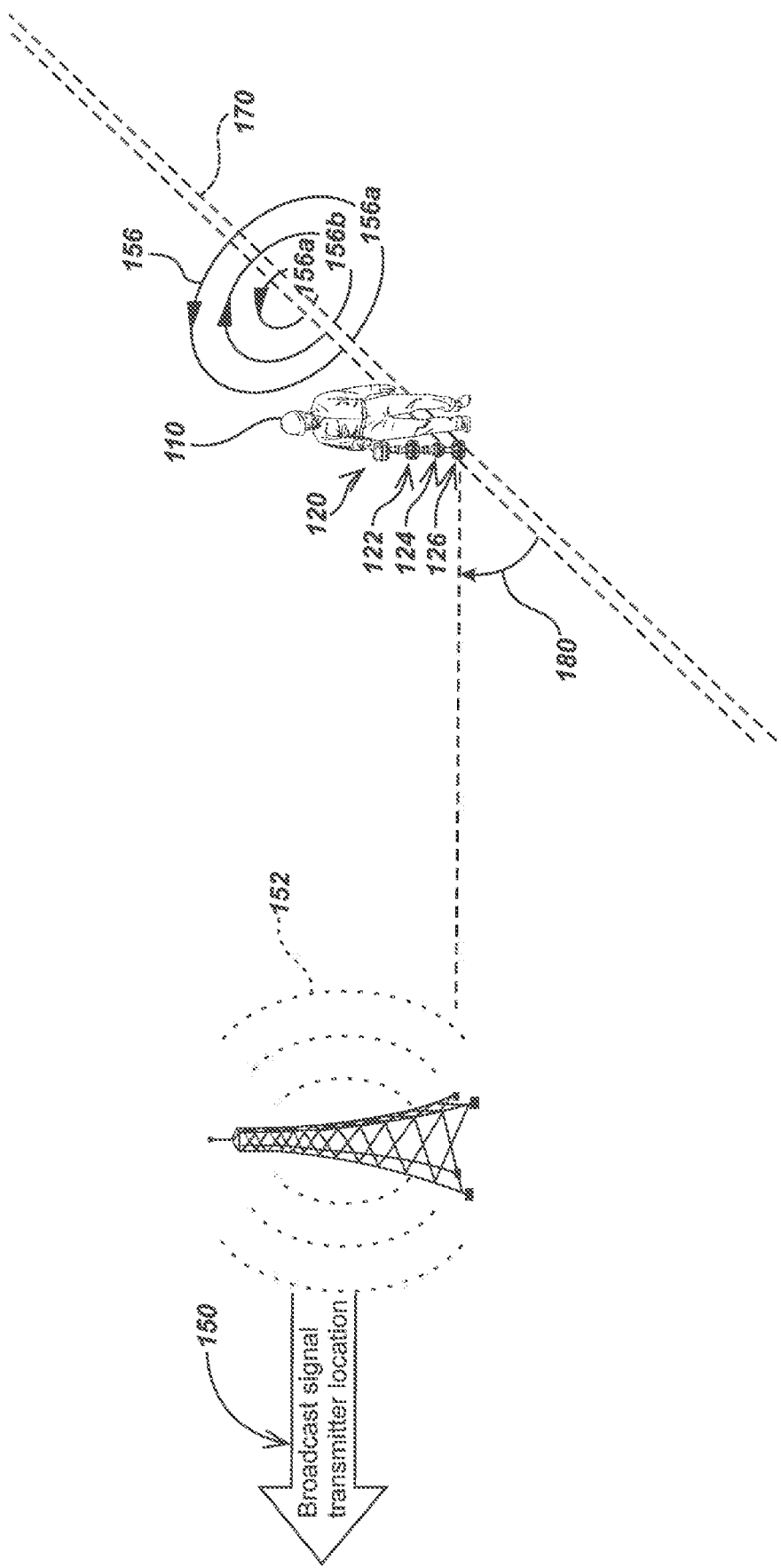
FIG. 1D is a partial view illustration of the broadcast signal locating operation from FIG. 1A detailing azimuthal angle measurement.
Figure 15D:
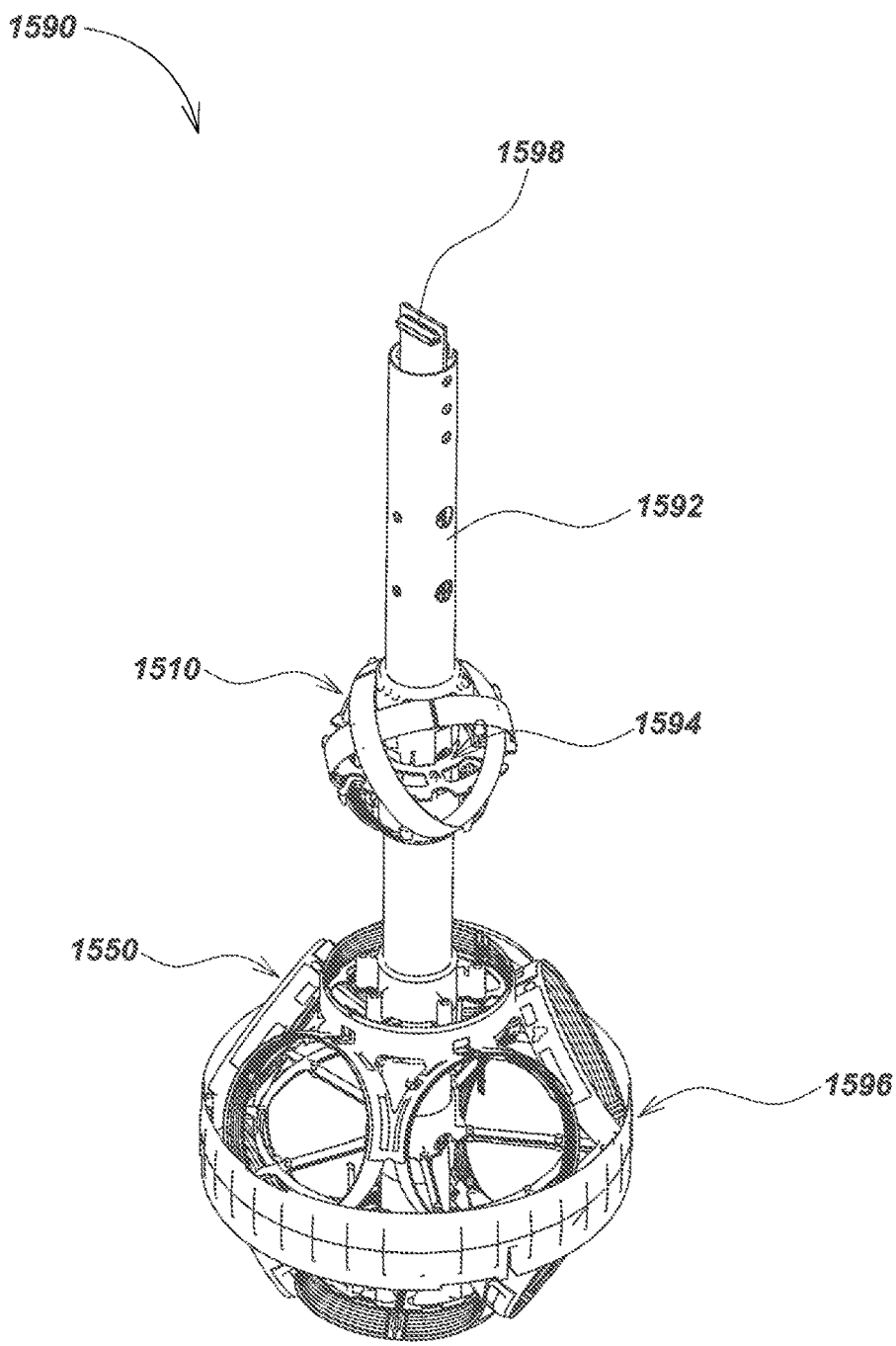
FIG. 15D is an illustration of a locator mast with two different antenna arrays.

The various utility locator embodiments may include multiple antenna arrays spatially separated along the vertical mast of utility locator such as with utility locator 120 of FIG. 1D used to determine vertical field gradient measurements. In some such embodiments, the various antenna arrays may be different and/or contain different numbers of antenna coils. For instance, the antenna arrays and mast embodiment 1590 illustrated in FIG. 15D may include an omnidirectional antenna array 1510 including three orthogonal antenna coils arranged in a substantially spheroid configuration as well as dodecahedron antenna array 1550 including twelve antenna coils. The omnidirectional antenna array 1510 and dodecahedron antenna array 1550 may each attach to mast 1592 via retaining assembly 1594 and retaining assembly 1596 respectively. As illustrated in FIG. 15D, a printed circuit board 1598 may be seated within the mast 1592 which may further electrically connect omnidirectional antenna array 1510 and dodecahedron antenna array 1550 to the top portion of a utility locator such as utility locator 1600 of FIGS. 16A and 16B.

Figure 16A:
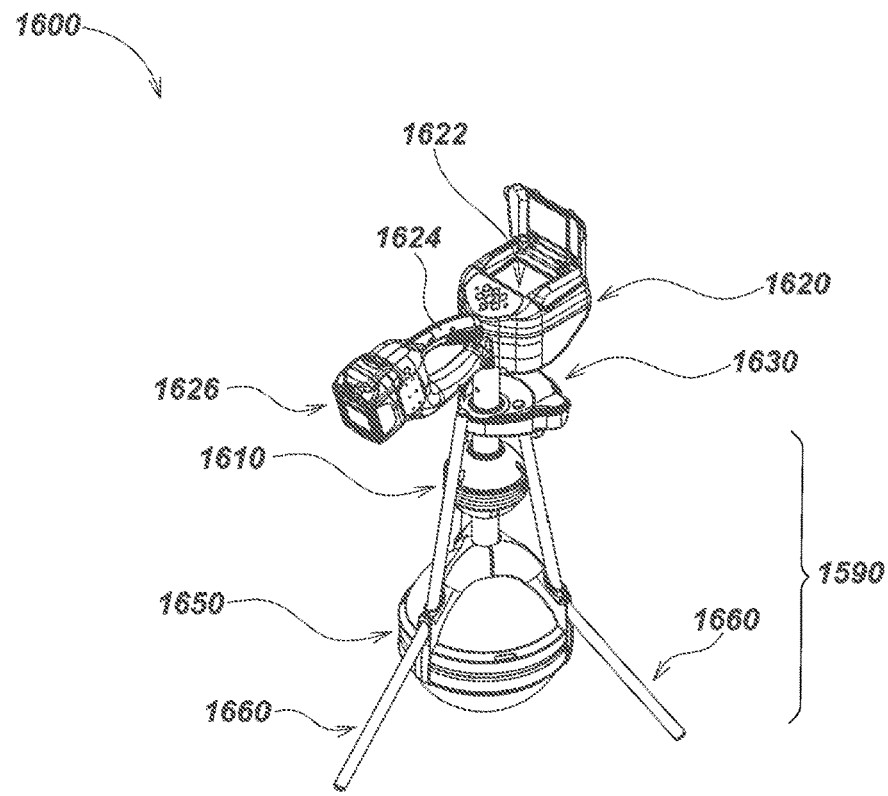
FIG. 16A is an isometric view of a utility locator embodiment.
Figure 16B:
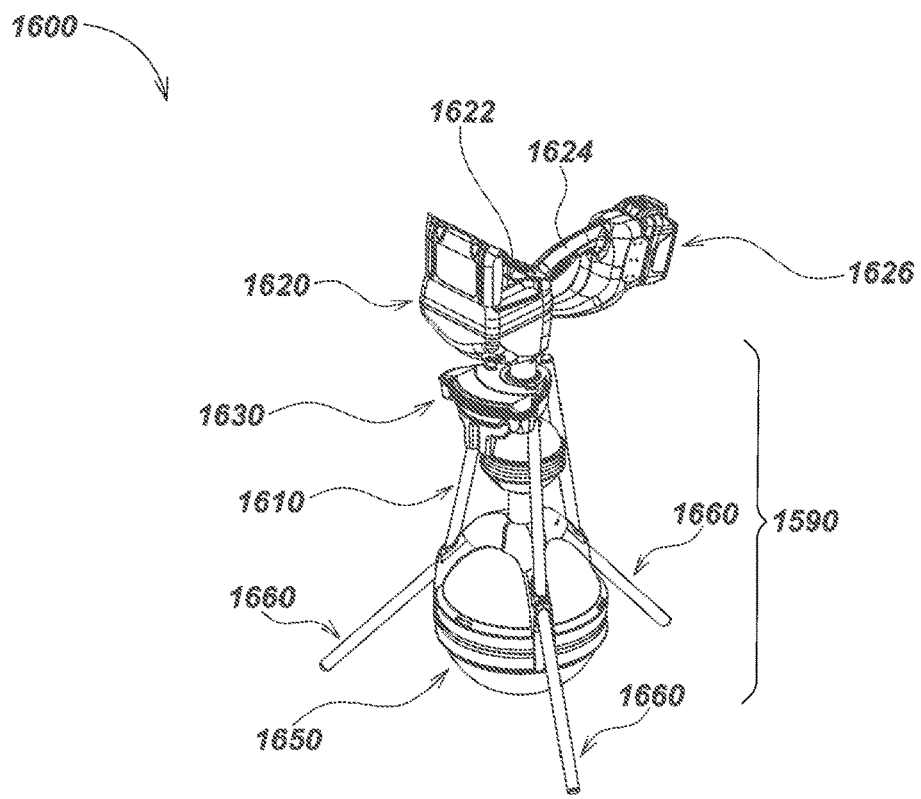
FIG. 16B is a top view of the utility locator embodiment of FIG. 16A.

As illustrated in FIGS. 16A and 16B, the utility locator 1600 may include the antenna arrays and mast embodiment 1590. Enclosure assemblies 1610 and 1650 may be made to seat about and encase the antenna arrays 1510 (FIG. 15D) and 1550 (FIG. 15D) respectively. The utility locator 1600 may further include a head assembly 1620 having a graphical user interface 1622 (which may be of the variety discussed in prior sections herein), a handle grip 1624 which may allow a user to grasp and carry the utility locator 1600, and a battery 1626 providing electrical power. Utility locator 1600 may include an optical ground tracking device 1630 such as those described in U.S. patent application Ser. No. 14/752,834, filed Jun. 27, 2015, entitled GROUND TRACKING APPARATUS, SYSTEMS, AND METHODS, the content of which is incorporated by reference herein in its entirety. Utility locator 1600 may further include a tripod assembly 1660 allowing the utility locator 1600 to be self-supporting in an upright orientation.

Figure 17:
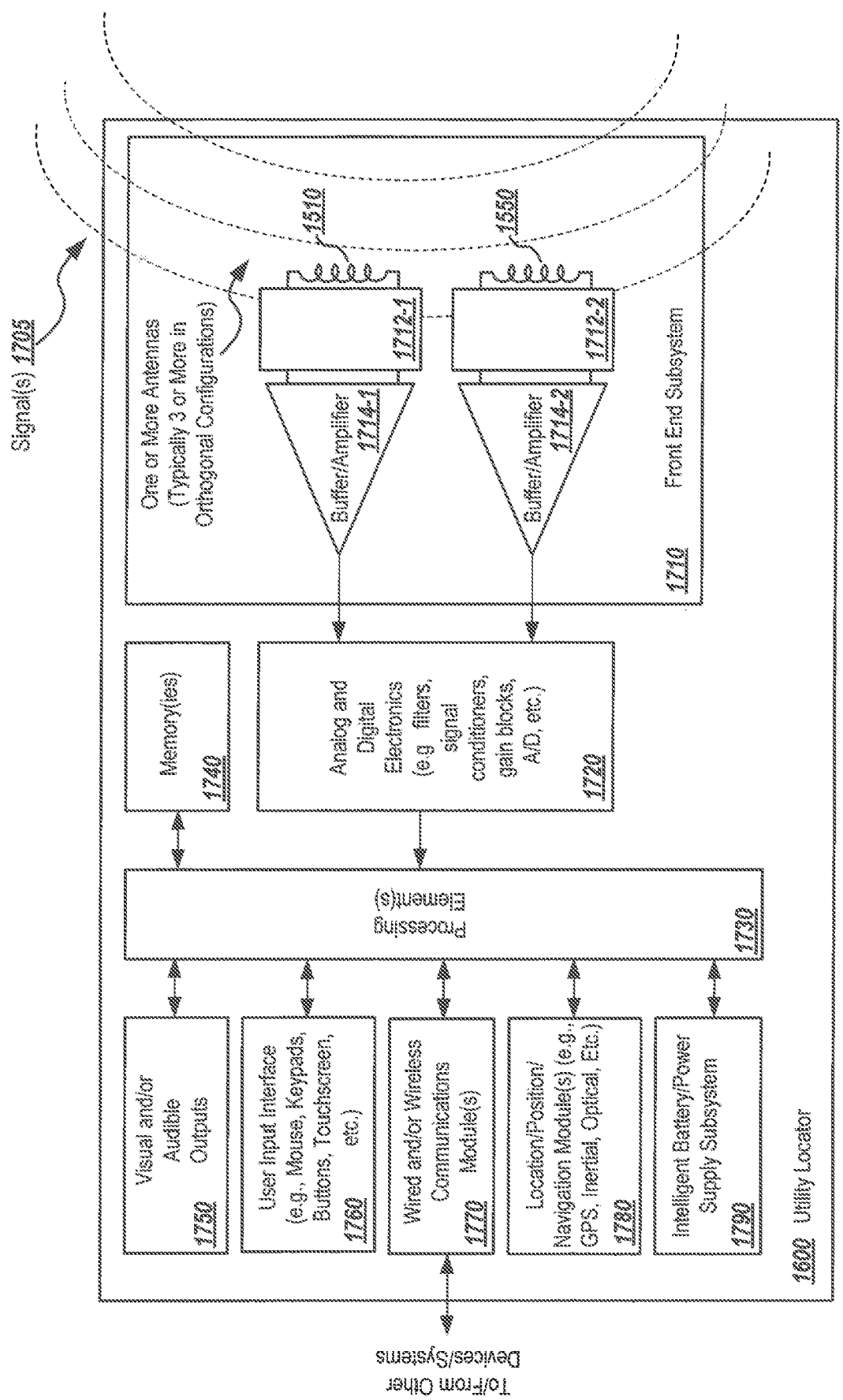
FIG. 17 is a diagram of the utility locator from FIGS. 16A and 16B.

FIG. 17 illustrates details of the utility locator 1600 (FIGS. 16A and 16B). Utility locator 1600 includes a locator housing or body which includes a front end subsystem 1710 coupled to or disposed in the locator housing. The front end subsystem may include a plurality of antenna arrays, such as the omnidirectional antenna array 1510 (FIG. 15D) as well as dodecahedron antenna array 1550 (FIG. 15D). Antenna array 1510 and 1550 (FIG. 15D) may be used to measure signal(s) 1705 which may be one or more broadcast signals, reradiated signals, the superposition of broadcast signals and reradiated signals, and/or signals from other electromagnetic sources (e.g. broadcast signal marker devices discussed with FIG. 18). In alternative embodiments, a utility locator in keeping with the present disclosure may include any number of antenna and/or antenna arrays in various different configurations. Such antenna arrays may be spatially separated, for example, along a vertical axis (not shown) of the utility locator 1600. A circuit 1712 (interchangeably referred to as receiver circuit) may be coupled to each antenna array 1510 and 1550 to provide impedance matching and/or filtering functionality and/or other functionality as described herein. One or more buffer and/or amplifier stages 1714 may be coupled to each antenna arrays 1510 and 1550 and/or circuit 1712 to further buffer, condition, and/or amplify the outputs of the antennas. There may be dedicated circuits 1712 and 1714 for each antenna coil within antenna arrays 1510 and 1550, however, other circuit configurations may be used in other embodiments.

Additional analog and/or digital circuit elements may be coupled to the front end subsystem 1710 in module 1720, for example, filters, signal conditioners, analog-to-digital (A/D) converters, multiplexers, and the like. The output of electronics module 1720 may then be provided to one or more processing elements 1730, which may be coupled to one or more non-transitory memories, such as memories 1740. Memories 1740 may be used to store instructions for implementing various functionality, as described herein, in the processing element(s) 1730. Memories 1740 may also be used for storing information associated with buried utilities, measured signal(s), locate environment, locations of broadcast signal transmitters, storing historic location or position information of the utility locator, and/or for storing other data, instructions, or information associated with operation of the utility locator. This may further include such information regarding broadcast signal marker devices as discussed subsequently herein with FIG. 18.

Various additional modules may be coupled to processing element(s) 1730 and/or memories 1740. For example, visual and/or audible outputs 1750, such as video displays, lights, speakers, headphone jacks, buzzers, touchscreens, etc. may be coupled to processing element(s) 1730 and memory 1740. The visual and/or audible outputs 1750 may include use of graphical user interface 1622 illustrated in FIGS. 16A and 16B. In some further embodiments, visual and/or audible outputs 1750 may further include the use of haptic feedback to communicate information to a user. User input interfaces 1760, such as mice, trackballs, magnetic user interface devices (UIDs), buttons, touchscreen displays, etc., may be coupled to processing elements 1730 to receive user input. One or more wired or wireless communication modules 1770, such as Wi-Fi or Bluetooth transceiver modules, Ethernet or USB interfaces, cellular data interfaces, and/or other wired or wireless communication interface modules may be coupled to processing element(s) 1730 and/or memories 1740. One or more location, position, and/or navigation modules 1780, such as GPS or other satellite or terrestrial navigation receiver modules, one or more inertial navigation or location modules, such as accelerometers, compass or other magnetic sensors, etc., one or more optical tracking modules, and the like may be coupled to processing element 1730 and/or memories 1740.

Utility locator 1600 may further include one or more intelligent batteries and associated intelligent battery interface modules in a battery/power supply subsystem 1790 that may power processing element(s) 1730, memories 1740, circuit module 1720, front end subsystem 1710 elements, and/or other circuits or subsystems of the locator 1600.

Locating systems and operations in keeping with the present disclosure may include one or more broadcast signal marker devices. Such broadcast signal marker devices may, when excited by one or more broadcast signals, radiate electromagnetic signal or signals measureable at a utility locator. Measurement of signals from such broadcast signal marker devices may be further used to determine the broadcast signal marker device's location. Measurement of signals radiating from such broadcast signal marker devices may be done in the absence of or in addition to measurement of signals from other conductive utility lines or conductive elements at the utility locator. The broadcast signal marker devices, also referred to as "marker devices" herein, may share commonalities with and/or be of the variety disclosed within U.S. patent application Ser. No. 14/516,558, filed Oct. 16, 2014, entitled Electronic Marker Devices and Systems where the marker device has been tuned to one or more broadcast frequencies and the excitation signal may be a broadcast signal as defined herein.

Figure 18:
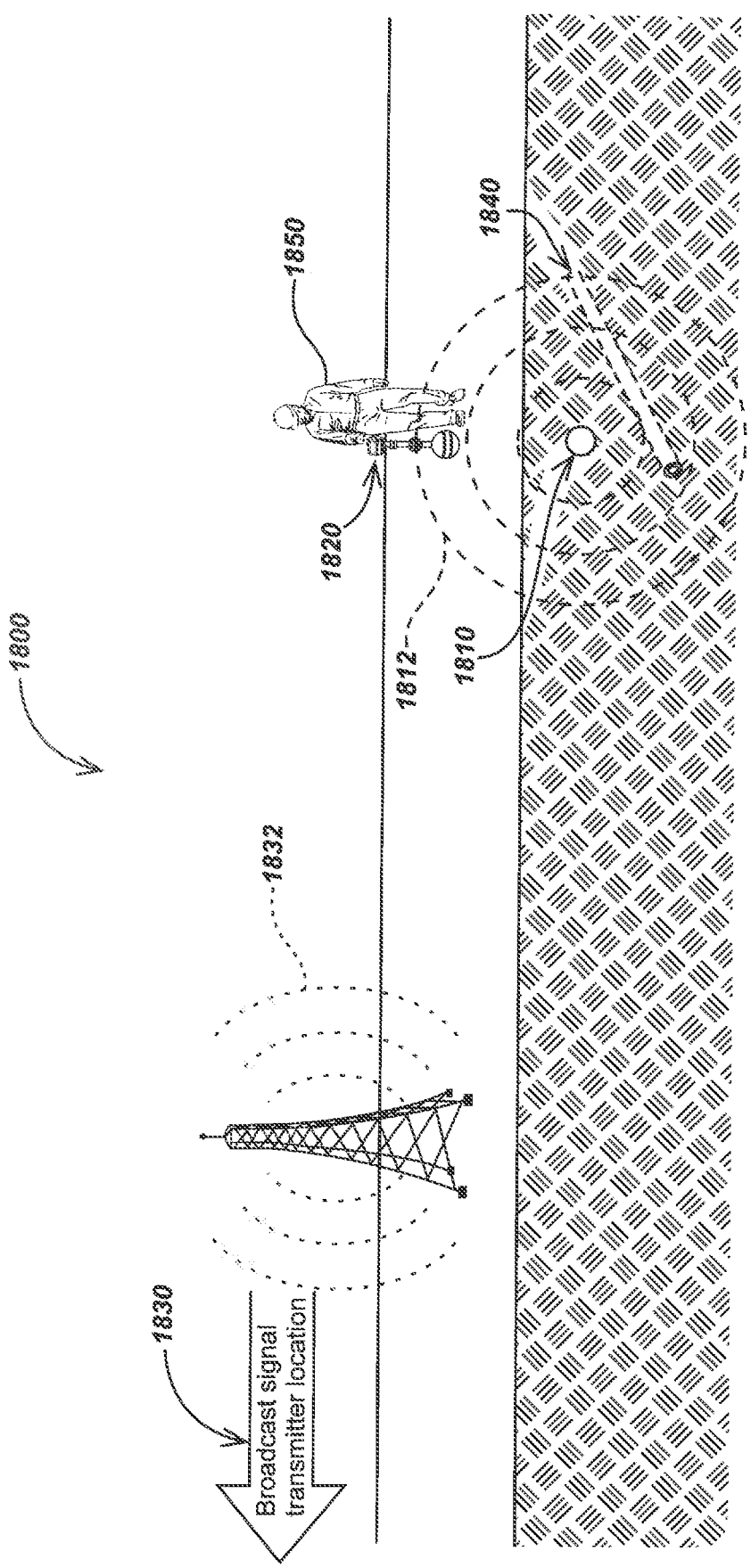
FIG. 18 is an illustration of a locating operation using a broadcast signal marker device.

As illustrated in FIG. 18, an exemplary broadcast signal marker device locating operation 1800 may include a broadcast signal marker device 1810 radiating signal 1812 measured at the utility locator 1820 for purposes of determining its location. The marker device 1810 may radiate electromagnetic signal 1812 once excited by at least one broadcast signal, such as broadcast signal 1832 from broadcast signal transmission source 1830. The signal 1812 transmitted by marker device 1810 may be at a divided down frequency of the excitation broadcast signal 1832. A marker device, such as marker device 1810, may be placed on, within, or near a significant location. For instance, marker device 1810 may be placed above a non-conductive utility line 1840 allowing the utility locator 1820 and user 1850 to determine its location within locate operation 1800. In alternative locating operations, any number of marker devices may be used, tuned to various available broadcast signals. Utility locators associated with such marker devices may be configured to measure signals from such marker devices as well as broadcast signals, reradiated signals, and/or the superposition of the various signals simultaneously at multiple frequencies.

Figure 19:
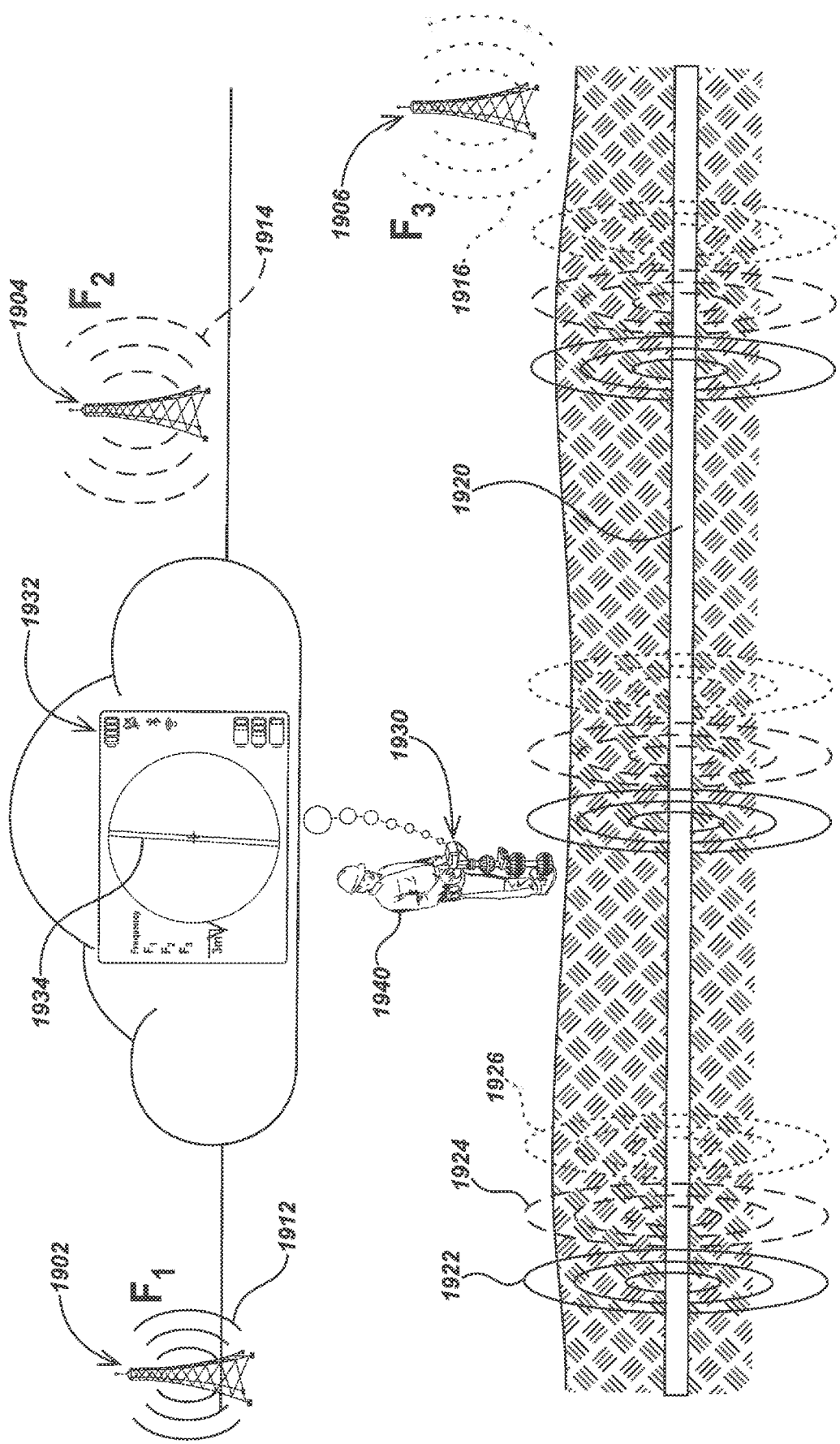
FIG. 19 is an illustration of multiple reradiated signals from a single utility line resulting in a single line displayed on the graphical interface of the utility locator.

In various embodiments, multiple signals from multiple signal generating sources may couple onto a utility line which may be at different frequencies resulting in multiple reradiated signals at multiple frequencies being emitted by the utility line. In such embodiments, the utility locator device may determine the presence of the utility line from the multiple reradiated signals therefrom. As illustrated in FIG. 19, a series of broadcast signal transmitters 1902, 1904, and 1906 may broadcast corresponding signals 1912, 1914, and 1916 each at a different frequency (notated as $F_1$, $F_2$, and $F_3$ respectively). Each signal 1912, 1914, and 1916 may couple to utility line 1920 generating corresponding reradiated signals 1922, 1924, and 1926. The utility locator 1930 may receive reradiated signals 1922, 1924, and 1926 and determine location, pose, and depth within the ground of utility line 1920. From the multiple reradiated signals 1922, 1924, and 1926, the utility locator 1930 may determine each to be emitted from the same source (e.g., utility line 1920) and further communicate the utility line information to the user 1940. For instance, the utility locator 1930 may include a graphical interface 1932 which may display a line 1934 communicating the location, pose, and depth of utility line 1920.

Figure 20:
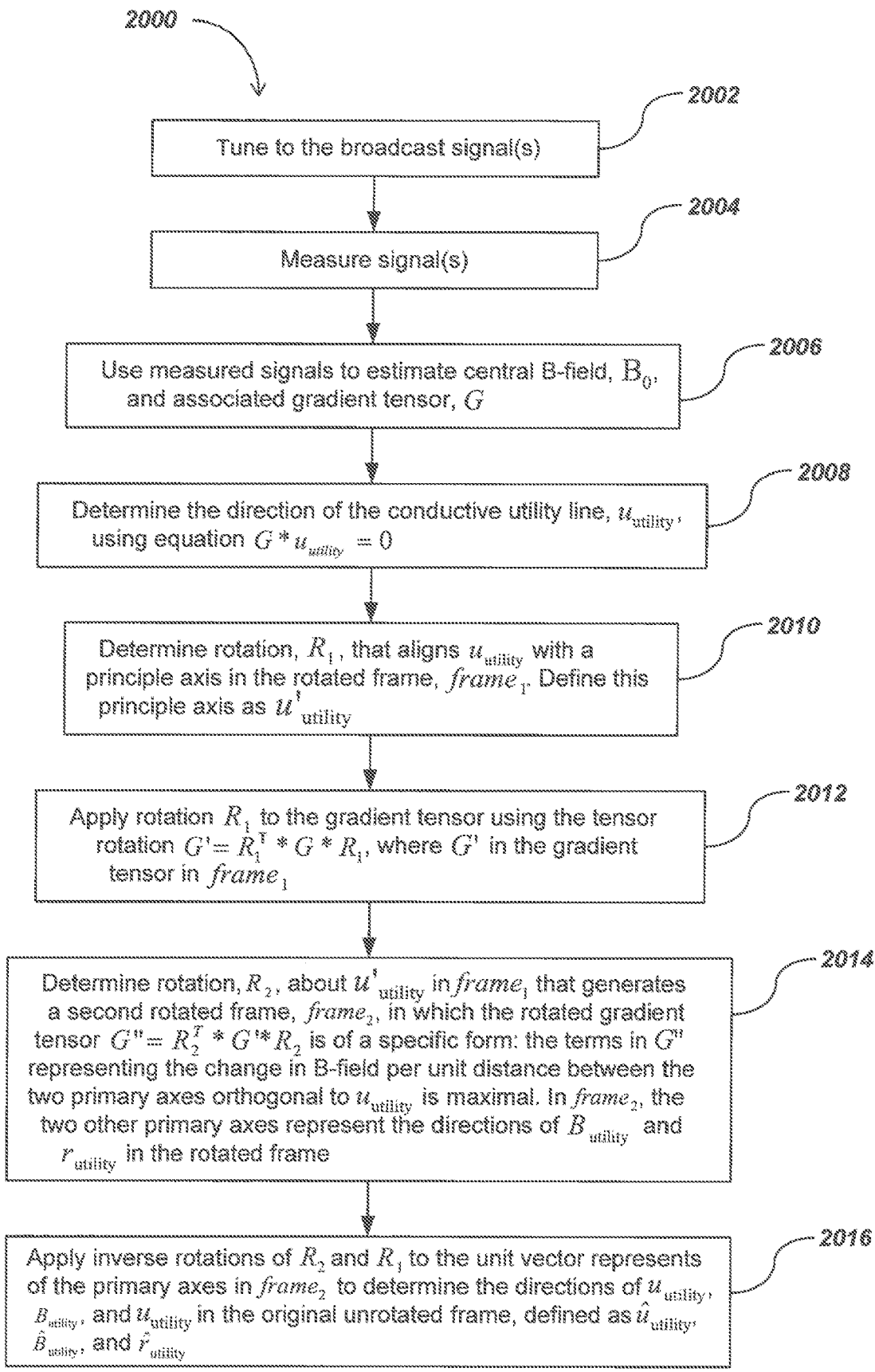
FIG. 20 is a method describing locating the position of a utility line or lines within the ground.

Background and definitions used within the method 2000 described in FIG. 20 are discussed within the subsequent paragraphs. As described within the preset disclosure, when locating utility lines using radio broadcast signals, the utility locator device may measure the superposition of the original broadcast signal notated as $B_{tower}$ and the signal reradiated from the buried utility notated herein as $B_{utility}$. To locate the buried utility line, the original broadcast ($B_{tower}$) and the rebroadcast from the buried utility ($B_{utility}$) may be decoupled. These quantities relate to the measured B-field ($B_{measured}$) through the equation $B_{measured} = B_{tower} + B_{utility}$. The derived gradient tensor, which is given as the change of B-field with respect to unit distance at a specific location, has the similar relationship $G_{measured} = G_{tower} + G_{utility}$. As the original broadcast source is very far away compared to local rebroadcast source, it can be assumed that the local B-field due to the original source is very close to uniform thus that there is no change in its B-field per unit distance. Thus the gradient tensor due to the original broadcast, notated as $G_{tower}$, is effectively zero for all elements. It may therefore be assumed that all of the measured gradient in the local field is only due to the rebroadcast source such that $G_{measured} = G_{utility}$. It is known from the corollaries of cylindrical fields, that translation in the direction of $r_{utility}$, generates a change in the B-field only in the direction of $B_{utility}$. It is also known that translation in a cylindrical field in the direction of $u_{utility}$ generates no change in the B-field. It is also known from the properties of cylindrical fields that $B_{utility}$, $r_{utility}$, and $u_{utility}$ are all orthogonal to each other. This implies that if $B_{utility}$, $r_{utility}$ and $u_{utility}$ were aligned with the primary axes of a given frame of reference, the resulting gradient tensor may yield no change in any axis of the B-field per unit distance in the direction of the axis representing $u_{utility}$. This gradient tensor may yield a change of B-field per unit distance in the direction of the axis representing $r_{utility}$, and this change in B-field is known to be only in the direction of the axis representing $B_{utility}$. As it is known that the gradient tensor is both traceless and symmetric, the entire form of this gradient tensor in this frame of reference are known: all elements of the gradient tensor will be zero, with the exception of the element that represents the change in B-field in the axis representing $B_{utility}$ per unit distance in the axis representing $r_{utility}$ and, due to symmetry, the element that represents the change in B-field in the axis representing $r_{utility}$ per unit distance in the axis representing $B_{utility}$. Any gradient tensor may be converted to this frame of reference through a series of rotations, and the directions of $B_{utility}$, $r_{utility}$, and $u_{utility}$ can then be known by taking the primary axes they represent in the rotated frame and applying the inverse rotations to them to get their values in the original measurement frame. Therefore analysis of the gradient tensor, $G_{utility}$, may yield the directions of $B_{utility}$, $r_{utility}$, and $u_{utility}$.

Assuming that the rebroadcast source is a long, thin, straight conductor such as a utility line, it may also be determined that the rebroadcast component of the measured B-field is cylindrical. Herein any specific location adjacent to the buried conductor will have the associated properties $B_{utility}$, $r_{utility}$ and $u_{utility}$; where $B_{utility}$ will be defined as the rebroadcast component of the B-field due to the buried conductor at that specific location, $r_{utility}$ will be defined as the three dimensional displacement from the point of measurement (actually locus of the antenna array) to the closest point on the conductor, and $u_{utility}$ will be defined as the direction of the conductor. Cylindrical type B-fields exhibit the following properties: $B_{utility}$ will be orthogonal to $r_{utility}$, $B_{utility}$ will be orthogonal to $u_{utility}$, $r_{utility}$ will be orthogonal to $u_{utility}$, and the magnitude of $B_{utility}$ will be proportional to the inverse of the magnitude of $r_{utility}$. A corollary of these properties is that translation by any unit distance in the direction of $r_{utility}$ will be reflected by a proportional rescaling of that location's associated $B_{utility}$. That is to say with respect to the local gradient tensor, the change in B-field in the direction of $r_{utility}$ will be in the direction of $B_{utility}$. A second corollary of these properties is that translation by any unit distance in the direction of $u_{utility}$ will be reflected by no change in the value of $r_{utility}$ and therefore no change in the value of $B_{utility}$. That is to say with respect to the local gradient tensor, the change in B-field in the direction of $u_{utility}$ will be zero. Therefore, given a measured gradient tensor, G (values for G may be determined using one of the prior methods 300 and 350 described in FIGS. 3A and 3B respectively or method 370 of FIG. 3C), in a cylindrical B-field, or a cylindrical and uniform superposition B-field, the direction of the conductor, $u_{utility}$, is given by the non-trivial (non-zero) solution to the equation $G*u_{utility}=0$.

Turning to method 2000 finding buried utility lines in a superposition field is described within FIG. 20. Within method 2000 a first step 2002 may be tuning to the broadcast signal(s). In a second step 2004, the signal or signals may be measured by the antenna array. The antenna array may be one of the configurations described herein (e.g., antenna arrays illustrated in FIG. 15A) capable of tensor gradient measurements (as described with the methods of FIGS. 3A and 3B or 3C). In a step 2006, measured signals may be used to estimate central B-field, $B_0$, and associated gradient tensor, G. This step may use, for instance, method 370 of FIG. 3C. In another step 2008, the direction of the conductive utility line, $u_{utility}$, may be determined using the equation $G*u_{utility}=0$. In a subsequent step 2010, rotation, $R_1$, that aligns $u_{utility}$ with a principle axis in the rotated frame, $frame_1$ may be determined. This principle axis may be defined herein as $u'_{utility}$. In a step 2012 the rotation, $R_2$, about $u'_{utility}$ in $frame_1$ that generates a second rotated frame, $frame_2$, in which the rotated gradient tensor $G''=R_2^T*G'*R_2$ is of a specific form may be determined. The specific form of G" being the one where the directions of $B_{utility}$, $r_{utility}$, and $u_{utility}$ are known: all the elements of the gradient tensor will be zero, with the exception of the element that represents the change in B-field in the axis representing $B_{utility}$ per unit distance in the axis representing $r_{utility}$ and, due to symmetry, the element that represents the change in B-field in the axis representing $r_{utility}$ per unit distance in the axis representing $B_{utility}$. As it is known that a rotation about $u'_{utility}$ will result in a gradient tensor G" of this form, the angle of this rotation can be derived from basic trigonometry $G''u_{utility}$. In $frame_2$, the two other primary axes represent the directions of $B_{utility}$ and $r_{utility}$ in the rotated frame. In a step 2014, inverse rotations of $R_2$ and $R_1$ may be applied to the unit vector representing the primary axes in $frame_2$ to determine the directions of $u_{utility}$, $B_{utility}$ and $r_{utility}$ in the original measurement frame, defined as $\hat{u}_{utility}$, $\hat{B}_{utility}$ and $\hat{r}_{utility}$.

Figure 21:
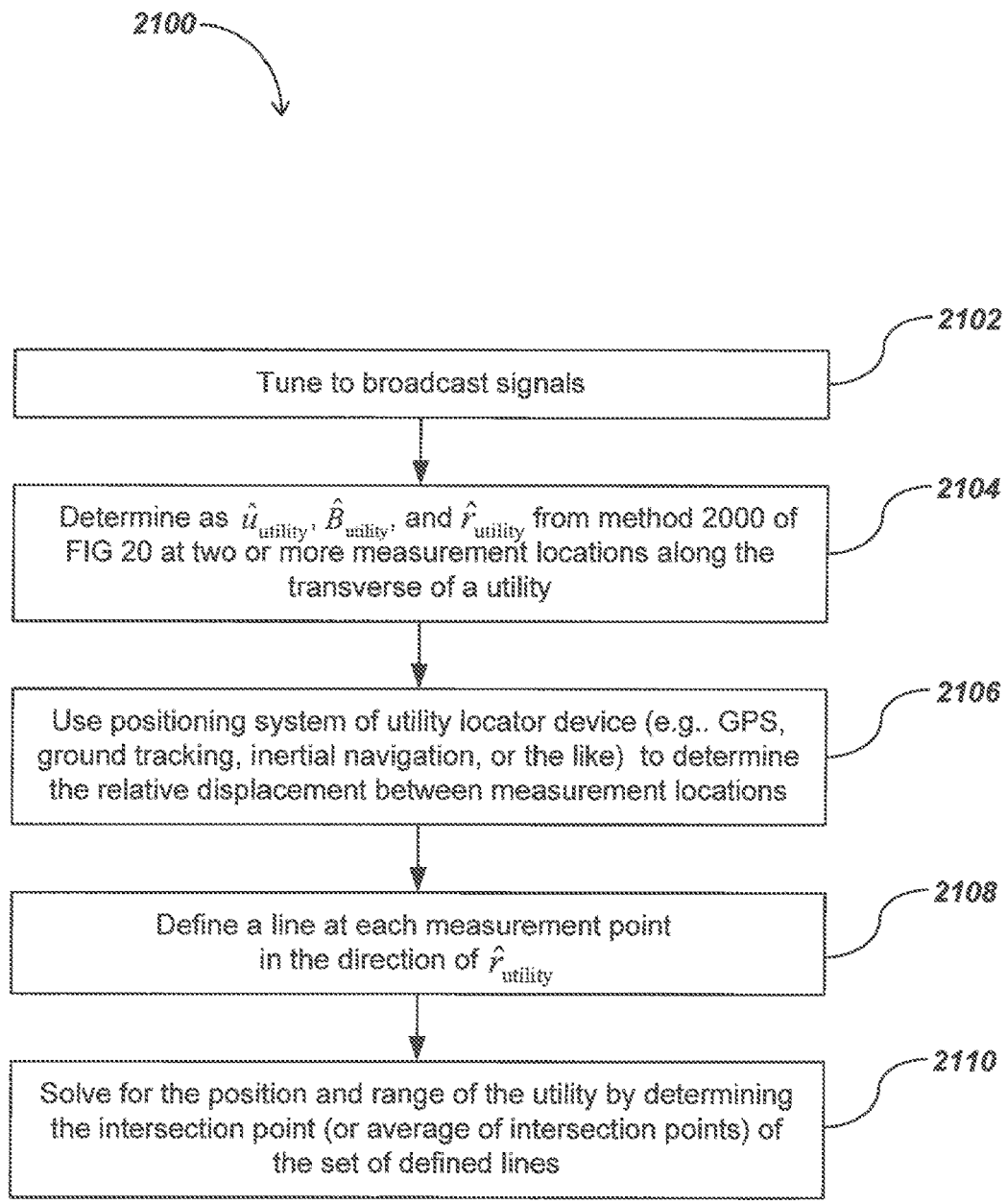
FIG. 21 is a method for find range of the utility line or lines within the ground.

A method 2100 for deriving range to the utility line using the intersection of unit vectors is described in FIG. 21. Method 2100 may include a first step 2102 in which the utility locator may tune to the broadcast signal(s). In a subsequent step 2104, $\hat{u}_{utility}$, $\hat{B}_{utility}$ and $\hat{r}_{utility}$, the unit vector forms of $u_{utility}$, $B_{utility}$ and $r_{utility}$, respectively, may be determined at two or more measurement locations along the traversed utility line. This step may use method 2000 of FIG. 20. In another step 2106, the positioning system of utility locator device (e.g., GPS, ground tracking, inertial navigation, or the like) may be used to determine relative displacement between measurement locations. In another step 2108, a line may be defined at each measurement point in the direction of $\hat{r}_{utility}$. In a step 2110 the position and range of the utility by determining the intersection point (or average of intersection points) of the set of defined lines may be solved for. This intersection or intersections represent the location of the utility with respect to the devices at each of its measurement points and can be used to determine the range to and the depth of the utility at each of the measurement points.

Figure 22:
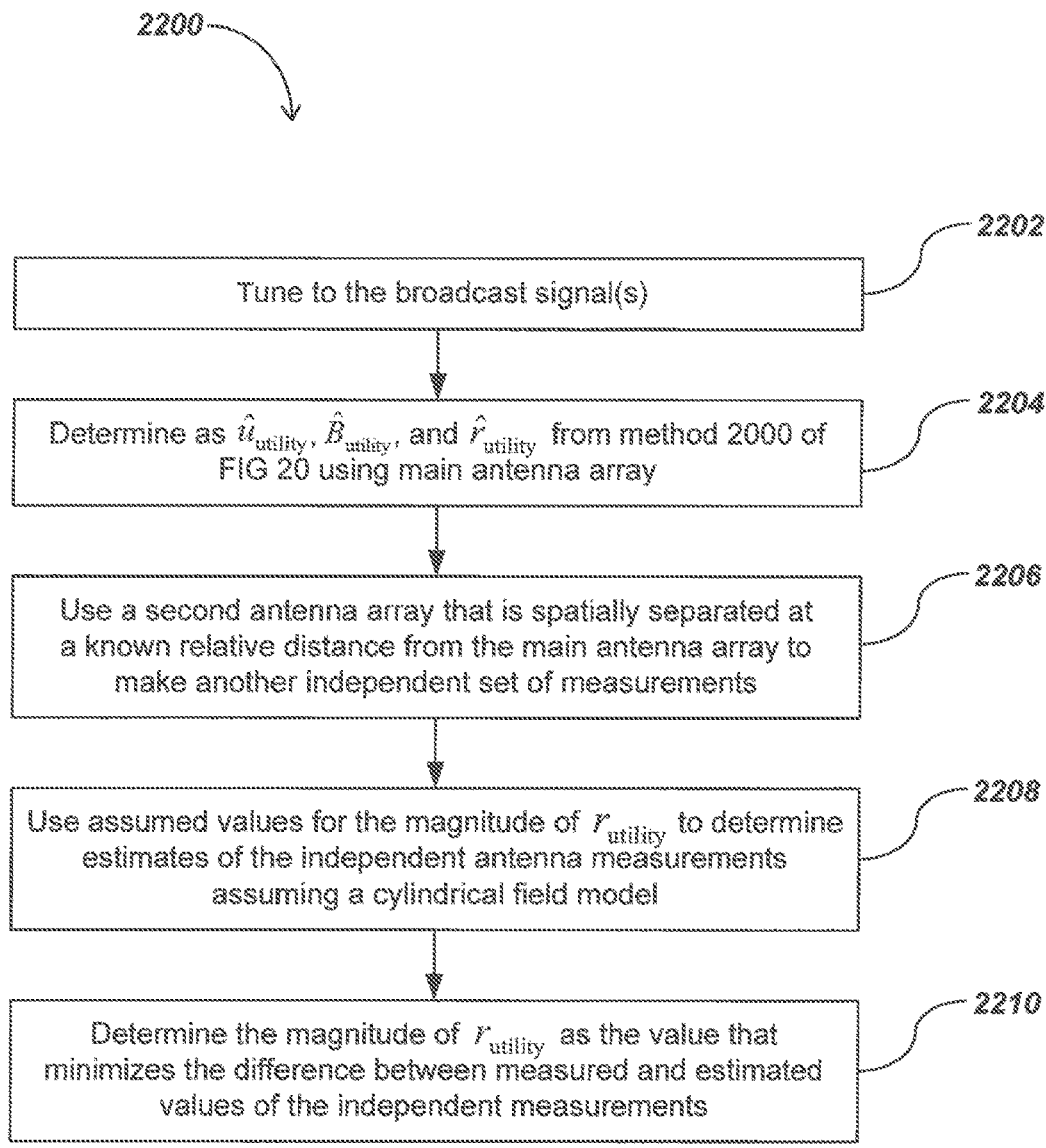
FIG. 22 is another method for find range of the utility line or lines within the ground.

Turning to FIG. 22, another method 2200 for deriving range to the utility line is described using projection of the measurements to an additional antenna array in order to decouple components of the superposition B-field to the original broadcast signal and due to the rebroadcast signal from the utility. This antenna array may have three or more antennas in a known geometry and providing a separate set of B-field measurements at a location independent of those included in the derivation of the gradient tensor and associated unit vectors as described in various methods herein. For instance, this independent antenna array may be a top antenna array such as the antenna array 1510 (FIG. 15A) within enclosure assembly 1610 illustrated within utility locator 1600 of FIGS. 16A and 16B. The method 2200 of FIG. 22 may use the notation defined in method 2000 of FIG. 20 and method 2100 of FIG. 21. The method 2200 may also use the notation $d_{antenna}$ defined here as the known relative offset between antenna arrays. The notated $B_{utility\_independent}$ may be defined as a measurement of a uniform B-field by the separate antenna array wherein the direction of $B_{utility\_independent}$ may be given as the vector that is orthogonal to both $r_{independent}$, the point of measurement to the closest point on the conductor of the separate antenna array, and $u_{utility}$.

In a first step 2202, the utility locator may tune to the broadcast signal(s). In a second step 2204, $\hat{u}_{utility}$, $\hat{B}_{utility}$ and $\hat{r}_{utility}$ may be determined from method 2000 of FIG. 20 using main antenna array. In another step 2206, a second independent antenna array that is spatially separated at a known relative distance from the main antenna array may be used to make another independent set of measurements. In a step 2208, assumed values for the magnitude of $r_{utility}$ may be used to determine estimates of the independent antenna measurements assuming a cylindrical field model. For instance, the value of magnitude of $r_{utility}$ may be used to determine the magnitude of $u_{utility}$, representing the amount of current induced on the utility due to the magnetic field of the broadcast signal(s). The magnitude of $u_{utility}$ may be used $u_{utility}r_{independent}$ to project the value of the B-field at the locations of antennas of the independent antenna array using the assumed cylindrical field model. The known orientation of the independent antennas may be used to estimate the measurement at the antenna by projecting the estimated B-field at location of the antenna to the direction of antenna's measurement. In a final step 2210 the magnitude of $r_{utility}$ may be determined as the value that minimizes the difference between measured and estimated values of the independent measurements.

The presence of a utility rebroadcasting signal may be detected by analyzing the gradient tensor. As mentioned previously herein, the B-field due to the original broadcast signal may appear uniform given enough distance between the signal source and the measuring device. As there is no change in B-field per unit distance in any direction in a uniform B-field, all elements of the gradient tensor due to the original broadcast will be zero, and thus the magnitude of the gradient tensor will also be zero. In a superposition of uniform and cylindrical B-field, any measured magnitude in the gradient tensor may therefore be due to the rebroadcasting utility generating the cylindrical B-field only. The further the device is from the utility, the more uniform the rebroadcast B-field will appear and thus the magnitude of the gradient tensor will get smaller the further the device is from the utility. The magnitude of the gradient tensor will be highly dependent on the magnitude of the source B-field due to the original broadcast. Normalizing the gradient tensor by the magnitude of the measured B-field will result in a new form of gradient tensor that represents the percent change in B-field per unit length. This form of tensor will then be independent of source B-field, and the range to the utility will then have an inverse relationship to the magnitude of the normalized gradient tensor. When the magnitude of the normalized gradient tensor is above some threshold that indicates that the measured B-field is no longer uniform, it may be assumed that a utility is present. The inverse of the magnitude of the normalized gradient tensor will have a positive correlation with range, and may have various uses including auditory or haptic feedback for the user.

As an operator moves the utility locator device, the operator may cross over the buried utility. This crossing may also be detected by analyzing the gradient tensor between consecutive measurements. When directly over the utility and oriented vertically, the B-field due to the utility will have no vertical component. Moving laterally from the utility in one direction, the B-field will have a positive vertical component, and moving laterally in the opposite direction, the utility will have a negative vertical component. That is to say, the B-field due to the utility will have a positive vertical component on one side of the utility and a negative vertical component on the other. As mentioned previously, a known property of the cylindrical field is that translating towards or away from a utility will not change the direction of the measured B-field, the measured B-field will only change in scale. That implies that the vertical component of the measured B-field translating towards or away from the utility will also only change in scale. Therefore the change per unit distance in the direction to the utility will also have a positive vertical component on one side of the utility and a negative vertical component on the other side of the utility. A crossing of the utility will then be reflected as a sign flip between consecutive measurements of the change in the vertical component of the B-field per unit distance in the direction to the utility. Likewise, over the utility, the direction to the utility will also only have a vertical component. As the full 3×3 gradient tensor represents the full 3D change in B-field per 3D unit distance, there is a single known component of this matrix that represents the change in the vertical component of the B-field per vertical unit distance. A crossing may then be simply detected by observing the sign of this component and detecting a flip in sign between consecutive measurements. As it is known that the value of each term in the gradient tensor will be close to zero in the absence of a rebroadcast B-field, it may be worthwhile to only detect crossings when the presence of a rebroadcasting utility is detected in order to avoid false positives.

Figure 23:
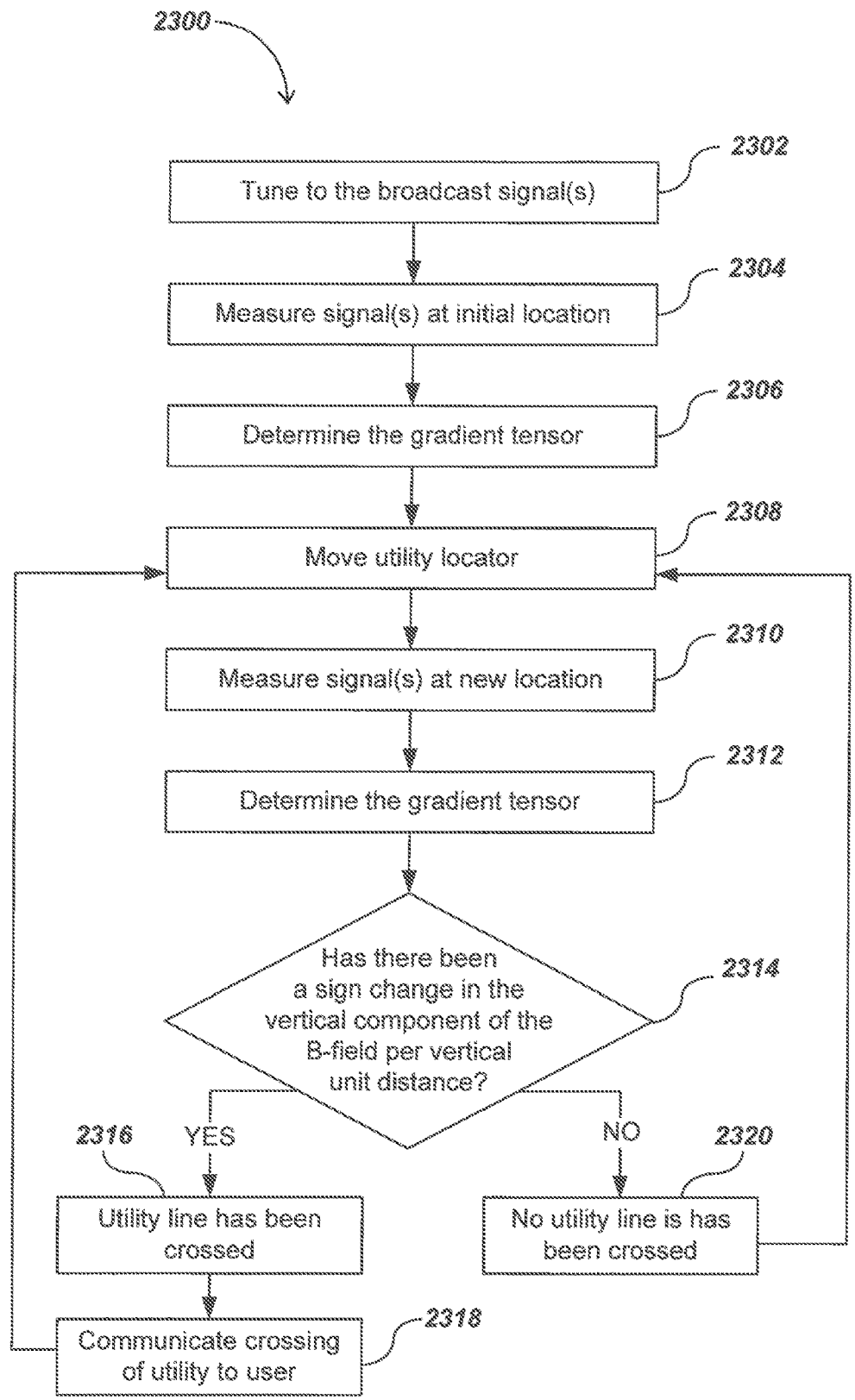
FIG. 23 is a method for auto-detecting a utility line or lines within the ground.

As described through method 2300 of FIG. 23, a first step 2302 may include tuning to broadcast signal(s). In a next step 2304, the signal or signals may be measured at the location. In a step 2306, determine the gradient tensor. This step 2306 may use the gradient tensor method 300 of FIG. 3A, method 350 of FIG. 3B, or method 370 of FIG. 3C. In a step 2308, the utility locator may be moved. In a step 2310, the signal or signals may again be measured (e.g., through method 300 of FIG. 3A, method 350 of FIG. 3B, or method 370 of FIG. 3C). In step 2312, gradient tensor may again be determined via new signal measurements. In a step 2314, assess whether there has been a sign change in the vertical component of the B-field per vertical unit distance. If there has been a change in the vertical component of the B-field per vertical unit distance, in step 2316 a utility line has been crossed over. In 2318, crossing of a utility line may be communicated to the user (e.g., displaying position, pose, and depth of the utility graphically on the utility locator screen, providing an audible alert, haptic feedback, being mapped within a utility mapping system, or the like). The method may repeat back at step 2310 until the utility locating operation is complete. Referring back, if no change in the vertical component of the B-field per vertical unit distance has been detected, in step 2320 no utility line has been crossed over. The method may repeat back at step 2310 until the utility locating operation is complete.

In one or more exemplary embodiments, the functions, methods, and processes described may be implemented in whole or in part in hardware, software, firmware, or any combination thereof. If implemented in software, the functions may be stored on or encoded as one or more instructions or code on a computer-readable medium. Computer-readable media includes computer storage media. Storage media may be any available media that can be accessed by a processor or other programmable device or computer.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The various illustrative functions, modules, and circuits described in connection with the embodiments disclosed herein with respect to locator signal processing control functions, data communication functions, and/or other functions described herein may be implemented or performed in one or more processing elements or modules with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The scope of the invention is not intended to be limited to the aspects shown herein, but are to be accorded the widest scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the disclosure and invention. Thus, the presently claimed invention is not intended to be limited to the aspects shown herein but is to be accorded the widest scope consistent with the appended claims and their equivalents.

We claim:

1. A buried utility locator for detecting a buried conductor, comprising:
   a locator housing;
   a front end subsystem, coupled to or disposed in the locator housing, comprising a dodecahedral antenna array having 12 antenna coils for receiving electromagnetic signals and a receiver circuit having corresponding inputs coupled to the twelve antenna coil outputs of the dodecahedral antenna array, the receiver circuit including electronics to receive an output signal from the dodecahedral antenna array antenna coil outputs at a broadcast radio frequency, the output signal from the dodecahedral antenna array coils including a first signal component from a signal sent directly from a broadcast transmitter and a second signal component emitted from the buried conductor as a result of current flow induced therein from the directly sent transmitter signal;
   a processing element, operatively coupled to a receiver circuit output, programmed to process the receiver circuit output signal to separate the first signal component and second signal component and determine, based in part on the second signal component, information pertaining to the buried conductor; and
   a non-transitory memory coupled to the processing element to store the determined information pertaining to the buried conductor.

2. The buried utility locator of claim 1, further comprising receiving one or more additional electromagnetic signals at the front end subsystem, the one or more additional electromagnetic signals comprising a combination of additional direct magnetic field signals emitted from another transmitting antenna and magnetic field signals emitted from the buried conductor resulting from electromagnetic coupling of the additional direct magnetic field signals emitted from the another transmitting antenna to the buried conductor;
   wherein the determined information pertaining to the buried conductor is further based on processing the one or more additional electromagnetic signals to separate corresponding first and second signal components.

3. The buried utility locator of claim 2, wherein the one or more additional electromagnetic signals include direct magnetic field signals emitted from a plurality of radio transmitting antennas located at different geographic locations relative to the buried utility locator.

4. The buried utility locator of claim 3, wherein the direct magnetic field signals are emitted at different frequencies from the broadcast transmitter.

5. The buried utility locator of claim 3, wherein the plurality of radio transmitting antennas are AM radio broadcast transmitters located about 30 degrees to 120 degrees apart from one another relative to the position of the buried utility locator.

6. The buried utility locator of claim 1, wherein the radio transmitting antenna is a commercial AM radio broadcast antenna.

7. The buried utility locator of claim 1 further including a second antenna array, wherein the second antenna array located is spatially separated from the first antenna array along a vertical axis of the buried utility locator and wherein the determined information is further based on an output of the second antenna array.

8. The buried utility locator of claim 1, wherein the determined information pertaining to the buried conductor includes a position and an orientation of the buried conductor relative to the buried utility locator.

9. The buried utility locator of claim 1, wherein the determined information pertaining to the buried conductor includes a depth of the buried conductor below the buried utility locator or below a ground surface.

10. The buried utility locator of claim 1, further comprising a visual display element, wherein the determined information pertaining to the buried conductor is rendered on the visual display element.

11. The buried utility locator of claim 1, further comprising a positioning system receiver coupled to or disposed in the locator housing to determine an absolute location of the buried utility locator, wherein the determined absolute location of the buried utility locator is stored in the non-transitory memory in association with the determined information pertaining to the buried conductor.

12. The buried utility locator of claim 11, wherein the positioning system receiver is a GPS receiver.

13. The buried utility locator of claim 11, wherein the absolute location of the buried utility locator is in the form of latitude and longitude coordinates.

14. A method for determining information associated with a buried conductor using a buried utility locator, comprising:
   receiving, simultaneously at a dodecahedral antenna array comprising 12 antenna coils and a another antenna array, spatially separated from the first antenna array, within a buried utility locator, an electromagnetic signal comprising a first signal component received directly from a transmitter which broadcasts a signal at a radio frequency and a second signal component emitted from the buried conductor as a result of a current signal therein induced from a signal directly from the transmitter, and providing outputs from the first antenna array and the second antenna array;
   processing, at a receiver and processing element within the buried utility locator operatively coupled to the first antenna array and second antenna array outputs, the antenna array outputs to separate the first signal component and the second signal component;
   determining, based at least in part on the separate second signal component, information pertaining to the buried conductor; and
   storing the determined information associated with the buried conductor in a non-transitory memory associated with the buried utility locator.

15. The method of claim 14, further comprising receiving one or more additional ambient electromagnetic signals comprising a combination of additional direct magnetic field signals emitted from a radio transmitting antenna, and magnetic field signals emitted from the buried conductor resulting from electromagnetic coupling of the direct magnetic field signal to the buried conductor; wherein the determined information pertaining to the buried conductor is further based on processing the one or more additional ambient electromagnetic signals.

16. The method of claim 14, further comprising:
evaluating gradients based at least on comparing the first measurement with the second measurement; and
comparing the evaluated gradients with a predetermined threshold to gather the information pertaining to the buried conductor.

17. The method of claim 16, wherein the gradients comprises one or more of vertical field gradients, shearing gradients, phase gradients, and magnetic field vector magnitude gradients.

18. The method of claim 14, wherein processing the first measurement and the second measurement comprises evaluating magnitudes of magnetic field vectors at the corresponding first magnetic field antenna array and the second magnetic field antenna array.

19. The method of claim 14, wherein processing the first measurement and the second measurement comprises evaluating azimuthal angles at the corresponding first antenna array and the second antenna array.

20. The method of claim 14, wherein the information associated with the buried conductor includes a position and an orientation of the buried conductor relative to the buried utility locator.

21. The method of claim 14, wherein the information associated with the buried conductor includes a depth of the buried conductor below the buried utility locator or below a ground surface.

22. The method of claim 14, further comprising rendering, on a visual display element associated with the buried utility locator, the determined information associated with the buried conductor.

23. The method of claim 14, further comprising determining, in a positioning system receiver associated with the buried utility locator, an absolute location of the buried utility locator, and storing the determined absolute location of the buried utility locator in association with the determined information associated with the buried conductor in the non-transitory memory.

24. The method of claim 23, wherein the positioning system receiver is a GPS receiver.

* * * * *